US012716163B2

(12) United States Patent
Yoon et al.

(10) Patent No.: US 12,716,163 B2
(45) Date of Patent: Aug. 25, 2026

(54) LAUNDRY TREATING APPARATUS

(71) Applicant: LG Electronics Inc., Seoul (KR)

(72) Inventors: Juhan Yoon, Seoul (KR); Jongmin Lee, Seoul (KR); Yongjun An, Seoul (KR); Sanghun Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 1129 days.

(21) Appl. No.: 17/681,256

(22) Filed: Feb. 25, 2022

(65) Prior Publication Data

US 2022/0275564 A1 Sep. 1, 2022

(30) Foreign Application Priority Data

Feb. 26, 2021 (KR) ........................ 10-2021-0026611

(51) Int. Cl.
*D06F 58/08* (2006.01)
*D06F 58/20* (2006.01)
*F16D 1/108* (2006.01)
*D06F 37/30* (2020.01)
*F16D 1/10* (2006.01)

(52) U.S. Cl.
CPC .............. *D06F 58/08* (2013.01); *D06F 58/20* (2013.01); *F16D 1/108* (2013.01); *D06F 37/30* (2013.01); *F16D 2001/103* (2013.01)

(58) Field of Classification Search
CPC .......... D06F 58/08; D06F 58/20; D06F 37/30; D06F 58/02; D06F 58/06; D06F 58/00; F16D 1/108; F16D 2001/103
See application file for complete search history.

(56) References Cited

U.S. PATENT DOCUMENTS 3,060,593 A * 10/1962 Flora ........................ D06F 58/08 310/83
2019/0071812 A1 3/2019 Christensen
2020/0010997 A1 1/2020 Kwon

FOREIGN PATENT DOCUMENTS

CN 1515732 7/2004
CN 102191658 9/2011
(Continued)

OTHER PUBLICATIONS

Office Action in Chinese Appln. No. 202210177712.5, mailed on Apr. 20, 2023, 13 pages (with English translation).
(Continued)

*Primary Examiner* — Michael G Hoang
*Assistant Examiner* — Bao D Nguyen
(74) *Attorney, Agent, or Firm* — Fish & Richardson P.C.

(57) ABSTRACT

Provided is a laundry treating apparatus comprising: a cabinet, a drum rotatably disposed inside the cabinet and configured to receive laundry, and a driving part disposed at the rear plate and configured to provide a rotation force to the drum, wherein the rear plate includes: a driving part mounting portion, and an air flow portion surrounding the driving part mounting portion, wherein the air flow portion includes a flow space having an open front surface facing the drum, wherein the drum rear surface includes: a rear surface central portion facing the driving part mounting portion, and an air passage surrounding the rear surface central portion, wherein the rear surface central portion is disposed in front of the driving part, and wherein the air passage is disposed to be spaced radially outward apart from the driving part.

18 Claims, 28 Drawing Sheets

(56) References Cited

FOREIGN PATENT DOCUMENTS

| | | | |
|---|---|---|---|
| CN | 104562602 | | 4/2015 |
| FR | 1194591 A | * | 11/1959 |
| JP | H06-134187 | | 5/1994 |
| JP | 2000-279678 | | 10/2000 |
| JP | 2006-122697 | | 5/2006 |
| JP | 2010-240224 | | 10/2010 |
| KR | 10-2007-0075594 | | 7/2007 |
| KR | 10-2020-0065931 | | 6/2020 |
| WO | WO2020111817 | | 6/2020 |

OTHER PUBLICATIONS

Notice of Allowance in Chinese Appln. No. 202210177712.5, mailed on May 8, 2024, 14 pages (with English translation).

Extended European Search Report in European Appln. No. 22158890.8, dated Jul. 25, 2022, 7 pages.

* cited by examiner

LAUNDRY TREATING APPARATUS

CROSS-REFERENCE TO RELATED APPLICATIONS

This application claims the benefit of Korean Patent Application No. 10-2021-0026611, filed on Feb. 26, 2021, the disclosure of which is incorporated herein by reference in its entirety.

TECHNICAL FIELD

The present disclosure relates to a laundry treating apparatus, and more particularly, to a laundry treating apparatus including a driving part connected to a drum for accommodating laundry to rotate the drum.

BACKGROUND

A "laundry treating apparatus" may refer to an apparatus for performing various treating processes on laundry, such as washing, drying, and may include a washing machine, a dryer, a refresher (a styler), and the like.

The washing machine is configured to perform a washing process capable of separating and removing foreign matters from the laundry by supplying water and detergent to the laundry. The dryer may be categorized as an exhaust-type dryer or a circulation-type dryer. Both of the exhaust-type dryers and the circulation-type dryers are configured to perform a drying process to remove moisture from the laundry by heating air and providing the hot air to the laundry.

In some examples, the laundry treating apparatus may include a driving part for rotating a drum, and the driving part may be connected to a drum to provide a rotation force.

In some examples, the laundry treating apparatus can correspond to the dryer capable of drying the laundry, and include a circulation flow channel that receives air from the drum and provides the air to the drum again, and a heat pump that is connected to the circulation flow channel to heat the air.

In some examples, in the laundry treating apparatus, because a driving shaft of the driving part and a rotation shaft of the drum may not be located on the same line, power of the driving part can be provided to the drum using a separate power transmission medium such as a belt and the like.

When the driving part is placed on a bottom surface of the cabinet and provides the rotation force to the drum using the belt, because a diameter difference between the driving shaft and the drum may be large, a separate transmission for increasing torque, such as a reducer, may be omitted.

However, when the rotation force is provided from the driving part to the drum using the belt, slipping can easily occur between the belt and the driving part or between the belt and the drum due to the rotation speed of the driving shaft or inertia of the drum.

Therefore, the laundry treating apparatus may be disadvantageous in terms of efficiency by the slip and the like, and it may be disadvantageous to apply an efficient drum rotation strategy because there may be restrictions in changing the rotation speed or the rotation direction of the driving shaft.

Furthermore, the laundry treating apparatus may be disadvantageous because there is a constraint on the arrangement of the components and there is a restriction on the space that may be allocated to each component. In some examples, the driving part may be disposed with an air circulator and the heat pump on a base disposed at a lower portion of the cabinet, for example, at a bottom surface of the cabinet.

In one example, the driving part may be disposed at the rear of the drum rather than at the lower portion of the cabinet and connected to the drum. In this case, a component such as the belt for connecting the driving part and the drum to each other may be omitted.

In some examples, the laundry treating apparatus may be configured such that the driving part is disposed at the rear of the drum to rotate the drum. Therefore, the driving shaft of the driving part and the rotation shaft of the drum may be positioned on the same line, so that the driving part may directly rotate the drum without using the belt or the like.

Accordingly, the slip phenomenon occurring in the belt or the like may be solved and the rotation of the driving shaft may be directly transmitted to the drum, which may be advantageous in establishing the rotation strategy of the drum.

However, in some examples, the laundry treating apparatus may correspond to the dryer, and unlike the washing machine, there is no tub in which the drum is embedded and water is accommodated. Thus, the driving part may be coupled to a rear panel of the cabinet at the rear of the drum.

Furthermore, the laundry treating apparatus may include a flow portion of air at the rear of the drum to supply the air into the drum to dry the laundry and to supply the air smoothly into the rotating drum.

In some examples, in the laundry treating apparatus, the air flow portion may be disposed at the rear of the drum together with the driving part.

In some examples, the driving part may be coupled onto the rear surface of the cabinet facing a center of the rear surface of the drum, and the flow portion through which the air flows may be disposed around the driving part.

In some examples, the flow portion may be constructed as a duct that defines a space through which air flows is coupled onto the rear surface of the cabinet, and the rear surface of the cabinet may include a plurality of holes to allow the air in the duct to be supplied to the rear surface of the drum.

However, in some examples, a separate duct member protruding rearward from the rear surface of the cabinet may define the flow portion, the laundry treating apparatus may be disadvantageous as additional fastening for the coupling of the duct member and air leakage between the duct member and the rear surface of the cabinet may occur.

In some examples, the plurality of holes may be defined in the rear surface of the cabinet in the front of the duct member, and a punching process of the cabinet may be added. Furthermore, a flow of air in a forward direction may be obstructed in a region other than the hole, so that it is disadvantageous in supplying air to the rear surface of the drum.

In one example, the driving part coupled to the rear surface of the cabinet may be located at the rear of the rear surface of the cabinet to require unnecessary space at the rear of the cabinet, or may be located in front of the rear surface of the cabinet to reduce an inner space of the cabinet and reduce a capacity of the drum.

Furthermore, heated air may be supplied into the drum through the flow portion for drying the laundry, and the driving part for rotating the drum may be located inside the flow portion and connected to the drum. Accordingly, heat inside the flow portion and the drum may be transferred to the driving part, and an increase in a temperature of the driving part may be disadvantageous in terms of thermal damage to the driving part and the surroundings and an operation efficiency of the driving part.

Therefore, in the laundry treating apparatus capable of drying the laundry, it is an important task in the art to develop a laundry treating apparatus that designs an efficient structure in which the driving part may be disposed at the rear of the drum, implements an efficient structure of the air flow portion that may effectively supply air to the rear surface of the drum, effectively utilizes an inner space of the cabinet as well as a disposition space where the laundry treating apparatus is disposed, and suppresses heat transfer to the driving part and improves a heat dissipation effect of the driving part.

SUMMARY

The present disclosure is directed to a laundry treating apparatus in which a driving part and a drum are directly connected to each other to effectively transmit power of the driving part and to which an efficient rotation scheme of the drum may be applied.

The present disclosure is also directed to a laundry treating apparatus including a rear plate that may effectively define an air flow portion for supplying air to a drum at the same time a driving part is coupled thereto.

The present disclosure is also directed to a laundry treating apparatus that may effectively increase a capacity of a drum inside a cabinet and effectively utilize an inner space of the cabinet.

The present disclosure is also directed to a laundry treating apparatus having an efficient structure in which air is effectively supplied into a drum by directly shielding, by a rear surface of the drum, an air flow portion of a rear plate.

The present disclosure is also directed to a laundry treating apparatus in which a driving part is coupled to a rear plate and space utilization is excellent, thereby efficiently utilizing a disposition space and effectively increasing a capacity of a drum.

The present disclosure is also directed to a laundry treating apparatus capable of effectively suppressing heat transfer to a driving part, thereby preventing thermal damage to the driving part, and improving an operation efficiency of the driving part.

The present disclosure is also directed to a laundry treating apparatus capable of effectively suppressing the heat transfer through a drum rear surface and a rear plate without adding a separate component for suppressing the heat transfer to the driving part.

The present disclosure is also directed to a laundry treating apparatus capable of effectively dissipating heat of the driving part to prevent the thermal damage to the driving part and improve the operation efficiency of the driving part.

According to one aspect of the subject matter described in this application, a laundry treating apparatus can include a cabinet including a rear plate disposed at a rear surface thereof, a drum rotatably disposed inside the cabinet and configured to receive laundry, the drum including a drum rear surface facing the rear plate, and a driving part disposed at the rear plate and configured to provide a rotation force to the drum, wherein the rear plate includes a driving part mounting portion configured to be coupled with the driving part, and an air flow portion surrounding the driving part mounting portion and configured to provide air into the drum, wherein the air flow portion includes a flow space having an open front surface facing the drum and configured to allow air to flow therein, wherein the drum rear surface includes a rear surface central portion facing the driving part mounting portion, and an air passage surrounding the rear surface central portion and configured to pass air flowing out through the open front surface of the air flow portion therethrough, wherein the rear surface central portion is disposed in front of the driving part and configured to suppress heat transfer between an interior of the drum and the driving part, and wherein the air passage is disposed to be spaced radially outward apart from the driving part.

Implementations according to this aspect can include one or more of the following features. For example, an entirety of the driving part can overlap the rear surface central portion in a forward direction.

In some implementations, the driving part mounting portion can cover the entirety of the driving part from the front and be configured to suppress the heat transfer between the interior of the drum and the driving part together with the rear surface central portion.

In some implementations, the rear surface central portion can have a diameter equal to or greater than a diameter of the driving part and be disposed in front of the driving part.

In some implementations, the laundry treating apparatus further comprises a shaft cap coupled to the rear surface central portion from the front and covering at least a portion of the rear surface central portion and configured to suppress the heat transfer between the interior of the drum and the driving part.

In some implementations, the rear surface central portion can protrude frontward from the drum rear surface and includes a space defined therein.

In some implementations, the driving part mounting portion and the driving part can be at least partially inserted into the rear surface central portion. In some implementations, the rear surface central portion is not in contact with the driving part mounting portion.

In some implementations, the driving part can include: a first driving part coupled to the driving part mounting portion at a front portion thereof; and a second driving part coupled to the first driving part and having a larger cross-sectional area than that of the first driving part at a rear portion thereof, and wherein at least a portion of the first driving part is disposed within the space of the rear surface central portion.

In some implementations, the second driving part can correspond to a power part configured to generate the rotation force to the drum, and wherein the first driving part corresponds to a shifting part configured to adjust the rotation force transmitted from the second driving part and to provide the adjusted rotation force to a driving shaft coupled to the rear surface central portion.

In some implementations, the rear surface central portion can include: a connecting front surface coupled to the driving part and having a diameter equal to or greater than a diameter of the first driving part, the connecting front surface covering a region corresponding to the first driving part; and a connecting side surface extending frontward from the drum rear surface, coupled to the connecting front surface, extending along a circumference of the connecting front surface, and covering a region corresponding to the second driving part, the connecting side surface having a diameter that increases in a rearward direction.

In some implementations, the driving part mounting portion can include: a mounting front surface disposed between the connecting front surface and the first driving part, coupled with the first driving part, the mounting front surface disposed in front of the first driving part; and a mounting side surface extending frontward from the rear plate and coupled to the mounting front surface, extending along a circumference of the mounting front surface, the mounting side surface disposed in front of a circumference of the second driving part, the mounting side surface having a diameter that increases in a rearward direction. In some implementations, the driving part mounting portion is not in contact with the second driving part.

In some implementations, the driving part can include a driving shaft protruding in a forward direction from the rear plate and coupled to the rear surface central portion, and wherein the laundry treating apparatus further comprises a bushing coupled to the rear surface central portion and the driving shaft, the bushing configured to transmit the rotation force from the driving shaft to the drum.

In some implementations, the rear surface central portion can include a shaft through-hole penetrated by the bushing, and wherein the bushing includes a shaft coupling portion protruding in a forward direction from the rear surface central portion through the shaft through-hole and accommodating the driving shaft inserted thereinto.

In some implementations, the driving part can comprise a bearing extension extending toward the drum rear surface through the driving part mounting portion, and wherein the bearing extension includes a bearing configured to support the driving shaft, and is at least partially inserted into the shaft coupling portion.

In some implementations, a space configured to accommodate the bearing extension inserted thereinto can be defined at the driving part, and wherein at least a portion of the shaft coupling portion increases in diameter in a direction toward the rear plate.

In some implementations, the shaft coupling portion can comprise teeth and gear teeth protruding toward the driving shaft, and wherein the driving shaft includes a meshing portion inserted into the teeth, and wherein the gear teeth are disposed on an outer circumferential surface thereof to mesh with the teeth.

In some implementations, the shaft coupling portion can comprise a shaft coupling hole penetrated by the driving shaft, wherein the teeth are disposed on an inner circumferential surface of the shaft coupling hole, wherein a shaft fixing member is coupled to a front end of the driving shaft disposed in front of the shaft coupling hole, and wherein the shaft fixing member is supported in a forward direction by the shaft coupling portion.

In some implementations, the bushing further can include a drum coupling portion extending along a circumference of the shaft coupling portion and coupled to the rear surface central portion.

In some implementations, the rear surface central portion can include a bushing coupling portion surrounding the shaft through-hole and coupled with the drum coupling portion, and wherein the bushing coupling portion protrudes frontward from the rear surface central portion and accommodates the drum coupling portion disposed thereon.

In some implementations, the laundry treating apparatus further comprises a shaft cap that is disposed in front of the rear surface central portion and covers the shaft coupling portion from the interior of the drum.

In some implementations, the laundry treating apparatus further comprises a bushing fastening member that fastens the bushing coupling portion and the drum coupling portion to each other by penetrating the bushing coupling portion and the drum coupling portion, and wherein the shaft cap covers the bushing fastening member from the interior of the drum.

In some implementations, the laundry treating apparatus further comprises a cap fastening member that penetrates the shaft cap and is inserted into the driving shaft to fasten the shaft cap to the driving shaft.

In some implementations, the rear surface central portion can comprise a hook fastening portion on a shaft circumference surrounding the shaft through-hole, and wherein the shaft cap includes a cap hook inserted into the shaft through-hole and coupled to the hook fastening portion.

In some implementations, the shaft circumference can protrude frontward from the bushing coupling portion, wherein the bushing defines a bushing recessed portion recessed rearward in a portion thereof facing the cap hook, and wherein the cap hook includes a hook protrusion coupled to the hook fastening portion and disposed in a space between the shaft circumference and the bushing recessed portion.

In some implementations, the air flow portion can protrude rearward from the rear plate, defines the flow space therein, and surrounds the driving part. In some implementations, the air flow portion can have the open front surface is defined as the rear plate being bent or curved.

In some implementations, the drum further comprises a drum circumferential surface disposed in front of the drum rear surface and surrounding the drum, wherein the drum rear surface includes a circumference connecting portion coupled to the drum circumferential surface, and wherein the air passage protrudes in a rearward direction from the circumference connecting portion to cover the open front surface of the air flow portion.

In some implementations, the air passage comprises a ventilation portion configured to allow air from the air flow portion to pass therethrough, and wherein the ventilation portion protrudes from the air passage toward the flow space.

In some implementations, the driving part further comprises a driving shaft protruding in a forward direction from the rear plate, and wherein the rear surface central portion of the drum rear surface is coupled to the driving shaft and configured to receive the rotation force.

According to another aspect, a laundry treating apparatus can include a cabinet including a rear plate disposed at a rear surface thereof; a drum rotatably disposed inside the cabinet and configured to receive laundry, the drum including a drum rear surface facing the rear plate; and a driving part disposed at the rear plate and configured to provide a rotation force to the drum, wherein the rear plate includes: a driving part mounting portion configured to be coupled with the driving part, and an air flow portion surrounding the driving part mounting portion and configured to provide air into the drum, wherein the air flow portion includes a flow space having an open front surface facing the drum and configured to allow air to flow therein, wherein the drum rear surface includes: a rear surface central portion facing the driving part mounting portion, and an air passage surrounding the rear surface central portion and configured to pass air flowing out through the front surface of the air flow portion therethrough, and wherein the driving part mounting portion covers the driving part from the front and the rear surface central portion covers the driving part mounting portion from the front, and configured to suppress heat transfer between an interior of the drum and the driving part.

According to another aspect, a laundry treating apparatus can include: a cabinet including a rear plate disposed at a rear surface thereof; a drum rotatably disposed inside the cabinet and configured to receive laundry, the drum including a drum rear surface facing the rear plate; and a driving part disposed at the rear plate and configured to provide a rotation force to the drum, wherein the rear plate includes:

a driving part mounting portion configured to be coupled with the driving part, and an air flow portion surrounding the driving part mounting portion and configured to provide air into the drum, wherein the air flow portion includes a flow space having an open front space facing the drum and configured to allow air to flow therein, wherein the drum rear surface includes: a rear surface central portion facing the driving part mounting portion, and an air passage surrounding the rear surface central portion and configured to pass air flowing out through the open front surface of the air flow portion therethrough, wherein the rear surface central portion protrudes frontward from the drum rear surface and includes a space defined therein, and wherein the driving part mounting portion and the driving part are at least partially inserted into the rear surface central portion.

DETAILED DESCRIPTION

Figure 1:
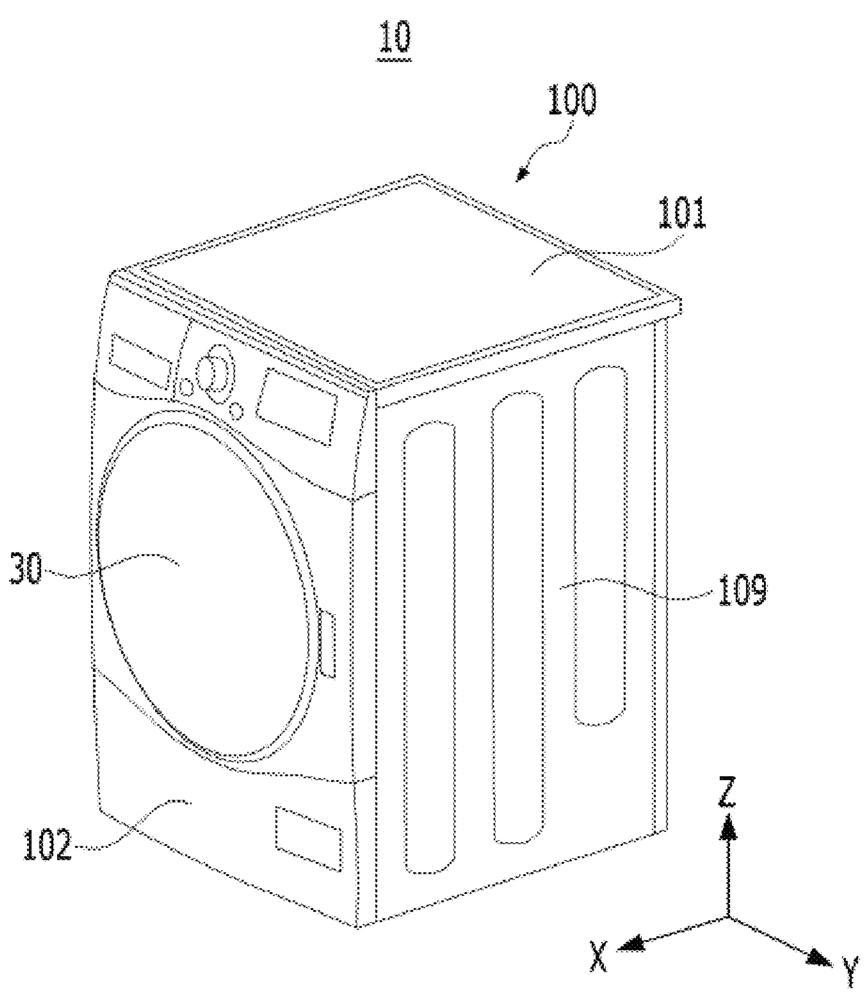
FIG. 1 is a perspective view illustrating an exemplary laundry treating apparatus.

Hereinafter, implementations of the present disclosure will be described in detail with reference to the accompanying drawings such that a person having ordinary knowledge in the technical field to which the present disclosure belongs may easily implement the implementation.

However, the present disclosure is able to be implemented in various different forms and is not limited to the implementations described herein. In addition, in order to clearly describe the present disclosure, components irrelevant to the description are omitted in the drawings. Further, similar reference numerals are assigned to similar components throughout the specification.

Duplicate descriptions of the same components are omitted herein.

In addition, it will be understood that when a component is referred to as being 'connected to' or 'coupled to' another component herein, it may be directly connected to or coupled to the other component, or one or more intervening components may be present. In some examples, it will be understood that when a component is referred to as being 'directly connected to' or 'directly coupled to' another component herein, there are no other intervening components.

The terminology used in the detailed description is for the purpose of describing the implementations of the present disclosure only and is not intended to be limiting of the present disclosure.

As used herein, the singular forms 'a' and 'an' are intended to include the plural forms as well, unless the context clearly indicates otherwise.

It should be understood that the terms 'comprises', 'comprising', 'includes', and 'including' when used herein, specify the presence of the features, numbers, steps, operations, components, parts, or combinations thereof described herein, but do not preclude the presence or addition of one or more other features, numbers, steps, operations, components, or combinations thereof.

In addition, in this specification, the term 'and/or' includes a combination of a plurality of listed items or any of the plurality of listed items. In the present specification, 'A or B' may include 'A', 'B', or 'both A and B'.

Figure 2:
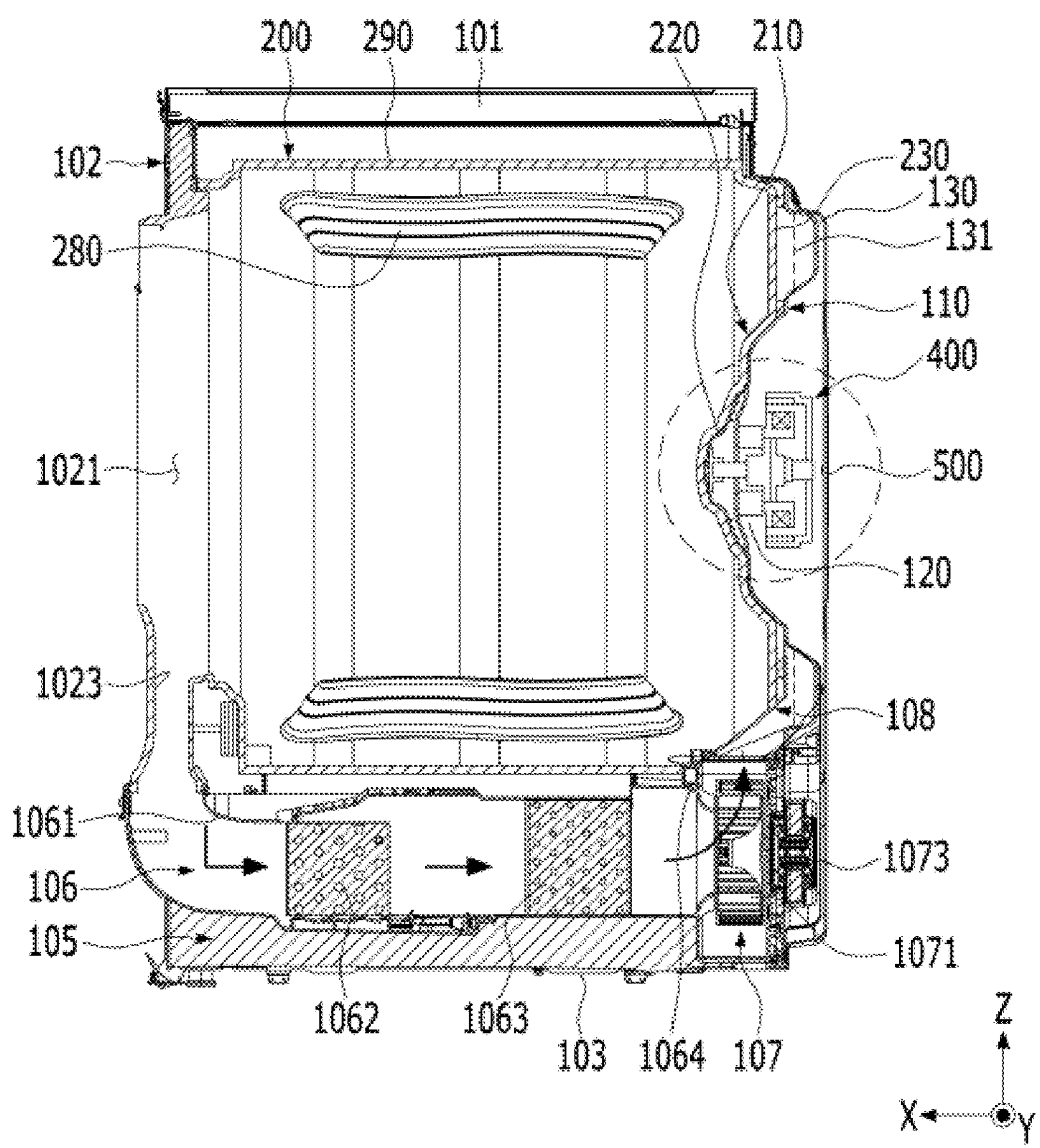
FIG. 2 is a perspective view illustrating an example of an interior of a laundry treating apparatus.

FIG. 1 is a perspective view illustrating a laundry treating apparatus 10 according to an implementation of the present disclosure, and FIG. 2 is a view illustrating an internal cross-section of the laundry treating apparatus 10 shown in FIG. 1.

Referring to FIGS. 1 and 2, the laundry treating apparatus 10 according to an implementation of the present disclosure can include a cabinet 100 that defines an appearance of the laundry treating apparatus 10.

The cabinet 100 can have a front plate 102 at a front surface thereof, side plates 109 at both surfaces in a lateral direction Y, respectively, a top plate 101 at a top surface thereof, a bottom plate 103 at a bottom surface thereof, and a rear plate 110 at a rear surface thereof.

The front plate 102, the side plates 109, and the rear plate 110 can be formed in a shape extending upward from the ground or the bottom plate 103 in a vertical direction Z.

The plates can be coupled with each other, and together define the cabinet 100. The plates can be coupled together to define a space in which a drum 200 can be disposed.

The front plate 102 can define the front surface of the cabinet 100, and can include a laundry inlet 1021 for putting laundry into the apparatus. The laundry inlet 1021 can be defined at a central portion of the front plate 102, and a laundry door 30 for opening and closing the laundry inlet can be disposed on the front plate 102.

The front plate 102 can include a control panel, and the control panel can include a manipulation unit to which a manipulation signal can be input by a user, and a display capable of displaying a treating process of the laundry.

However, in some implementations, the control panel may not be disposed on the front plate 102, and can be disposed on the top plate 101. In addition, a plurality of control panels can be respectively disposed on the front plate 102, and the top plate 101.

In some implementations, the laundry treating apparatus 10 can perform a drying process of the laundry, and the manipulation unit can be configured to receive a command to perform the drying process from the user.

One implementation of the present disclosure can include a controller. The controller can be spaced apart from an interior of the control panel or from the control panel and configured to communicate with the control panel. The controller can be configured to communicate with the control panel and a driving part 400 to perform the drying process of the laundry while controlling the driving part 400.

The top plate 101 can define the top surface of the cabinet 100 and can shield an interior of the cabinet 100 from the top of the cabinet 100. The side plates 109 can define the both side surfaces of the cabinet 100 in the lateral direction Y, respectively. For example, the side plates 109 can include a first side plate defining one side surface in the lateral direction Y of the cabinet 100 and a second side plate defining the other side surface in the lateral direction Y of the cabinet 100.

The bottom plate 103 can define the bottom surface of the cabinet 100, and an air supply 106 and a heat pump can be disposed on the bottom plate 103. The rear plate 110 can define the rear surface of the cabinet 100, and an air flow portion 130, and a driving part mounting portion 120 can be disposed at the rear plate 110.

In one example, referring to FIG. 2, the drum 200 can have a drum front surface at a front surface thereof, and a drum inlet for putting the laundry into the drum can be defined in the drum front surface. The laundry put into the cabinet 100 through the laundry inlet 1021 defined in the front plate 102 can be put into the drum 200 through the drum inlet. The drum 200 can be formed in a shape in which an entirety of the drum front surface is opened to define the drum inlet.

A drum circumferential surface 290 surrounding an inner space of the drum 200 can be disposed at the rear of the drum front surface, and a drum rear surface 210 can be disposed at the rear of the drum circumferential surface 290. The drum rear surface 210 can have an edge coupled to the drum circumferential surface 290.

In some implementations, the drum 200 can be of a front loader type in which a rotation shaft extending along a front and rear direction X is included and the laundry is put into the drum 200 from the front. It can be relatively easy to input and withdraw the laundry into and from the drum 200 in the front loader type compared to a top loader type.

In one example, the front plate 102 can rotatably support the drum 200. That is, the front plate 102 can rotatably support a front end of the drum 200. The front end of the drum 200 can be accommodated in and supported by the front plate 102.

For example, the laundry front plate 102 can support the front end of the drum 200 from a circumference of the laundry inlet 1021 towards the rear end of the drum. Accordingly, the laundry inlet 1021 and the drum inlet can be disposed to face each other, and the laundry inlet 1021 and the interior of the drum 200 can be in communication with each other.

In one example, the front plate 102 can include a gasket surrounding at least a portion of the laundry inlet 1021. The gasket can rotatably support the front end of the drum 200, and can block or suppress air leakage between the front plate 102 and the drum inlet. The gasket can be made of a plastic resin-based material or an elastic material, and a separate sealing member can be additionally coupled to an inner circumferential surface of the gasket.

In one example, a front wheel can be coupled with the front end of the drum 200 to rotatably support the drum 200 and can be disposed at the front plate 102. The front wheel can be configured to support an outer circumferential surface of the drum inlet, and a plurality of front wheels can be disposed spaced apart from each other along the circumference of the laundry inlet 1021.

The front wheel can support the drum 200 upward from a lower portion of the front end of the drum 200, and can rotate together by rotation of the drum 200 to minimize friction.

In some implementations, air for the drying of the laundry can be heated to increase a temperature and can be supplied into the drum 200, wherein the air supplied into the drum 200 can be discharged from the interior of the drum 200 through the drum inlet.

In some implementations, the front plate 102 can include a front duct 1023. The front duct 1023 can be disposed at the front plate 102 to deliver air discharged from the drum 200 to the air supply 106.

The front duct 1023 can be configured to be in communication with the drum inlet or the laundry inlet 1021, and can be disposed inside the front plate 102 or can be in communication with the laundry inlet 1021 through the gasket from the inside of the cabinet 100 and the outside of the front plate 102. FIG. 2 shows the front duct 1023 disposed inside the front plate 102.

Referring to FIG. 2, the drum 200 can be coupled to the drum inlet and the laundry inlet 1021 to maintain airtightness through the above-described gasket, sealing member, and the like. The front duct 1023 can be configured to be in communication with the laundry inlet 1021 and the drum inlet inside the front plate 102 such that the air discharged from the drum 200 is introduced.

The front duct 1023 can extend inside the front plate 102 to discharge air into the cabinet 100. In some implementations, the air supply 106 can be disposed inside the cabinet 100, and the air supply 106 can be coupled to the front duct 1023 to receive the air discharged from the front duct 1023.

Referring to FIG. 2, the air supply 106 can be disposed inside the cabinet 100, and can be disposed at the bottom plate 103. A base 105 on which the air supply 106 or the heat pump is disposed can be disposed on top of the bottom plate 103.

The air supply 106 and the heat pump can be seated on the base 105, and the base 105 can be coupled to the bottom plate 103 or formed integrally with the bottom plate 103. That is, the base 105 can correspond to the bottom plate 103 to form the bottom surface of the cabinet 100.

The air supply 106 can include an inlet duct 1061, and the inlet duct 1061 can be coupled to the front duct 1023. The inlet duct 1061 and the front duct 1023 can be separately manufactured and coupled to each other, or can be formed integrally with each other.

In some implementations, air introduced into the air supply 106 through the inlet duct 1061 can be dehumidified and heated and discharged from the air supply. The air supply 106 can include some components of the heat pump for the dehumidification and the heating of the air.

The air introduced through the inlet duct 1061 can flow inside the air supply 106 and be discharged from the air supply 106 through an outlet duct 1064. The air supply 106 can further include a blower 107 coupled to the outlet duct 1064, and the blower 107 can discharge the air to the outside of the air supply 106 through a blower fan 1071 rotated by a blower motor 1073.

That is, the air can be introduced into the air supply 106 through the inlet duct 1061 coupled to the front duct 1023, and the air passing through the interior of the air supply 106 can be dehumidified and heated to be discharged to the outside of the air supply 106 through the outlet duct 1064 and the blower 107.

In one example, the rear plate 110 can include the air flow portion 130 for supplying air to the drum rear surface 210, and the air supply 106 can provide the air to the drum rear surface 210 through the air flow portion 130 by discharging the air to the air flow portion 130.

The air supply 106 can further include a fan duct 108 coupled to the blower 107, and the fan duct 108 can couple the blower 107 and the air flow portion 130 to each other. That is, the air discharged through the blower 107 can be supplied to the air flow portion 130 via the fan duct 108.

The rear plate 110 can further include an inlet extension 138 extending from the air flow portion 130, and the air supply 106 can be coupled to the inlet extension 138 to provide the air to the air flow portion 130.

In the air flow portion 130, the air supplied from the air supply 106 can flow inside and flow out toward the drum rear surface 210. The air flow portion 130 can have an open front surface 131 to allow the air to flow out frontward. The drum rear surface 210 can include an air passage 230 to which the air flowed out from the air flow portion 130 is introduced. The air passage 230 can be configured such that the air flowed out from the air flow portion 130 flows into and passes through the air passage 230 to be supplied into the drum 200.

In some implementations, a circulation flow channel can be configured to move the air provided to the drum 200 through the air supply 106 and the air flow portion 130 while circulating.

When the drying process of the laundry is performed, the air supplied from the air flow portion 130 can be supplied into the drum 200 through the air passage 230, the air inside the drum 200 can flow out of the drum 200 through the drum inlet, and the air flown out of the drum 200 can be supplied to the air supply 106 via the front duct 1023.

The air supply 106 receives the air through the inlet duct 1061 coupled to the front duct 1023, and dehumidifies and heats the air flowing inside using the heat pump. The dehumidified and heated air flows inside the fan duct 108 via the blower 107 through the outlet duct 1064, and the air flow portion 130 supplies the air introduced through the fan duct 108 back into the drum 200 through the air passage 230 of the drum 200.

Through the air circulation process as above, low-humidity and high-temperature air can be continuously provided into the drum 200, and moisture present in the laundry can be evaporated by the low-humidity and high-temperature air and be discharged to the outside of the drum 200 together with the air.

In one example, structures of the rear plate 110 and the drum rear surface 210 will be schematically described with reference to FIG. 2 as follows.

The rear plate 110 can include the driving part mounting portion 120 and the air flow portion 130. The driving part mounting portion 120 can be opened rearward, so that the driving part 400 can be coupled thereto from the rear. The air flow portion 130 can be opened frontward to discharge the air toward the drum rear surface 210.

The drum rear surface 210 can include a rear surface central portion 220 and the air passage 230. The rear surface central portion 220 can be positioned to face the driving part mounting portion 120 in front of the driving part mounting portion 120. The rear surface central portion 220 can be coupled to a driving shaft 430 of the driving part 400 extending through the driving part mounting portion 120 to receive a rotation force.

The air passage 230 can be defined to face the air flow portion 130 from the front, so that the air flowing out from the open front surface 131 of the air flow portion 130 can pass the air passage 230 and be supplied into the drum 200.

In some implementations, as the driving part 400 providing the rotation force to the drum 200 is coupled to the driving part mounting portion 120 of the rear plate 110, the rotation shaft of the drum 200 and the driving shaft 430 of the driving part 400 can be disposed on the same line. Therefore, it is possible to rotate the drum 200 without using a connecting member such as a belt, so that a rotation speed and a rotation direction of the drum 200 can be effectively adjusted.

In some implementations, as the air flow portion 130 is formed in the rear plate 110 itself without a separate member coupled, it is possible to effectively prevent the air from leaking from the air flow portion 130. Furthermore, as the front surface 131 of the air flow portion 130 is opened, the air can smoothly flow from the interior of the air flow portion 130 toward the drum rear surface 210.

Figure 3:
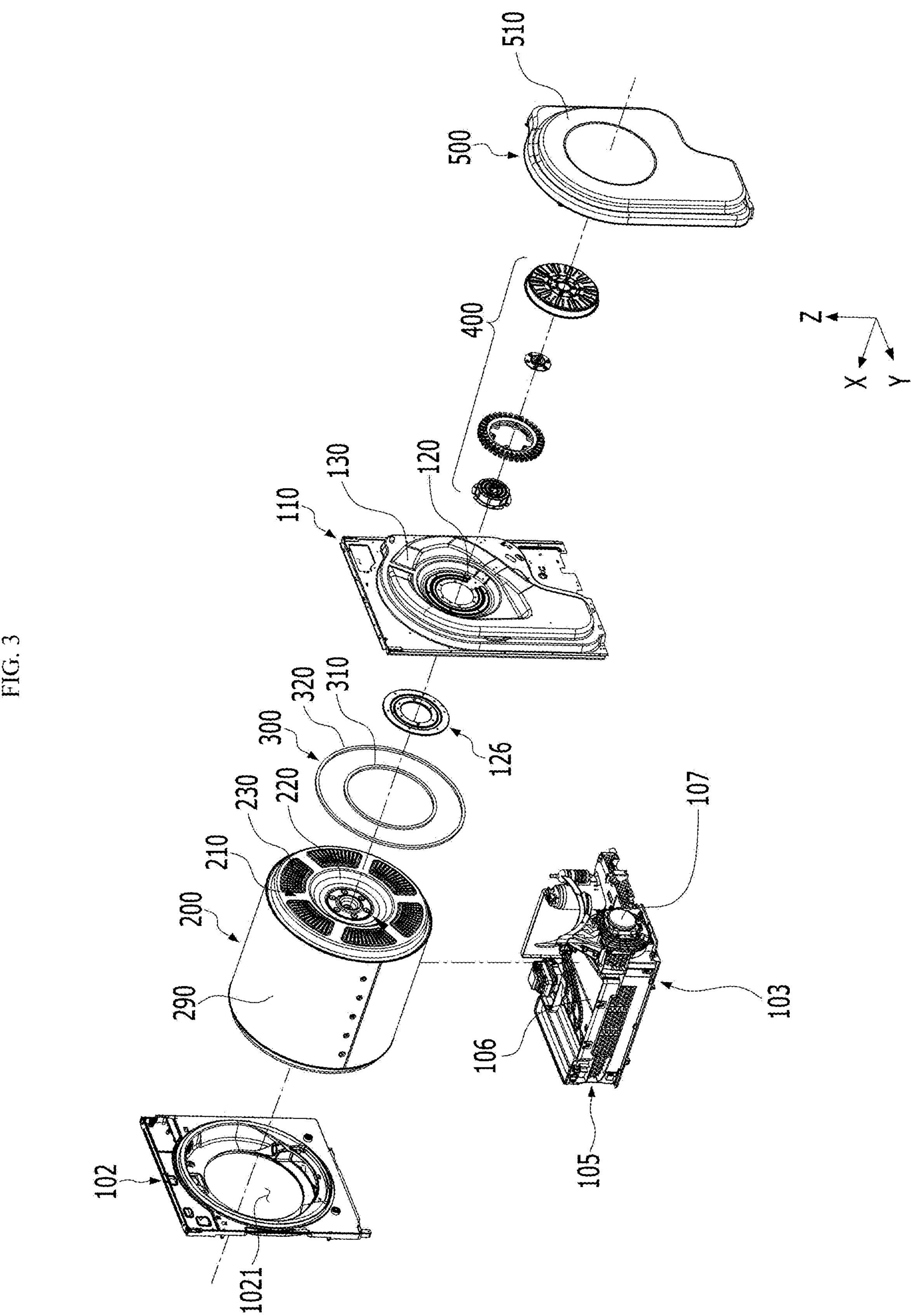
FIG. 3 is an exploded view illustrating an exemplary laundry treating apparatus.

In one example, FIG. 3 illustrates an exploded view of an example of the laundry treating apparatus 10. With reference to FIG. 3, each component of the laundry treating apparatus 10 will be schematically described as follows.

In some implementations, the front plate 102 can include the laundry inlet 1021 defined at the front surface of the cabinet 100 and configured to receive the laundry. The drum 200 can be disposed at the rear of the front plate 102, the drum 200 can have the open front surface to define the drum inlet, and the laundry put into the cabinet 100 through the laundry inlet 1021 can be accommodated inside the drum 200 through the drum inlet.

The drum 200 can include an inlet circumference surrounding the drum inlet, the drum circumferential surface 290 surrounding the interior of the drum 200 at the rear of the inlet circumference, and the drum rear surface 210 coupled to the drum circumferential surface 290 at the rear of the drum circumferential surface 290.

The rear plate 110 can be disposed at the rear of the drum 200. The rear plate 110 can be disposed at a rear portion of the cabinet 100 to define the rear surface of the cabinet 100. The rear plate 110 can include the air flow portion 130 for providing the air into the drum 200, and a rear sealer 300 capable of preventing or suppressing air leakage can be disposed between the drum rear surface 210 and the air flow portion 130.

The rear sealer 300 can include an inner sealer 310 and an outer sealer 320. The inner sealer 310 can prevent air from leaking from an inner circumference of the air flow portion 130 to the outside of the air passage 230, and the outer sealer 320 can prevent air from leaking from an outer circumference of the air flow portion 130 to the outside of the air passage 230.

The rear plate 110 can include the driving part mounting portion 120, and a mounting bracket 126 can be coupled to the driving part mounting portion 120 from the front, and the driving part 400 can be coupled to the driving part mounting portion 120 from the rear.

The driving part 400 can be coupled with the mounting bracket 126 through the driving part mounting portion 120, and the driving shaft 430 can pass through the driving part mounting portion 120 to be coupled to the rear surface central portion 220 of the drum rear surface 210. The driving part 400 can include a first driving part 410 directly coupled to the driving part mounting portion 120, a second driving part 420 coupled to the first driving part 410, and the driving shaft 430 extending forward from the first driving part 410.

A rear cover 500 can be coupled to the rear plate 110 from the rear. The rear cover 500 can shield the rear plate 110 from the rear and define the rear surface of the laundry treating apparatus 10, and can expose a portion of the rear plate 110 to the rear to define the rear surface of the laundry treating apparatus 10 together with the rear plate 110.

The rear cover 500 can be coupled to a rear surface of the rear plate 110 to shield the air flow portion 130 and the driving part 400 from the outside. Heat loss of the air flowing through the air flow portion 130 can be reduced and impact or damage of the driving part 400 can be prevented by the rear cover 500.

The base 105 can be disposed below the drum 200, and the air supply 106, the heat pump, and the like can be disposed at the base 105. The air supply 106 can dehumidify and heat the air discharged from the drum 200 and supply the air back into the drum 200 through the air flow portion 130. At least a portion of the heat pump can be disposed inside the air supply 106 and configured to dehumidify and heat the air flowing through the air supply 106.

Figure 4:
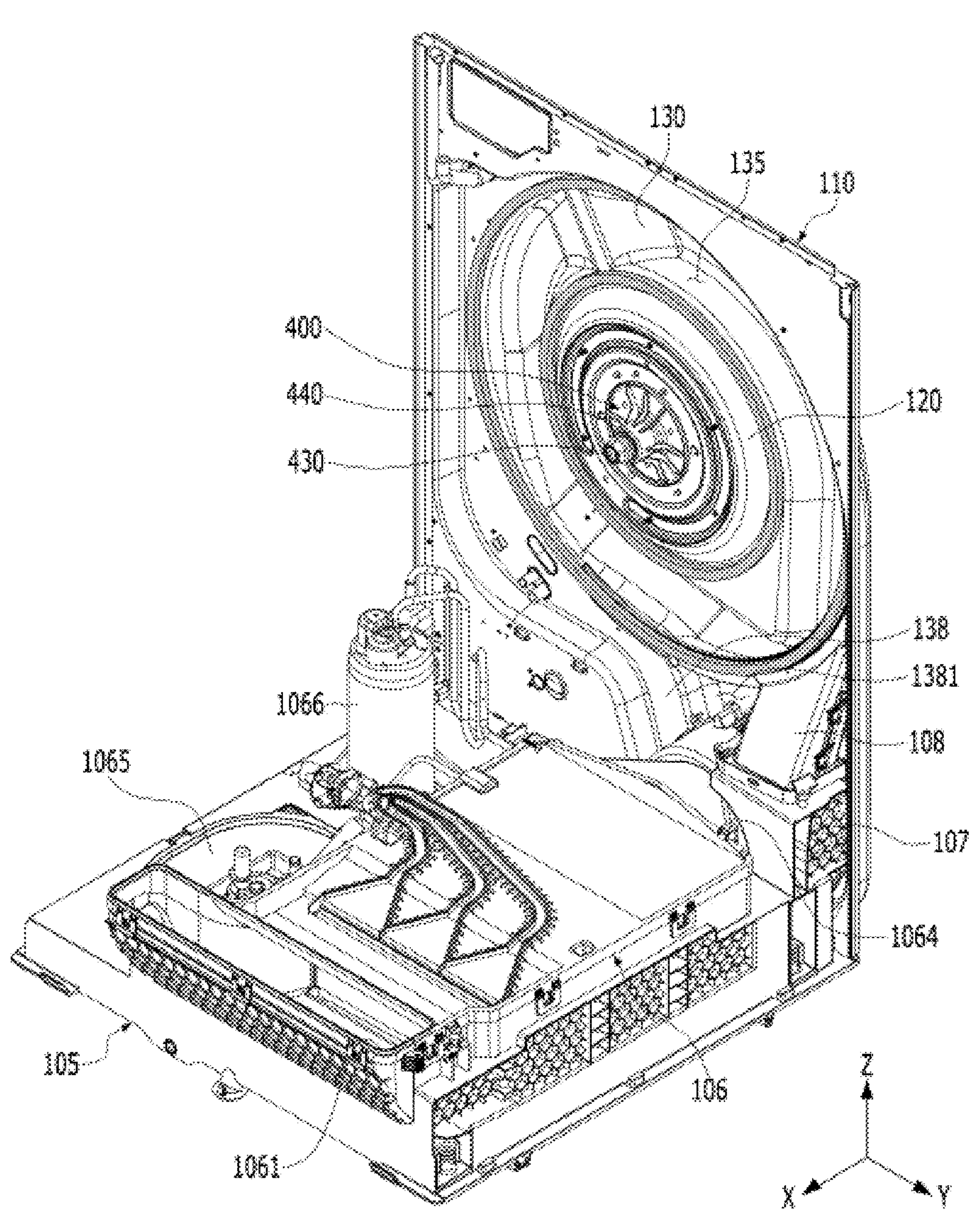
FIG. 4 is a schematic view illustrating and example state in which an air supply and an air flow portion are connected to each other.
Figure 5:
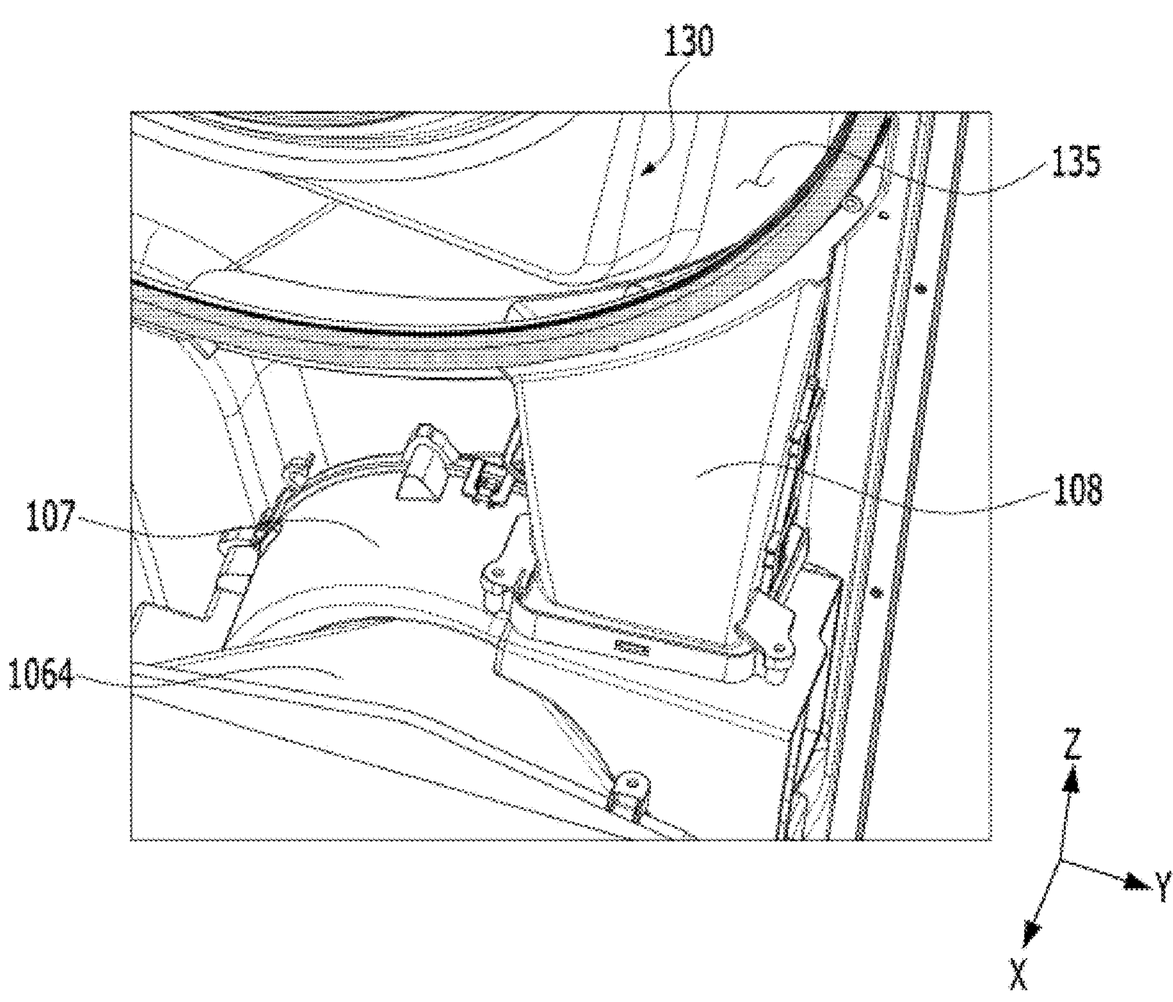
FIG. 5 is a schematic view illustrating an exemplary fan duct in a laundry treating apparatus.
Figure 6:
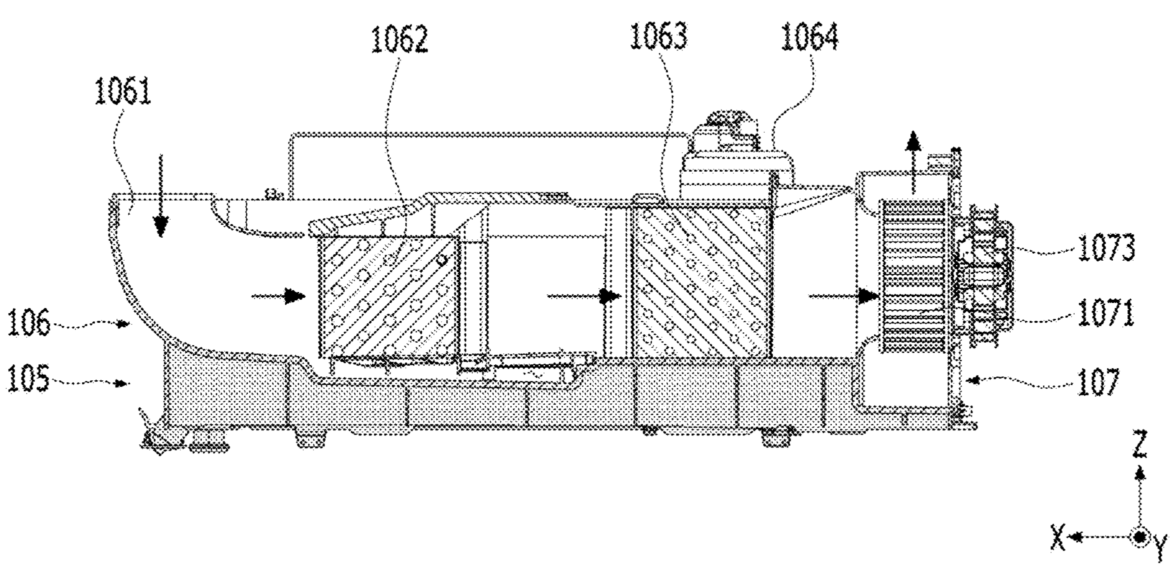
FIG. 6 is a cross-sectional view illustrating an example of an air flow of an air supply.

In one example, FIG. 4 illustrates that the base 105 and the rear plate 110 are coupled to each other, FIG. 5 illustrates the fan duct 108 coupling the blower 107 and the air flow portion 130 to each other, and FIG. 6 illustrates a cross-section of the air supply 106.

The air supply 106 and the heat pump will be described in detail with reference to FIGS. 4 to 6 as follows.

In some implementations, FIG. 4 illustrates the base 105 viewed from above, and illustrates the inlet duct 1061 coupled to the front duct 1023 of the front plate 102 from the air supply 106.

The inlet duct 1061 can be inserted into the front plate 102 or can be coupled to the front duct 1023 from the outside of the front plate 102. The inlet duct 1061 can be formed integrally with the front duct 1023 or can be manufactured separately and then coupled to the front duct 1023.

The air supply 106 can be disposed at the base 105 and can have a shape extending from the front plate 102 toward the rear plate 110. FIG. 4 illustrates the air supply 106 extending along the front and rear direction X and disposed close to one side in the lateral direction Y of the base 105.

In some implementations, as the air supply 106 is disposed below the drum 200 and positioned adjacent to one side in the lateral direction Y of the cabinet 100, the air supply can be disposed at a separation distance from a lowermost end of the drum 200 to prevent or minimize mutual physical interference.

The air supply 106 on the base 105 can extend from the front plate 102 toward the rear plate 110, and the air introduced into the air supply 106 can flow rearward along the extending direction of the air supply 106. That is, the air of the air supply 106 can flow from the front plate 102 to the rear plate 110.

In some implementations, the air supply 106 can include the outlet duct 1064 at a rear portion thereof, and the outlet duct 1064 can be connected to the blower 107. The blower 107 can include a blower fan housing in which the blower fan 1071 is disposed, and the blower motor 1073 coupled to the blower fan 1071 to provide the rotation force. The blower fan 1071 can be configured to circulate the air of the laundry treating apparatus 10.

The blower 107 can be coupled to the outlet duct 1064 from one side, and coupled to the fan duct 108 from the other side. In one example, the air discharged from the air supply 106 and the blower 107 by the blower fan 1071 can be introduced into the fan duct 108.

The fan duct 108 can couple the blower 107 and the air flow portion 130 to each other. The air flow portion 130 is disposed at the rear of the drum rear surface 210 and the blower 107 is disposed below the drum 200, so that the fan duct 108 can extend upwards from the blower 107 and be coupled to the air flow portion 130.

The fan duct 108 will be described in detail with reference to FIG. 5 as follows.

The blower 107 can be configured such that the air is discharged to the outside of the blower fan housing by rotation of the blower fan 1071, and the blower fan 1071 can be rotated around a rotation shaft extending in the front and rear direction X.

In some implementations, the blower 107 can be disposed below the air flow portion 130, and the blower fan 1071 can discharge the air upwardly of the blower 107 by being rotated about the rotation shaft extending in the front and rear direction X so as to smoothly blow the air to the air flow portion 130 disposed above.

The blower 107 can have an opening defined above the blower fan 1071 and configured to discharge the air, and the fan duct 108 can be coupled to the opening to receive the air. The fan duct 108 can extend from the blower 107 toward the air flow portion 130, and can discharge the air to the air flow portion 130.

The fan duct 108 can have a space defined therein in which the air flows, and can have an opening through which the air is discharged at one end thereof facing the air flow portion 130. Said one end of the fan duct 108 can be coupled to the rear plate 110, and the other end facing the blower 107 can be coupled to the blower 107.

Referring back to FIG. 4, the rear plate 110 can include the inlet extension 138 extending from the air flow portion 130, and the inlet extension 138 can include an extension space 1381 extending from a flow space 135 defined inside the air flow portion 130.

The inlet extension 138 can extend from the air flow portion 130 toward the air supply 106. The inlet extension 138 can be opened frontward, so that at least a portion of the blower 107 can be inserted into the extension space 1381. For example, in the air supply 106, at least a portion of the fan duct 108 and at least a portion of the blower 107 can be disposed in the extension space 1381.

FIG. 4 illustrates the air flow portion 130 including the flow space 135 opened frontward. The driving part mounting portion 120 can be disposed at a central portion of the air flow portion 130 formed in an annular shape.

In some implementations, the annular shape can be a shape of a ring forming a closed cross-section inwardly, or can be a shape corresponding to a circumference of a polygon as well as a circle.

The driving part 400 can be defined at the driving part mounting portion 120 and coupled thereto from the rear. The driving part 400 can include the driving shaft 430 and a bearing extension 440 surrounding the driving shaft 430, and the driving shaft 430 and the bearing extension 440 together can extend through the driving part mounting portion 120.

In one example, FIG. 4 illustrates the heat pump disposed on the base 105. The heat pump can include a plurality of heat exchangers and a compressor 1066, so that a fluid compressed through the compressor 1066 can pass through the plurality of heat exchangers to exchange heat with the outside.

In some implementations, the heat pump can include a first heat exchanger 1062, a second heat exchanger 1063, and the compressor 1066. The heat pump can contain the fluid circulating in the first heat exchanger 1062, the second heat exchanger 1063, and the compressor 1066.

Referring to FIG. 6, the first heat exchanger 1062 and the second heat exchanger 1063 of the heat pump disposed in the air supply 106 are schematically illustrated. The compressor 1066 disposed outside the air supply 106 is illustrated in FIGS. 4 and 6.

The first heat exchanger 1062 can correspond to an evaporator that absorbs heat from the outside, and the second heat exchanger 1063 can correspond to a condenser that discharges heat to the outside. The first heat exchanger 1062 and the second heat exchanger 1063 can be disposed on a flow channel along which the air flows in the air supply 106 to dehumidify and heat the air.

In some implementations, the first heat exchanger 1062 on the air flow channel of the air supply 106 can be disposed upstream of the second heat exchanger 1063. That is, the first heat exchanger 1062 can be disposed in front of the second heat exchanger 1063, and the first heat exchanger 1062 can be disposed to face the inlet duct 1061.

The air introduced through the inlet duct 1061 in the air supply 106 can flow to pass through the first heat exchanger 1062. The air discharged from the interior of the drum 200 and introduced through the inlet duct 1061 can contain a large amount of moisture evaporated from the laundry.

The air introduced through the inlet duct 1061 can pass through the first heat exchanger 1062, and water vapor in the air deprived of heat by the first heat exchanger 1062 can be condensed in the first heat exchanger 1062 and changed to a form of water droplets and can be removed from the air.

The air supply 106 can deliver water condensed in the first heat exchanger 1062 to a water collector 1065 disposed outside the air supply 106. In some implementations, the water collector 1065 can receive the condensed water generated in the first heat exchanger 1062 of the air supply 106.

In one example, the second heat exchanger 1063 can be disposed downstream of the first heat exchanger 1062 in the air supply 106. That is, the second heat exchanger 1063 can be disposed at the rear of the first heat exchanger 1062, and can be disposed to face the blower 107 or the outlet duct 1064.

The second heat exchanger 1063 can correspond to the condenser from which the heat of the fluid is discharged to the outside, and the air passing through the second heat exchanger 1063 can be heated by the second heat exchanger 1063 and flow to the blower 107.

In some implementations, as the second heat exchanger 1063 is disposed downstream of the first heat exchanger 1062, the air cooled and dehumidified by the first heat exchanger 1062 can be discharged from the air supply 106 in a state of being heated again through the second heat exchanger 1063.

FIG. 6 illustrates the blower fan 1071 of the blower 107 configured to discharge the air that has passed through the second heat exchanger 1063 to the outside, and illustrates the blower motor 1073 coupled to the blower fan 1071 from the rear of the blower fan 1071. At least a portion of each of the blower fan 1071 and the blower motor 1073 can be disposed within the extension space 1381 of the inlet extension 138 described above.

Referring back to FIG. 4, the water collector 1065 in which the condensed water removed from the air through the first heat exchanger 1062 is received is shown. As described above, the air supply 106 can be disposed on one side in the lateral direction Y of the base 105, and the water collector 1065 and the compressor 1066 can be disposed on the other side in the lateral direction Y of the base 105.

In some implementations, as the driving part 400 for rotating the drum 200 is disposed at the rear plate 110, a space on the base 105 can be effectively secured, and a size and a capacity of the water collector 1065 can be effectively increased.

In one example, the compressor 1066 can be disposed at the rear of the water collector 1065. Accordingly, it is possible to minimize transmission of noise and vibration generated by an operation of the compressor 1066 to the user.

Figure 7:
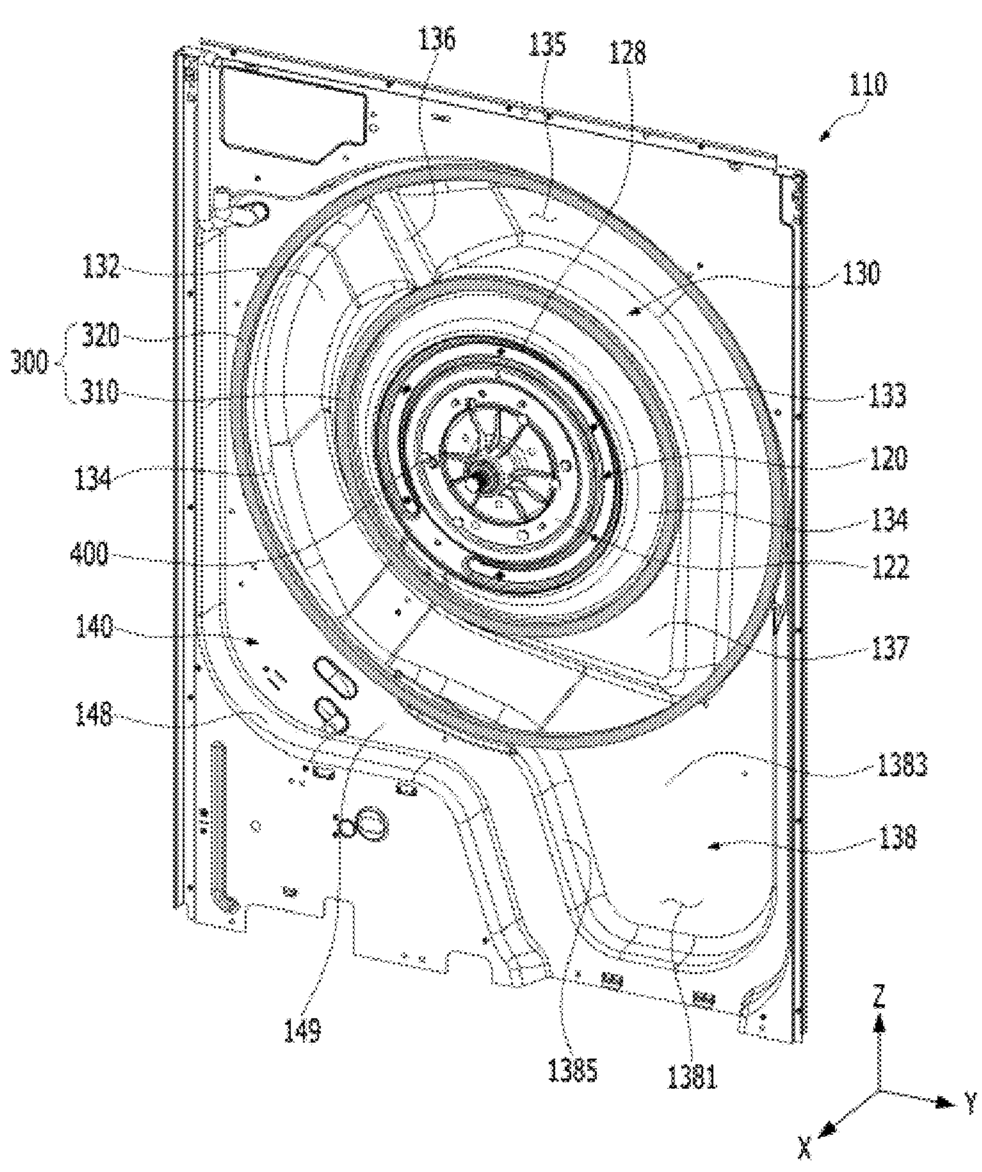
FIG. 7 is a perspective view illustrating an exemplary rear plate in a laundry treating apparatus viewed from the front.
Figure 8:
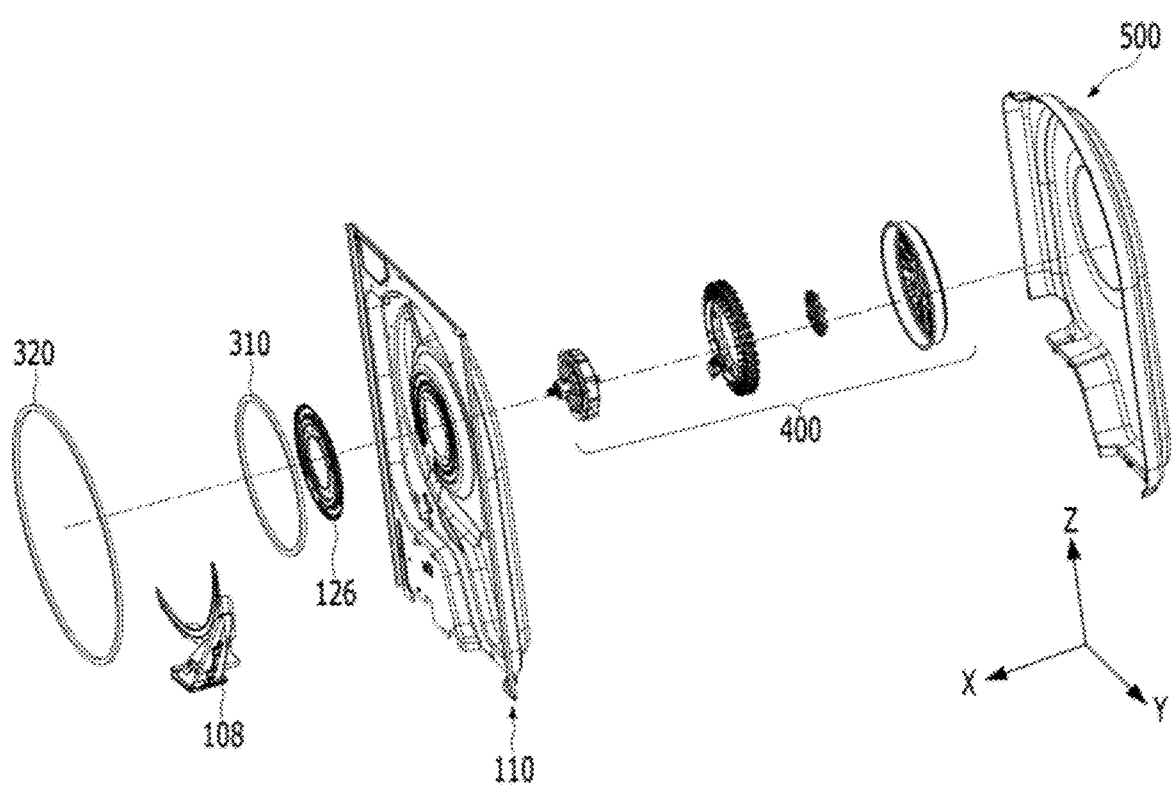
FIG. 8 is an exploded view illustrating an example of components coupled to a rear plate in a laundry treating apparatus.

In one example, FIG. 7 illustrates the rear plate 110 viewed from the front, in which various components are coupled to each other, and FIG. 8 is an exploded view of the various components coupled to the rear plate 110.

The component that can be coupled or connected to the rear plate 110 will be described with reference to FIGS. 7 and 8 focusing on the rear plate 110.

The rear plate 110 can be disposed at the rear portion of the cabinet 100 to define the rear surface of the cabinet 100. The rear plate 110 can include the driving part mounting portion 120 disposed to face the drum rear surface 210, and the air flow portion 130 providing the air to the drum 200.

The rear sealer 300 configured to prevent the air from leaking from the air flow portion 130 to the outside can be disposed in front of the rear plate 110. That is, the rear sealer 300 can be disposed at a front surface of the rear plate 110.

In some implementations, the air flow portion 130 can be formed in the annular shape and extend along a circumference of the driving part mounting portion 120, and the rear sealer 300 can include the inner sealer 310 and the outer sealer 320. The inner sealer 310 can extend along the inner circumference of the air flow portion 130, and the outer sealer 320 can extend along the outer circumference of the air flow portion 130.

The outer sealer 320 can prevent or suppress the air flowing out from the air flow portion 130, and the inner sealer 310 can prevent or suppress the air leaking from the air flow portion 130 from leaking toward the driving part mounting portion 120.

The rear plate 110 can further include the inlet extension 138 extending from the air flow portion 130 toward the air supply 106. Therefore, the outer circumference of the air flow portion 130 can be opened at a side of the inlet extension 138, but the outer sealer 320 can be formed in the annular shape defining the closed cross-section and extending between the air flow portion 130 and the inlet extension 138.

In one example, the fan duct 108 can be disposed in front of the rear plate 110 to supply the air to the flow space 135 inside the air flow portion 130 through the inlet extension 138. At least a portion of the fan duct 108 can be inserted into the extension space 1381 inside the inlet extension 138 and be coupled to the air flow portion 130.

The fan duct 108 can be coupled and fixed to the blower 107 of the air supply 106, and can be coupled and fixed to the rear plate 110 together with the blower 107.

In one example, the mounting bracket 126 can be coupled to the driving part mounting portion 120 from the front of the driving part mounting portion 120. That is, the mounting bracket 126 can be disposed at a front surface of the driving part mounting portion 120. A strength of the driving part mounting portion 120 can be reinforced by the mounting bracket 126, and a coupling stability of the driving part 400 can be strengthened.

A central portion of the driving part mounting portion 120 can be penetrated by the driving part 400, and a central portion of the mounting bracket 126 can also be penetrated by the driving part 400. That is, the mounting bracket 126 can extend along a circumferential direction of the driving part mounting portion 120 and surround at least a portion of the driving part 400. At least a portion of the driving part mounting portion 120 can be shielded from the front by the mounting bracket 126.

In one example, the driving part 400 can be coupled to the rear plate 110 from the rear of the rear plate 110. The driving part 400 can be coupled by being inserted at least partially into the driving part mounting portion 120 of the rear plate 110. The driving part 400 can be coupled to the mounting bracket 126 through the driving part mounting portion 120.

The driving part 400 can include the first driving part 410 and the second driving part 420, wherein the first driving part 410 can be directly coupled to the driving part mounting portion 120, and the second driving part 420 can be coupled to and fixed to the first driving part 410.

The driving part 400 can include the driving shaft 430 protruding frontward and the bearing extension 440 surrounding a portion of the driving shaft 430, wherein the driving shaft 430 can pass through the bearing extension 440 and extend frontward.

The driving shaft 430 and the bearing extension 440 can pass through the driving part mounting portion 120 and the mounting bracket 126 and extend towards the rear surface central portion 220 of the drum rear surface 210.

In one example, the rear cover 500 can be disposed at the rear of the rear plate 110. The rear cover 500 can be coupled to the rear plate 110 from the rear of the rear plate 110. The rear cover 500 can cover an entirety of the rear plate 110, or shield a portion of each of the air flow portion 130, the driving part 400, and the like.

Figure 9:
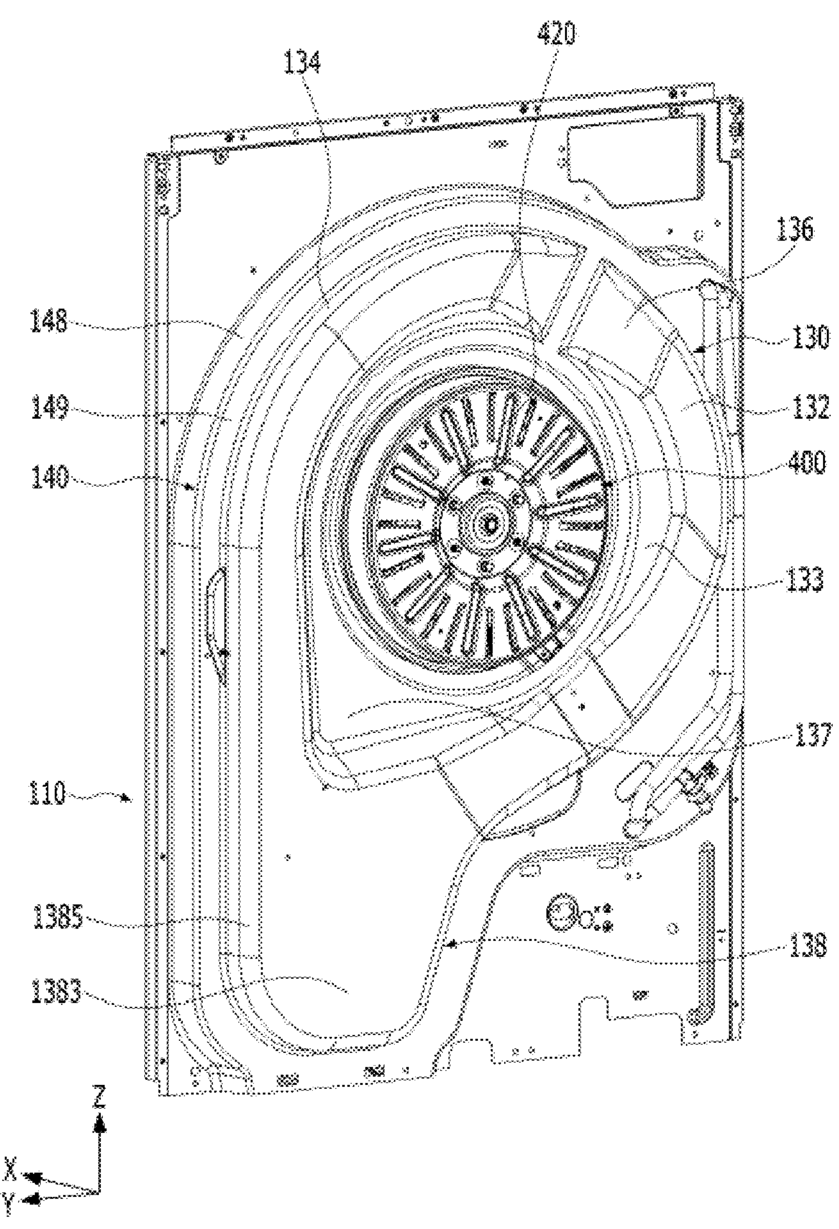
FIG. 9 is a schematic view illustrating an example of a rear plate from which a rear cover is removed.

FIG. 9 is a view illustrating an exemplary state in which the rear cover 500 is removed from the rear plate 110.

Referring to FIG. 9, the rear plate 110 can be formed such that the air flow portion 130 and the inlet extension 138 protrude rearward, and can have a rear protrusion 140 having a larger cross-sectional area than the air flow portion 130 and the inlet extension 138.

In some implementations, the rear cover 500 can be coupled to the rear plate 110 to cover the rear protrusion 140, the air flow portion 130, and the inlet extension 138. A portion of the rear plate 110 that is not covered by the rear cover 500 and is exposed to the outside in FIG. 9 can correspond to a rear reference surface, and the rear protrusion 140 and the air flow portion 130 can protrude in a rearward direction of the rear reference surface.

The driving part 400 at least partially inserted into and coupled to the inside of the driving part mounting portion 120 from the rear of the driving part mounting portion 120 can be shielded from the outside by the rear cover 500. In some implementations, the driving part 400 can be protected from external impact or the like as the driving part mounting portion 120 is disposed at the front, the rear cover 500 is disposed at the rear, and the air flow portion 130 disposed at a circumference of the driving part 400.

In some implementations, the rear cover 500 can be formed in a shape corresponding to the rear protrusion 140, the air flow portion 130, and the inlet extension 138 of the rear plate 110. That is, the rear cover 500 can include a protruding cover having a shape corresponding to the rear protrusion 140 and protruding rearward to define a space therein, and a flow cover protruding rearward from the protruding cover to define a space therein.

In some implementations, the flow cover can include a cover circumference 510 disposed at the rear of the air flow portion 130, and a central cover disposed at a central portion of the cover circumference 510 and disposed at the rear of the driving part 400.

Figure 10:
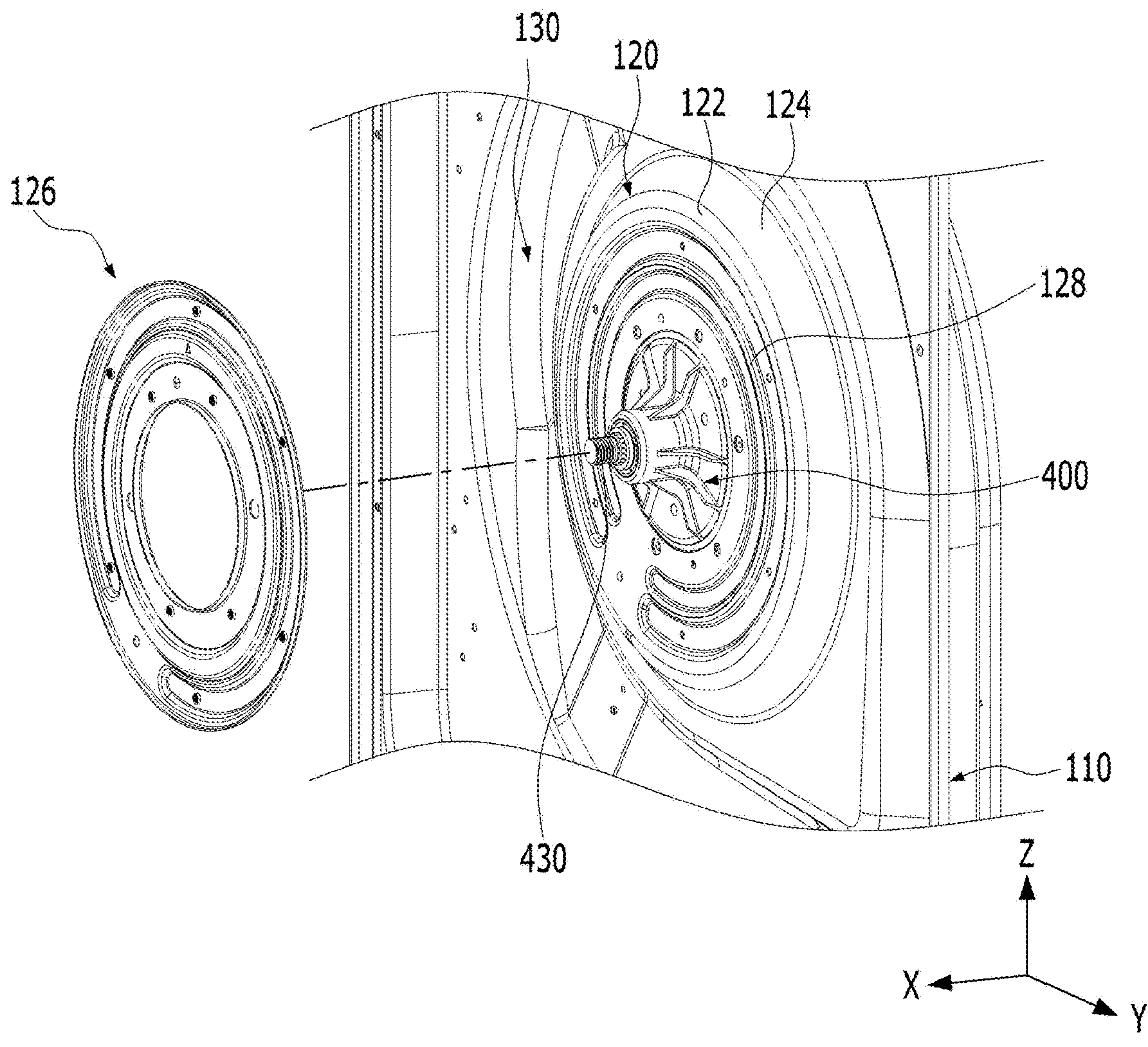
FIG. 10 is a schematic view illustrating an example of a mounting bracket separated from a rear plate in a laundry treating apparatus.

In one example, FIG. 10 illustrates the driving part mounting portion 120 and the mounting bracket 126. The driving part mounting portion 120 can protrude frontward from the rear plate 110, and the driving part 400 can be coupled to the driving part mounting portion 120 from the rear, so that at least a portion of the driving part 400 can extend frontward through the driving part mounting portion 120.

The driving part mounting portion 120 can include a mounting side surface 124 protruding frontward from the rear plate 110 and forming a circumference of the driving part mounting portion 120, and the driving part mounting portion 120 coupled to a front end of the mounting side surface 124 and to which the driving part 400 is coupled from the rear. In some implementations, the driving part mounting portion is not in contact with the second driving part.

The driving part mounting portion 120 can include a bracket seating portion 128 having a front surface to which the mounting bracket 126 can be coupled.

The bracket seating portion 128 can include a mounting reinforcement portion extending along a circumferential direction of a mounting front surface 122 for reinforcement of rigidity. The mounting reinforcement portion can be formed as a portion of the bracket seating portion 128 or the mounting front portion 122, wherein the mounting reinforcement portion can be bent or curved, and can be formed in an annular shape with one open side.

In some implementations, when the mounting reinforcement portion is formed in the annular shape with one open side, the mounting reinforcement portion can be configured such that one end and the other end thereof are spaced apart from each other and face each other. A power port for power supply of the driving part 400 can be disposed at the rear of the spaced region defined between said one end and the other end.

The mounting bracket 126 can include an integrated fastener to which the mounting front surface 122 and the driving part 400 are coupled together via an integrated fastening member, and can include a mounting fastener coupled to the mounting front surface 122 except for the driving part 400 via a mounting fastening member.

The mounting bracket 126 can include a mounting guide formed in a shape corresponding to the mounting reinforcement portion, and the mounting guide can be formed as a portion of the mounting bracket 126, wherein the mounting bracket is bent or curved to protrude rearward.

The mounting guide can be configured to guide a coupling position of the mounting bracket 126 by being inserted into the mounting reinforcement portion. For example, the mounting guide can have the annular shape with one open side, and the coupling position of the mounting bracket 126 can be guided by the open side based on the circumferential direction.

Figure 11:
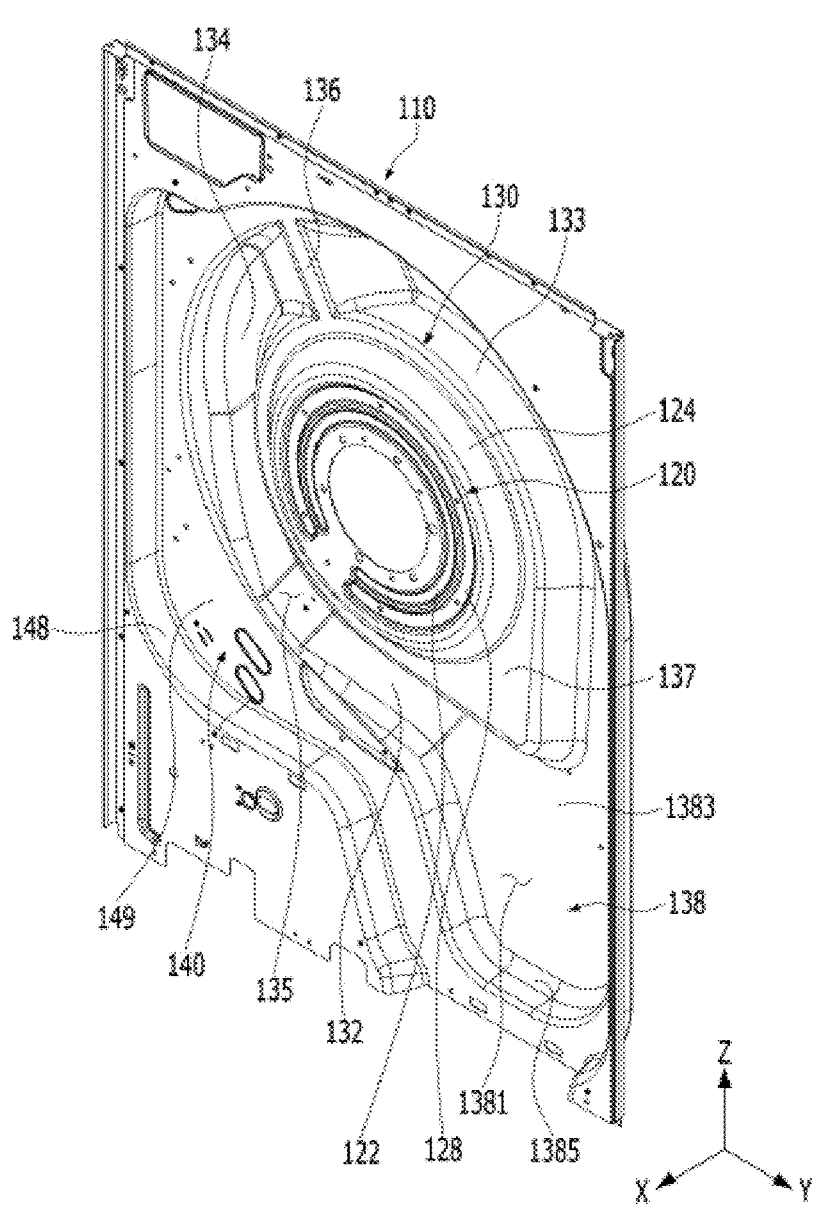
FIG. 11 is a schematic view illustrating an exemplary air flow portion defined in a rear plate in a laundry treating apparatus.
Figure 12:
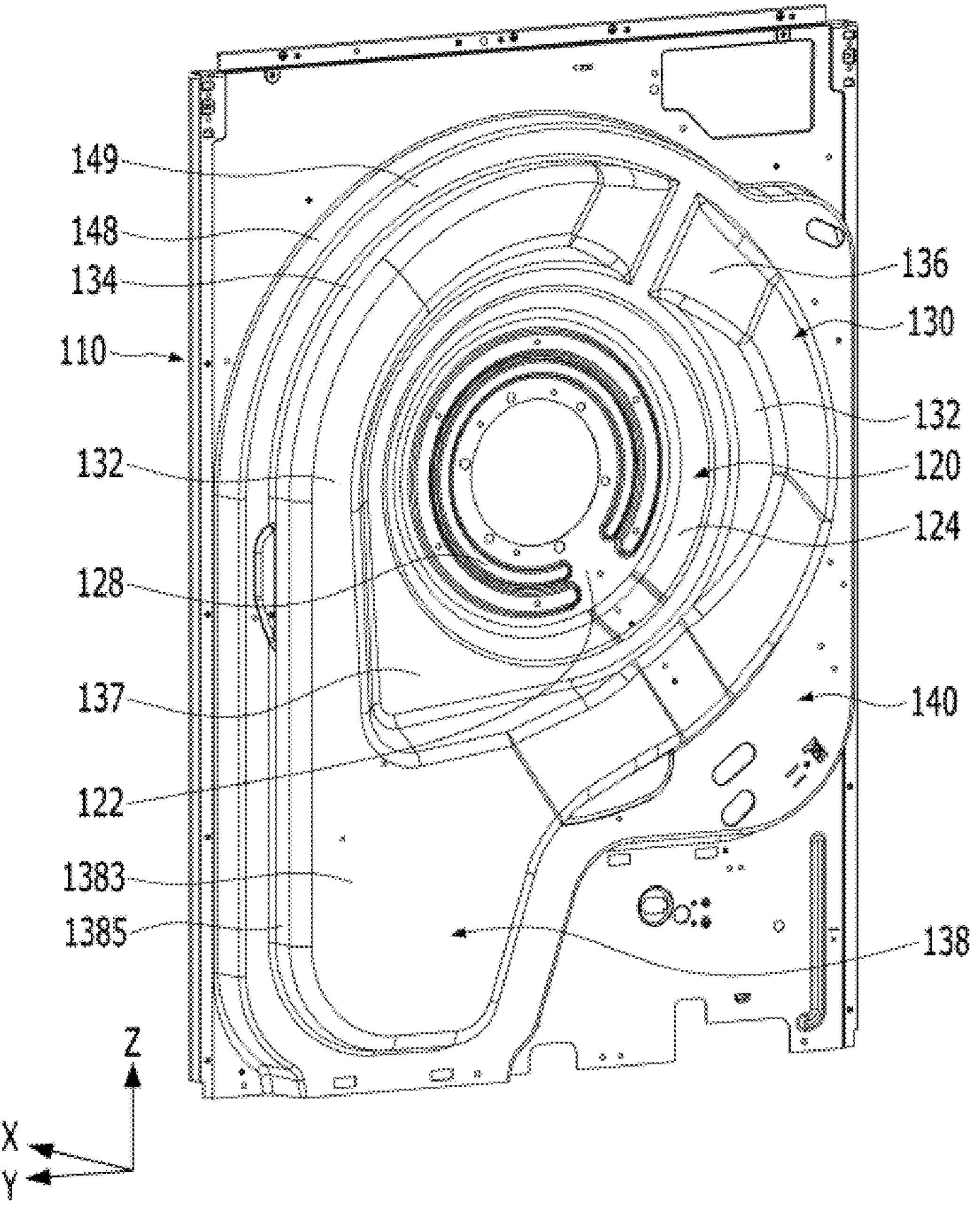
FIG. 12 is a schematic view illustrating an exemplary air flow portion viewed from the rear of a rear plate.
Figure 13:
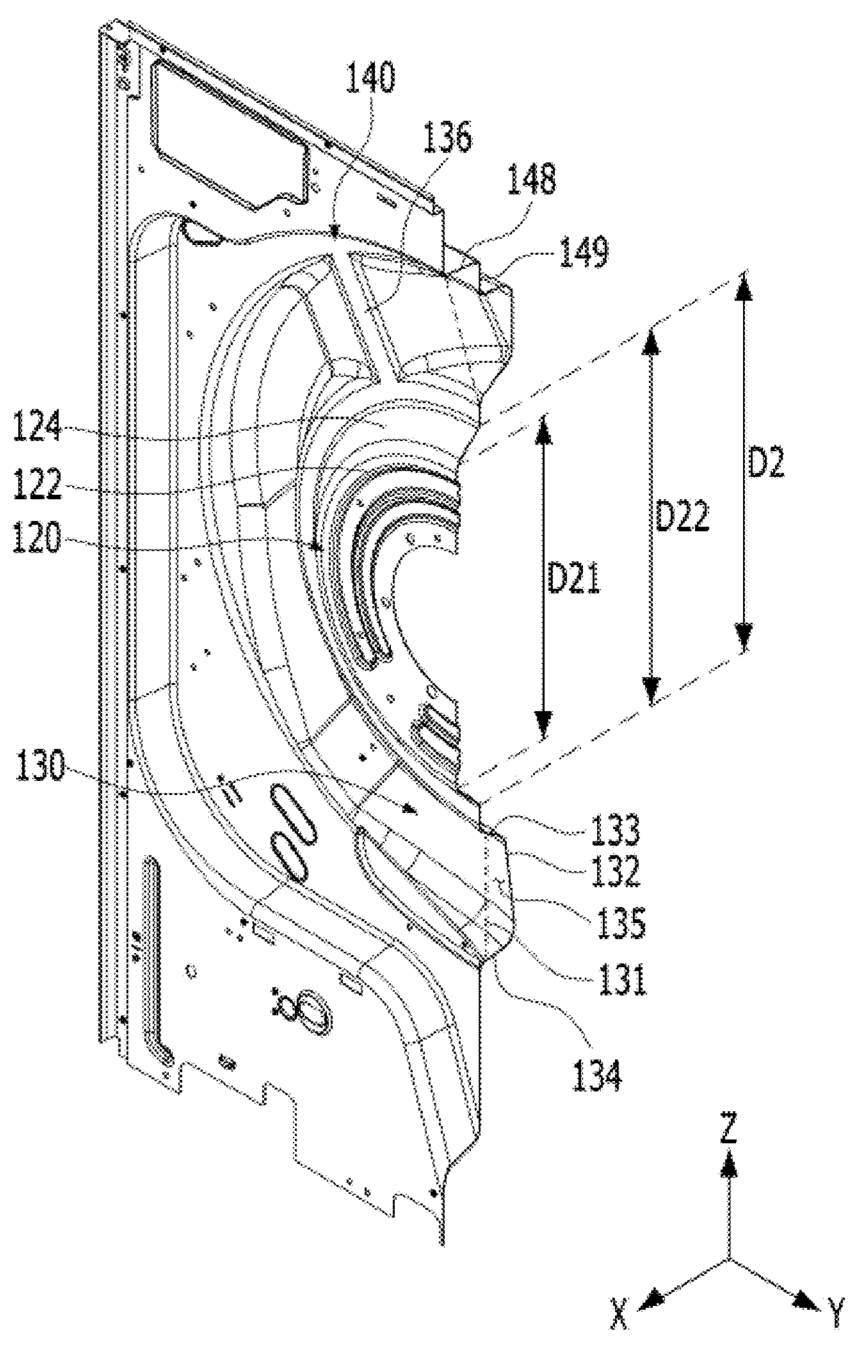
FIG. 13 is a perspective view illustrating a cross-section of a rear plate.

In one example, FIG. 11 is a view illustrating the air flow portion 130 of the rear plate 110 in the laundry treating apparatus 10, FIG. 12 is a view illustrating the air flow portion 130 of the rear plate 110 viewed from the rear, and FIG. 13 is a cross-sectional view of the rear plate 110 viewed from the side. The rear plate 110 will be described in detail with reference to FIGS. 11 to 13 as follows.

In some implementations, the laundry treating apparatus 10 can include the cabinet 100, the drum 200, and the driving part 400. The cabinet 100 can have the rear plate 110 disposed at the rear surface thereof. The drum 200 can be rotatably disposed inside the cabinet 100, can accommodate the laundry therein, and can have the drum rear surface 210 facing the rear plate 110. The driving part 400 can be disposed at the rear of the rear plate 110, and can be coupled to the drum 200 through the rear plate 110.

Referring to FIGS. 11 to 13, the rear plate 110 can include the driving part mounting portion 120 to which the driving part 400 is coupled, and the air flow portion 130 surrounding the driving part mounting portion 120 and providing air to the drum 200. The air flow portion 130 can include the flow space 135 in which the air flows, and the front surface 131 of the air flow portion 130 can be opened to forwardly expose the flow space 135.

In some implementations, the driving part 400 for driving the drum 200 cannot be disposed inside the cabinet 100, but can be disposed at the rear of the rear plate 110. The driving shaft 430 of the driving part 400 coupled to the driving part mounting portion 120 of the rear plate 110 can be disposed on the same line as the rotation shaft of the drum 200, and the driving shaft 430 can be coupled to the drum 200 and configured to provide the rotation force to the drum 200.

When the driving part 400 is disposed inside the cabinet 100, for example, on the base 105, because the disposition space of the driving part 400 along with the air supply 106 and the heat pump of the base 105 must be secured, it can be difficult to secure a size of each component as necessary as the space becomes narrow.

In some implementations, the driving shaft 430 of the driving part 400 and the rotation shaft of the drum 200 are separated from each other. Accordingly, separate power transmission means, for example, the belt or the like, for transmitting the rotation force from the driving shaft 430 to the drum 200 is required. When the rotation force is transmitted to the drum 200 using the belt, there may be restrictions in controlling the rotation speed and the rotation direction of the driving shaft 430 due to slipping of the belt.

In one example, even when the driving part 400 is disposed at the rear of the drum 200 and the driving shaft 430 of the driving part 400 coincides with the rotation shaft of the drum 200, when the driving part 400 is disposed inside the cabinet 100, it may be disadvantageous because the capacity of the drum 200 is reduced to secure the disposition space of the driving part 400.

However, in some embodiments, the driving part mounting portion 120 can be defined in the rear plate 110, and the driving part 400 is coupled to the driving part mounting portion 120 from the rear of the rear plate 110, so that ease of disposition of each component can be improved and it can be advantageous to secure the capacity of the drum 200 as the driving part 400 is removed from the inside of the cabinet 100, and it can be advantageous in controlling the rotation speed and the rotation direction of the driving part 400 and in establishing an efficient rotation strategy of the drum 200 as the drum 200 and the driving part 400 are directly coupled to each other.

In some implementations, the rear plate 110 can include the air flow portion 130. In the air flow portion 130, the air to be provided into the drum 200 for the drying of the laundry may flow.

That is, the flow space 135 in which the air flows can be defined inside the air flow portion 130. FIG. 11 illustrates the air flow portion 130 including the flow space 135.

The air flow portion 130 can be integrally formed with the rear plate 110 or can be separately manufactured and coupled to the rear plate 110. FIGS. 11 to 13 illustrate a state in which the air flow portion 130 is integrally molded with the rear plate 110.

When the air flow portion 130 is integrally molded with the rear plate 110, it is advantageous because a situation in which air leaks from a coupling portion between the air flow portion 130 and the rear plate 110 can be prevented in advance.

In addition, the air flow portion 130 can be formed in the shape in which the front surface 131 thereof is opened. As the front surface 131 of the air flow portion 130 is open, the flow space 135 inside the air flow portion 130 can be exposed frontward. Accordingly, the air flowing through the flow space 135 can leak frontward through the open front surface 131 of the air flow portion 130 and be supplied to the air passage 230 of the drum rear surface 210.

In some implementations, it may be advantageous that the front surface 131 of the air flow portion 130 itself has the open shape. For example, when a plurality of holes are defined in the front surface or the front surface is formed in a grill shape in which the front surface of the air flow portion 130 is closed, a flow resistance resulting from a part other than the hole can occur in the process in which the air leaks frontward, and a flow rate of the air flowing toward the drum rear surface 210 can be reduced.

In some implementations, as the entirety of the front surface 131 of the air flow portion 130 is opened, the air flowing through the flow space 135 can effectively flow frontward. However, when necessary, only a portion of the front surface 131 of the air flow portion 130 can be opened.

In some implementations, the air flow portion 130 can protrude rearward from the rear plate 110 such that the flow space 135 is defined therein. That is, the air flow portion 130 can protrude rearward from the rear plate 110, the space can be defined inside the air flow portion 130, and the front surface 131 can be opened.

The air flow portion 130 can be manufactured separately from the rear plate 110 and coupled onto the rear surface of the rear plate 110, but FIGS. 11 to 13 show an exemplary state in which the air flow portion 130 is defined by molding a portion of the rear plate 110 to protrude rearward.

In some implementations, as the air flow portion 130 does not protrude forwardly of the rear plate 110 and protrudes rearward and has the flow space 135 defined therein, it is possible to effectively secure the space inside the cabinet 100 and effectively secure the capacity of the drum 200.

In some implementations, the air flow portion 130 can protrude rearward as the rear plate 110 is bent or curved to define the flow space 135 therein that is opened forwardly.

In some implementations, the air flow portion 130 can be defined as a portion of the rear plate 110. That is, the portion of the rear plate 110 can be formed to protrude rearward to define the air flow portion 130.

In one example, the portion of the rear plate 110 can be formed to protrude rearward through a pressing process of the rear plate 110, thereby integrally molding the air flow portion 130 with the rear plate 110 to efficiently prevent a situation in which the air leaks from the flow space 135.

Furthermore, when the air flow portion 130 is separately manufactured and coupled to the rear plate 110, a manufacturing process of the air flow portion 130, a coupling process of the air flow portion 130, and a sealing process between the air flow portion 130 and the rear plate 110 are required. In some implementations, the above manufacturing process can be omitted by molding the air flow portion 130 as the portion of the rear plate 110 in a processing process of the rear plate 110, which may be advantageous.

In some implementations, the air flow portion 130 can include a flow inner circumferential surface 133, a flow outer circumferential surface 134, and a flow recessed surface 132. As described above, the air flow portion 130 can surround the driving part mounting portion 120 and can be formed in the annular shape.

The flow inner circumferential surface 133 can protrude and extend rearward from the rear plate 110, and can extend along an inner circumference of the flow space 135. The flow inner circumferential surface 133 can be formed in the annular shape and extended to surround the driving part mounting portion 120. The flow inner circumferential surface 133 can protrude rearward from the rear plate 110 to surround the driving part 400. A specific cross-sectional shape of the flow inner circumferential surface 133 can be the annular shape corresponding to a cross-sectional shape of the driving part mounting portion 120.

The flow outer circumferential surface 134 can protrude rearward from the rear plate 110, and can extend along an outer circumference of the flow space 135. The flow outer circumferential surface 134 can be spaced apart from the flow inner circumferential surface 133 to define the flow space 135 there between.

The flow outer circumferential surface 134 can be disposed outwardly of the flow inner circumferential surface based on a radial direction of the air flow portion 130 formed in the annular shape, and can form a closed cross-section or can have one open side to be coupled to an inlet circumference of the inlet extension 138.

An extending recessed surface 1383 can be disposed at the rear of the drum rear surface 210 and can be formed in the annular shape. An inner circumference of the extending recessed surface 1383 can be coupled to the flow inner circumferential surface 133 and an outer circumference thereof can be coupled to the flow outer circumferential surface 134 to define the flow space 135.

In some implementations, the drum rear surface 210 can be disposed in front of the extending recessed surface 1383 and the extending recessed surface 1383 can be disposed in parallel with the drum rear surface 210. The extending recessed surface 1383 can be disposed to face the air passage 230, and the extending recessed surface 1383 can be disposed to directly face the air passage 230 through the open front surface 131.

In some implementations, the air flow portion 130 can be formed as the portion of the rear plate 110, wherein the rear plate is bent or curved rearward, and can include the flow inner circumferential surface 133, the flow outer circumferential surface 134, the flow recessed surface 132, and the open front surface 131. The flow space 135 defined by the flow inner circumferential surface 133, the flow outer circumferential surface 134, and the flow recessed surface 132 can be exposed toward the drum rear surface 210 through the open front surface 131.

In some implementations, the rear plate 110 includes the rear protrusion 140 having the space defined therein and protruding rearward, and the air flow portion 130 can protrude rearward from the rear protrusion 140.

Specifically, the rear protrusion 140 can protrude rearward from the rear plate 110. The rear protrusion 140 can be manufactured separately and coupled to the rear plate 110, or the rear protrusion 140 can be formed as the portion of the rear plate 110 and formed to protrude rearward as shown in FIGS. 11 to 13.

The rear protrusion 140 can have the space defined therein, and the space can be opened frontward. That is, the inner space of the cabinet 100 can be increased as much as the rear protrusion 140 protrudes rearward from the rear plate 110.

In some implementations, as the rear protrusion 140 is disposed on the rear plate 110, it is possible to effectively increase the limited inner space of the cabinet 100. Furthermore, as the space at the rear of the drum 200 increases, the size and the capacity of the drum 200 can be effectively increased.

In one example, the rear protrusion 140 can include the rear outer circumferential surface 148 and the rear protruding surface 149. The rear outer circumferential surface 148 can extend rearward from the rear plate 110 and surround the rear protrusion 140, and the rear protruding surface 149 can be connected to the rear outer circumferential surface 148 at the rear of the rear protrusion 140. The air flow portion 130 can protrude rearward from the rear protruding surface 149.

Specifically, the rear outer circumferential surface 148 can extend rearward from the rear plate 110 to surround the rear protrusion 140. That is, the rear outer circumferential surface 148 can surround the inner space of the rear protrusion 140.

Referring to FIGS. 11 to 13, the rear plate 110 can include the rear reference surface positioned outwardly of the rear protrusion 140. The rear reference surface can have a flat plate shape and can surround a circumference of the rear protrusion 140.

In some implementations, the rear reference surface can be a reference for defining positions of the rear protrusion 140 and the air flow portion 130.

The rear outer circumferential surface 148 can protrude and extend rearward from the rear reference surface of the rear plate 110. The rear outer circumferential surface 148 can extend along the circumference of the rear protrusion 140. That is, the rear outer circumferential surface 148 can extend to surround the inner space of the rear protrusion 140.

The rear outer circumferential surface 148 can be formed in the annular shape forming the closed cross-section, or can be formed in a shape in which one side of the annular shape is open. The rear outer circumferential surface 148 can extend in a shape corresponding to the air flow portion 130.

For example, when viewed from the rear of the rear plate 110, the rear outer circumferential surface 148 can be spaced outwardly apart from the flow outer circumferential surface 134 of the air flow portion 130 and extend to surround the air flow portion 130 and the inlet extension 138.

In one example, the rear protruding surface 149 can be disposed in a rearward direction of the rear reference surface, and can be in parallel with the rear reference surface. The rear protruding surface 149 can be coupled to the rear outer circumferential surface 148 and can shield the space inside the rear protrusion 140 from the rear.

The air flow portion 130 can protrude rearward from the rear protrusion 140. Accordingly, the extending recessed surface 1383 of the air flow portion 130 can be disposed in a rearward direction of the rear protruding surface 149 of the rear protrusion 140. The flow outer circumferential surface 134 of the air flow portion 130 can be the same as or disposed inwardly of the rear outer circumferential surface 148 with respect to a radial direction of the air flow portion 130, and the flow outer circumferential surface 134 can extend rearward from the rear protruding surface 149.

The flow inner circumferential surface 133 can be disposed inwardly of the rear outer circumferential surface 148 and can protrude rearward from the rear protruding surface 149. A length of the flow inner circumferential surface 133 and a length the flow outer circumferential surface 134 extending rearward from the rear protruding surface 149 may be the same, or may be different when necessary.

One implementation of the present disclosure may secure the space at the rear of the drum 200 and effectively increase the capacity of the drum 200 as the rear protrusion 140 protruding rearward is disposed on the rear plate 110.

In some implementations, at least a portion of the drum rear surface 210 can protrude in a rearward direction of the drum 200, thereby increasing an internal capacity of the drum 200.

Furthermore, in some implementations, as the air flow portion 130 protrudes rearward from the rear protruding surface 149 of the rear protrusion 140, the air of the air flow portion 130 can be effectively transferred to the drum rear surface 210 in a state in which at least a portion of the drum 200 is inserted into the rear protrusion 140.

In some implementations, the driving part mounting portion 120 can protrude frontward from the rear plate 110 to define the space in a rearward direction. The driving part mounting portion 120 can protrude frontward from the rear protrusion 140 and be surrounded by the air passage 230. The driving part mounting portion 120 can protrude frontward from the rear protruding surface 149 of the rear protrusion 140.

The driving part mounting portion 120 can include the mounting side surface 124 that extends frontward from the rear protrusion 140, and the mounting front surface 122 positioned forwardly of the rear protruding surface 149 and coupled to the mounting side surface 124.

The mounting side surface 124 can protrude frontward from the rear protruding surface 149 and can extend along the circumference of the driving part mounting portion 120. That is, the mounting side surface 124 can form a circumferential surface of the driving part mounting portion 120. The mounting side surface 124 can surround the driving part 400 coupled to the driving part mounting portion 120 at the rear of the rear plate 110.

The mounting side surface 124 can be formed in the annular shape, and can have the space defined therein. The mounting front surface 122 can shield the space from the front.

The mounting front surface 122 can be coupled to the driving part 400 from the rear, and can be coupled to the above-described mounting bracket 126 from the front. In some implementations, the driving part mounting portion 120 protrudes frontward to define the space therein, and the space is opened rearward and at least a portion of the driving part 400 is inserted into and coupled to the space, so that a length in which the driving part 400 protrudes rearward from the rear plate 110 may be minimized, and the driving part 400 can be stably fixed and supported. The driving part mounting portion 120 can protrude frontward from the rear protrusion 140. In some implementations, the mounting front surface 122 can be positioned in a rearward direction of the rear reference surface.

In some implementations, the rear plate 110 can include the inlet extension 138 extending from the air flow portion 130. The inlet extension 138 can protrude rearward from the rear reference surface or protrude rearward from the rear protruding surface 149 of the rear protrusion 140.

FIGS. 11 to 13 illustrate the inlet extension 138 protruding rearward from the rear protruding surface 149. The inlet extension 138 can protrude rearward to define the extension space 1381 therein. The extension space 1381 can be in a shape extending from the flow space 135 of the air flow portion 130.

The inlet extension 138 can include the extending recessed surface 1383 and an extending circumferential surface 1385. The extending recessed surface 1383 can shield the extension space 1381 from the rear of the extension space 1381. The extending recessed surface 1383 can extend from the flow recessed surface 132. In some implementations, the extending recessed surface 1383 and the flow recessed surface 132 can form one surface positioned in a rearward direction of the rear protruding surface 149.

The extending circumferential surface 1385 can surround the extension space 1381. The extending recessed surface 1383 can be coupled to a rear end of the extending circumferential surface 1385. The extending circumferential surface 1385 can extend from the flow outer circumferential surface 134 of the air flow portion 130.

Referring to FIG. 11, the flow outer circumferential surface 134 can be formed in the annular shape opened at a location between the air flow portion 130 and the inlet extension 138. In some implementations, the flow outer circumferential surface 134 can be opened such that one side and the other side thereof are spaced apart from each other, so that the flow space 135 and the extension space 1381 can be connected to each other.

A flow circumferential surface can be coupled to said one side and the other side of the flow outer circumferential surface 134 and can extend along a circumference of the extension space 1381. That is, the flow circumferential surface can form one closed cross-section including the air flow portion 130 and the inlet extension 138 together with the flow outer circumferential surface 134. A length in which the flow circumferential surface extends rearward from the rear protruding surface 149 can be the same as that of the flow outer circumferential surface 134.

In some implementations, the rear plate 110 can have a stepped shape when viewed from the side as the rear protrusion 140 and the air flow portion 130 are formed thereon. FIG. 13 illustrates a cross-sectional shape of the rear plate 110 stepped by the rear protrusion 140, the air flow portion 130, and the like.

In some implementations, the air flow portion 130 can have an air guide. The air flow portion 130 can have a protruding shape in the flow space 135, and can guide the flow of air in the flow space 135.

The air guide can protrude from an inner surface facing the flow space 135 of the air flow portion 130. For example, the air guide can protrude from the flow inner circumferential surface 133, the flow outer circumferential surface 134, or the flow recessed surface 132 of the air flow portion 130.

The air guide can include at least one of an outflow guide 136 and an inflow guide 137. For example, FIGS. 11 to 13 illustrate the outflow guide 136 and the inflow guide 137 disposed inside the air flow portion 130.

Specifically, the outflow guide 136 can have a shape protruding from the flow recessed surface 132 toward the open front surface 131 of the air flow portion 130. The outflow guide 136 can be molded integrally with or manufactured separately from the flow recessed surface 132 and disposed inside the air flow portion 130.

FIGS. 11 to 13 illustrate the outflow guide 136 integrally molded with the flow recessed surface 132. The outflow guide 136 can be formed such that a portion of the flow recessed surface 132 protrudes toward the open front surface 131, that is, the drum rear surface 210.

In some implementations, the outflow guide 136 can protrude from the flow space 135 toward the drum rear surface 210. Accordingly, the air flowing through the flow space 135 may flow upwards toward the drum rear surface 210 while passing the outflow guide 136.

In the air flow portion 130, as the air is introduced through the air supply 106 connected to the inlet extension 138 and the air flows in the flow space 135, and as the outflow guide 136 is defined in the air flow portion 130, it is possible to sufficiently secure a flow rate of air toward the drum rear surface 210 in a portion where the flow rate or a hydraulic pressure of the air is insufficient, and it is possible to effectively improve uniformity of the air supplied to the drum rear surface 210.

In some implementations, as illustrated in FIG. 11, the outflow guide 136 can protrude frontward from the flow recessed surface 132, and can be formed as the flow recessed surface 132 is bent or curved.

Accordingly, the outflow guide 136 can have a form extending from the flow recessed surface 132, and can have a form coupled to the flow inner circumferential surface 133 and/or the flow outer circumferential surface 134. In some implementations, the outflow guide 136 in the flow space 135 is defined without a spaced portion with the flow inner circumferential surface 133, the flow outer circumferential surface 134, and the flow recessed surface 132, so that the outflow guide 136 may effectively flow the air passing toward the drum rear surface 210.

In some implementations, as the outflow guide 136 is defined as the flow recessed surface 132, the flow inner circumferential surface 133, and the flow outer circumferential surface 134 are bent or curved, the outflow guide 136 can be formed by a molding process of the rear plate 110 without a separate process for defining the outflow guide 136, so that manufacturing efficiency may be effectively improved.

In one example, the outflow guide 136 can be formed in a shape extending along the circumferential direction of the air flow portion 130 from the flow space 135, and can include a guide central portion and a guide inclined portion. The guide central portion can include a portion protruding from the outflow guide 136, and the guide inclined portion can extend along the circumferential direction of the air flow portion 130 from the guide central portion.

The guide central portion can correspond to the portion protruding from the outflow guide 136, and can include one surface in parallel with the flow recessed surface 132 without the outflow guide 136, the rear reference surface, or the drum rear surface 210.

The guide inclined portion can be formed such that a height protruding from the flow recessed surface 132 is gradually reduced in a direction away from the guide central portion. That is, the guide inclined portion can be inclined toward the flow recessed surface 132 from the guide central portion.

The guide inclined portions can be located on both sides of the guide central portion based on the circumferential direction of the air flow portion 130. That is, the guide inclined portions can extend in one direction and the other direction along the circumferential direction of the air flow portion 130 from the guide central portion, respectively, and the guide central portion can be positioned between a pair of guide inclined portions.

In some implementations, as the guide inclined portion with the protrusion height decreasing in the direction away from the central guide central portion is defined, the outflow guide 136 can effectively prevent the air passing through the outflow guide 136 from colliding with the outflow guide 136 to form a turbulent flow, and can effectively guide the forward flow of air.

In some implementations, the outflow guide 136 can include a first outflow guide and a second outflow guide. For example, FIG. 11 illustrates the air flow portion 130 with the first outflow guide and the second outflow guide.

The first outflow guide can be disposed on an opposite side of the air supply 106 or the inlet extension 138 with respect to a center of the air flow portion 130 formed in the annular shape. That is, the first outflow guide can be disposed on the opposite side of the air supply 106 or the inlet extension 138 with respect to the driving part mounting portion 120.

In some implementations, the air flow portion 130 or the flow space 135 can be formed in the annular shape to allow the air supplied from the air supply 106 to flow, and the air supply 106 is located on one side of the air flow portion 130, so that the air can flow in a manner of being separated in one direction and the other direction of the circumferential directions of the air flow portion 130.

In some implementations, a flow channel extending in one direction from the inlet extension 138 can be defined as a first extending flow channel, and a flow channel extending in the other direction can be defined as a second extending flow channel.

That is, the air flow portion 130 can include the first extending flow channel extending in one direction and the second extending flow channel extending in the other direction from the inlet extension 138, and the first extending flow channel and the second extending flow channel can be coupled to each other on an opposite side of the inlet extension 138. The first extending flow channel and the second extending flow channel can define the annular air flow portion 130 together.

In some implementations, the air supplied from the air supply 106 located in the inlet extension 138 can flow along the first extending flow channel and the second extending flow channel, and the air flowing along the first extending flow channel and the second extending flow channel can meet on the opposite side of the inlet extension 138 with respect to the center of the air flow portion 130.

The air flowing along the first extending flow channel and the second extending flow channel can have opposite flow directions. Accordingly, on the opposite side of the air supply 106 in the air flow portion 130, the air having the flow directions opposite to each other can collide with each other. This can cause stall and noise, which may be disadvantageous in forming the air flow towards the drum rear surface 210.

In some implementations, as the first outflow guide is disposed on the opposite side of the inlet extension 138 in the air flow portion 130, it is possible to allow the mutually opposing air to flow from the first outflow guide toward the drum rear surface 210 and to effectively prevent or suppress the mutually opposing air from colliding with each other in the opposing directions.

FIG. 11 illustrates an exemplary state in which the first outflow guide is disposed on the opposite side of the inlet extension 138. A position of the first outflow guide can be specifically determined based on a discharge direction of the air discharged from the fan duct 108 or based on a specific design of the air flow portion 130.

A height of the first outflow guide protruding from the flow recessed surface 132 can be the same as a depth of the air flow portion 130. For example, the protruding height of the first outflow guide can be the same as a length of the flow inner circumferential surface 133 or the flow outer circumferential surface 134 protruding rearward from the rear protruding surface 149. That is, the protruding height of the first outflow guide can be the same as a depth of the flow space 135 of the air flow portion 130.

In some implementations, as the first outflow guide shields a cross-section of the flow space 135 viewed from the circumferential direction of the flow space 135, the first outflow can effectively prevent the air having the flow directions opposite to each other from colliding with each other, and effectively guide the forward flow of air.

In one example, the second outflow guide can be positioned between the first outflow guide and the inlet extension 138 with respect to the circumferential direction of the air flow portion 130. That is, the second outflow guide can be defined on the first extending flow channel and/or the second extending flow channel.

The second outflow guide can guide the flow direction of the air such that the air flowing through the flow space 135 flows toward the drum rear surface 210. The second outflow guide can be defined in a portion where the air flow toward the drum 200 is relatively small or weak in the air flow portion 130 and configured to prevent air leakage of the air flow portion 130.

The second outflow guide can include a plurality of second outflow guides defined in each of the first extending flow channel and the second extending flow channel, or can be defined in one of the first extending flow channel and the second extending flow channel. FIG. 11 illustrates an exemplary state in which the second outflow guide is defined in the second extending flow channel.

In some implementations, the air can be supplied from the fan duct 108 to the flow space 135 by the blower fan 1071 of the blower 107, and the blower 107 can discharge the air using a centrifugal force of the blower fan 1071.

In addition, the blower 107 can have an opening defined in a tangential direction of the blower fan 1071 in the blower fan housing and configured to facilitate the discharge of air by the blower fan 1071, so that the air may be discharged through the opening. The fan duct 108 can be coupled to the opening and extend in the tangential direction of the blower fan 1071.

In some implementations, the air discharged from the fan duct 108 can have a flow direction parallel to the tangential direction of the blower fan 1071. In particular, the air can be discharged in one of the tangential directions of the blower fan 1071 and can have a discharge form in which a flow rate thereof decreases in a direction away from said one of the tangential directions.

In addition, in the fan duct 108, the discharge direction of the air can be determined structurally, and the discharge direction can be determined to be closer to one of the first extending flow channel and the second extending flow channel of the air flow portion 130.

In some implementations, the air discharged from the fan duct 108 to the flow space 135 can be concentrated in one direction for various reasons. Therefore, the same air flow rate may not be provided to the first extending flow channel and the second extending flow channel of the air flow portion 130 having the annular shape.

In some implementations, as the second outflow guide is defined in an extending flow channel with a small flow rate of air supplied from the air supply 106, it is possible to reduce a deviation of the flow rate of air discharged forward from the first extending flow channel and the second extending flow channel, and to effectively improve the uniformity of the air discharged from the entirety of the air flow portion 130.

For example, FIG. 11 illustrates the air flow portion 130 in which the fan duct 108 provides a greater air flow rate to the first extending flow channel extending along one of the circumferential directions of the air flow portion 130 and extending upwardly of the air supply 106, and the second extending flow channel is defined in the second outflow guide to compensate for the insufficient air flow rate and to improve the amount of air flowing out toward the drum rear surface 210.

However, in some implementations, the second outflow guide can be defined in the first extending flow channel. In addition, the plurality of second outflow guides can be defined in each of the first extending flow channel and the second extending flow channel. When necessary, the number of second outflow guides defined in the second extending flow channel can be greater than the number of second outflow guides defined in the first extending flow channel.

Specific positions and the number of second outflow guides can be determined in consideration of flow analysis of the air flowing through the flow space 135 or the uniformity of the air introduced through the drum rear surface 210.

In some implementations, the air guide of the air flow portion 130 can include the inflow guide 137, and the inflow guide 137 can be defined to guide the flow direction of the air discharged through the fan duct 108.

For example, the inflow guide 137 can be formed in a shape protruding from the interior of the air flow portion 130 toward the fan duct 108 or the inlet extension 138, and can be configured to flow the air discharged from the fan duct 108 in two directions.

As described above, the air discharged from the fan duct 108 can be concentrated in one of the first extending flow channel and the second extending flow channel for various reasons. Accordingly, a relatively insufficient air flow rate can be provided to the other of the first extending flow channel and the second extending flow channel.

For example, in some implementations, the air discharged from the fan duct 108 can be relatively concentrated in the first extending flow channel, and relatively little air can be introduced into the second extending flow channel.

In some implementations, the inflow guide 137 protruding toward the fan duct 108 can be defined in the air flow portion 130, and a portion of the air directed toward the first extending flow channel can be guided toward the second extending flow channel through the inflow guide 137, so that the deviation of the air flow rate between the first extending flow channel and the second extending flow channel can be effectively reduced.

The inflow guide 137 can be disposed between the center of the air flow portion 130 and the fan duct 108. The inflow guide 137 may be disposed to face the fan duct 108 and configured to guide the air flow.

The inflow guide 137 can be defined in the flow recessed surface 132 or defined in the flow inner circumferential surface 133. FIG. 11 illustrates an exemplary state in which the inflow guide 137 is defined in a portion facing the fan duct 108 in the flow inner circumferential surface 133.

The inflow guide 137 can be independently manufactured and coupled to the flow inner circumferential surface 133, or can be formed as a portion of the flow inner circumferential surface 133 protrudes toward the fan duct 108. FIG. 11 illustrates an exemplary state in which the inflow guide 137 is defined as the portion of the flow inner circumferential surface 133 facing the fan duct 108 to protrude so as to be close to the fan duct 108.

In some implementations, the portion of the flow inner circumferential surface 133 can be bent or curved to protrude toward the fan duct 108 to define the inflow guide 137, so that the inflow guide 137 can be defined without the separate process in addition to the molding process of the rear plate 110, which is advantageous in the manufacturing.

Referring to FIG. 11, the flow inner circumferential surface 133 can extend approximately in a straight line in a region defining the inflow guide 137, and can extend approximately circularly in the remaining region. That is, the flow inner circumferential surface 133 can be formed in a streamlined shape that becomes sharper toward a protruding end of the inflow guide 137. Accordingly, the inflow guide 137 can effectively separate the air discharged from the fan duct 108, thereby minimizing the occurrence of turbulent flow.

In one example, the first extending flow channel and the second extending flow channel can be defined between the flow inner circumferential surface 133 and the flow outer circumferential surface 134, a portion of the first extending flow channel can be defined between the inflow guide 137 and the flow outer circumferential surface 134, and a portion of the second extending flow channel may be defined between the inflow guide 137 and the flow outer circumferential surface 134.

That is, in each of the first extending flow channel and the second extending flow channel, an inflow region into which the air discharged from the fan duct 108 is introduced can be located between the inflow guide 137 and the flow outer circumferential surface 134.

In one example, the inflow guide 137 can be defined such that a width of the inflow region of the first extending flow channel is smaller than a width of an inflow region of the second extending flow channel. That is, the inflow region of the first extending flow channel can have the smaller width than the inflow region of the second extending flow channel by the inflow guide 137, and the width can be understood as a distance between the inflow guide 137 and the flow outer circumferential surface 134.

The inflow guide 137 can have the protruding end guiding the flow direction of at least a portion of the air discharged from the fan duct toward the second extending flow channel to improve the air flow rate of the first extending flow channel and the second extending flow channel. In addition, the width of the inflow region of the first extending flow channel can be smaller than the width of the inflow region of the second extending flow channel, so that the flow rate of air flowing into the first extending flow channel can be reduced and the flow rate of air flowing into the second extending flow channel can be increased, thereby allowing the overall flow rate to be uniform.

However, based on the characteristics of the fan duct 108 and the blower 107, the protruding direction of the inflow guide 137 or the width adjustment of the first extending flow channel and the second extending flow channel can be variously determined.

Figure 14:
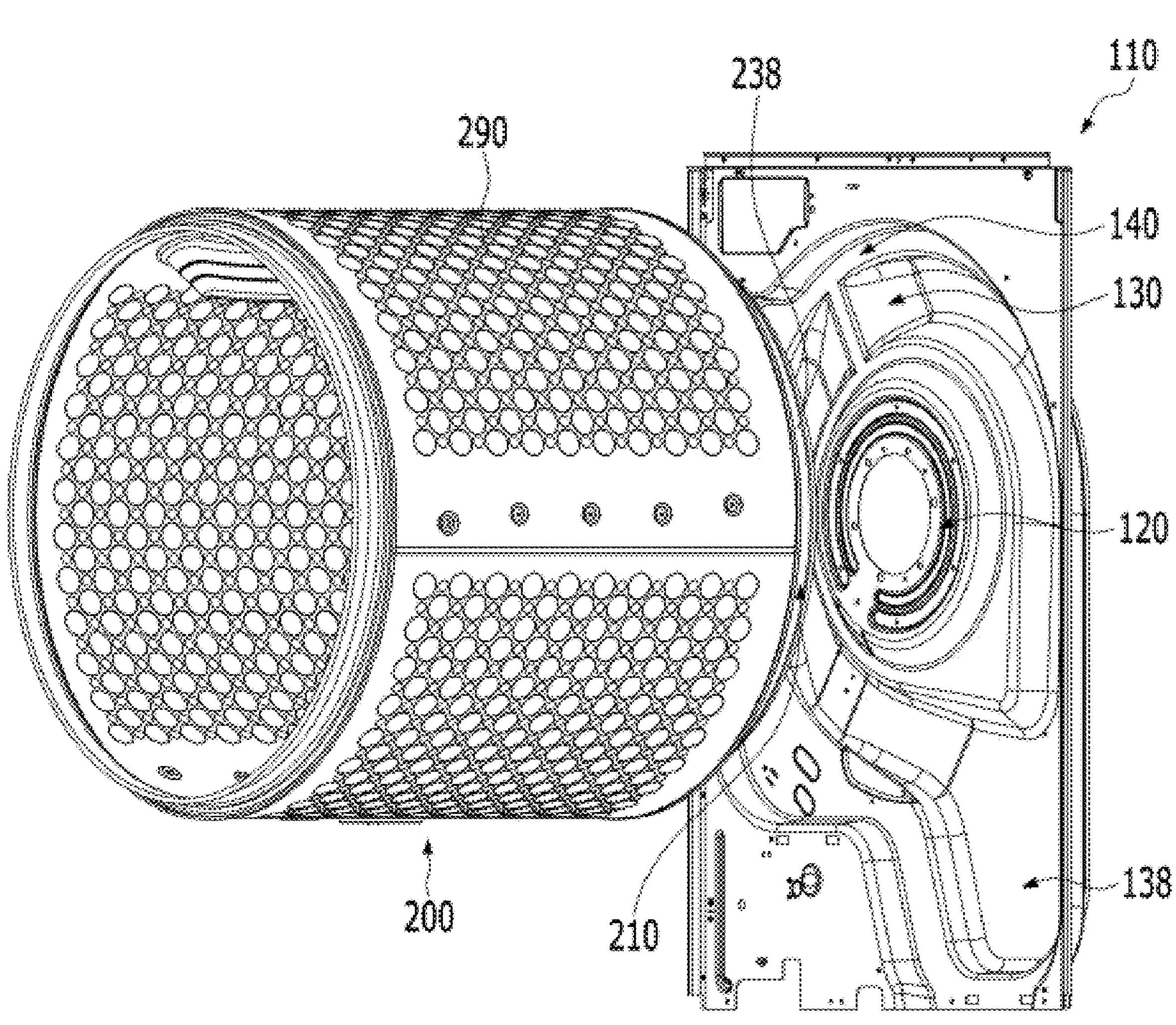
FIG. 14 is a schematic view illustrating an example of a drum and a rear plate together.
Figure 15:
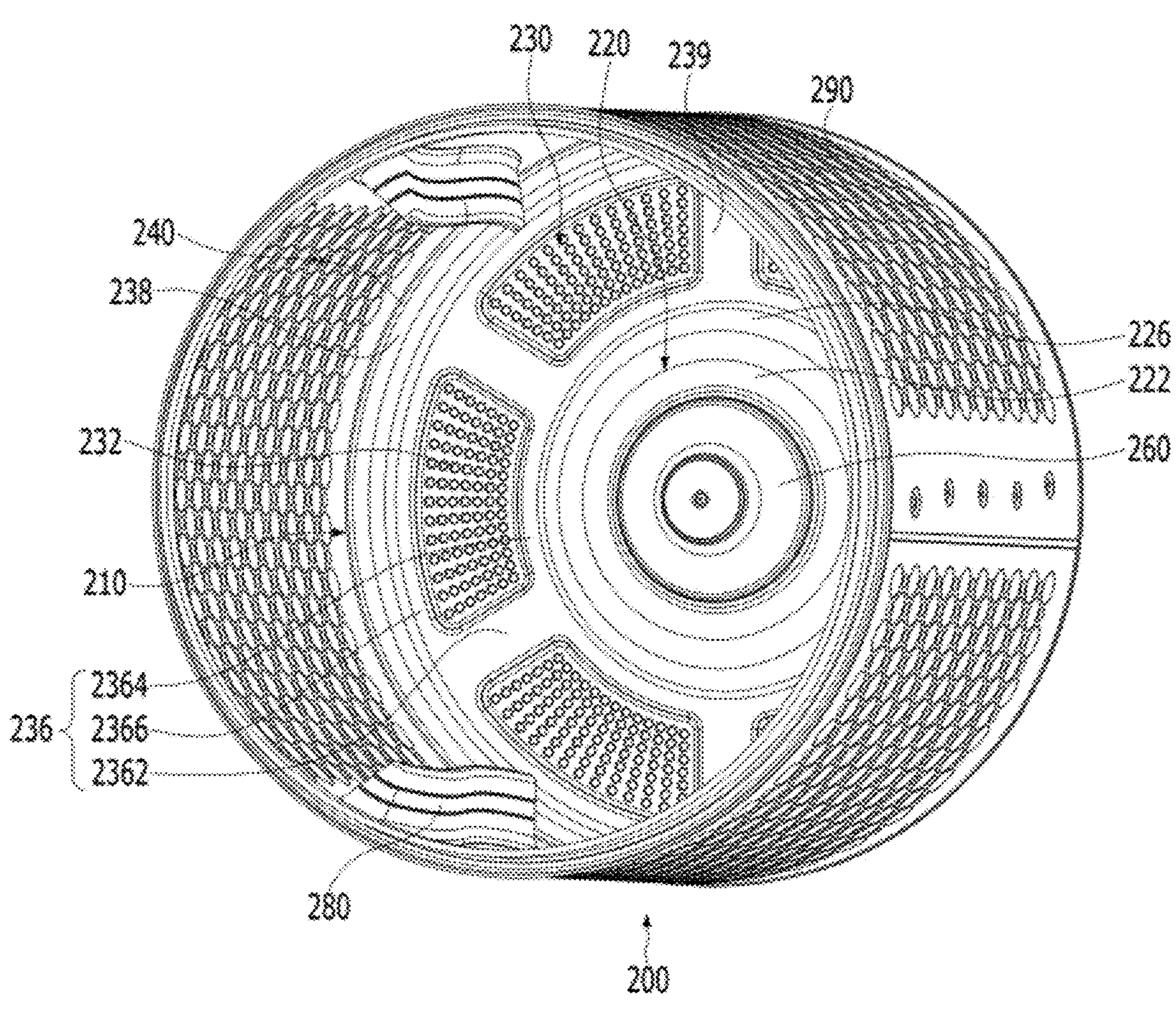
FIG. 15 is a perspective view illustrating an example of a drum in a laundry treating apparatus.

In one example, FIG. 14 illustrates the drum 200 spaced forwardly apart from the rear plate 110, and FIG. 15 illustrates the interior of the drum 200.

In some implementations, the drum 200 can be located in front of the rear plate 110, and the air discharged from the air flow portion 130 of the rear plate 110 can pass through the drum rear surface 210 and be provided into the drum 200.

The drum 200 can have the drum inlet defined at the front surface thereof, and include a front portion of the drum 200 surrounding the drum inlet. The front portion of the drum 200 can be supported by the front plate 102.

The drum circumferential surface 290 surrounding the interior of the drum 200 can be disposed at the rear of the front portion of the drum 200. The drum circumferential surface 290 can be formed in a cylindrical shape extending along the circumferential direction of the drum 200. A front end of the drum circumferential surface 290 can be coupled to the front portion of the drum 200, or the front portion of the drum 200 can be integrally formed with the front end.

In the inner space of the drum 200 surrounded by the drum circumferential surface 290, the inner space of the drum can be configured to receive the laundry through the laundry inlet 1021 of the front plate 102. A laundry lifter 280 for lifting the laundry when the drum 200 rotates can be disposed on an inner surface facing the interior of the drum 200 of the drum circumferential surface 290.

The drum rear surface 210 can be disposed at the rear of the drum circumferential surface 290, and the drum rear surface 210 can be integrally molded with the drum circumferential surface 290 or manufactured separately and coupled to the drum circumferential surface 290.

The drum rear surface 210 can include the air passage 230 through which the air flowing out from the air flow portion 130 and toward the interior of the drum 200 passes, and the rear surface central portion 220 coupled to the driving part 400. FIG. 14 illustrates the arrangement relationship in which the drum rear surface 210 is positioned in front of the air flow portion 130, and FIG. 15 illustrates the air passage 230 and the rear surface central portion 220 disposed in the drum rear surface 210.

Figure 16:
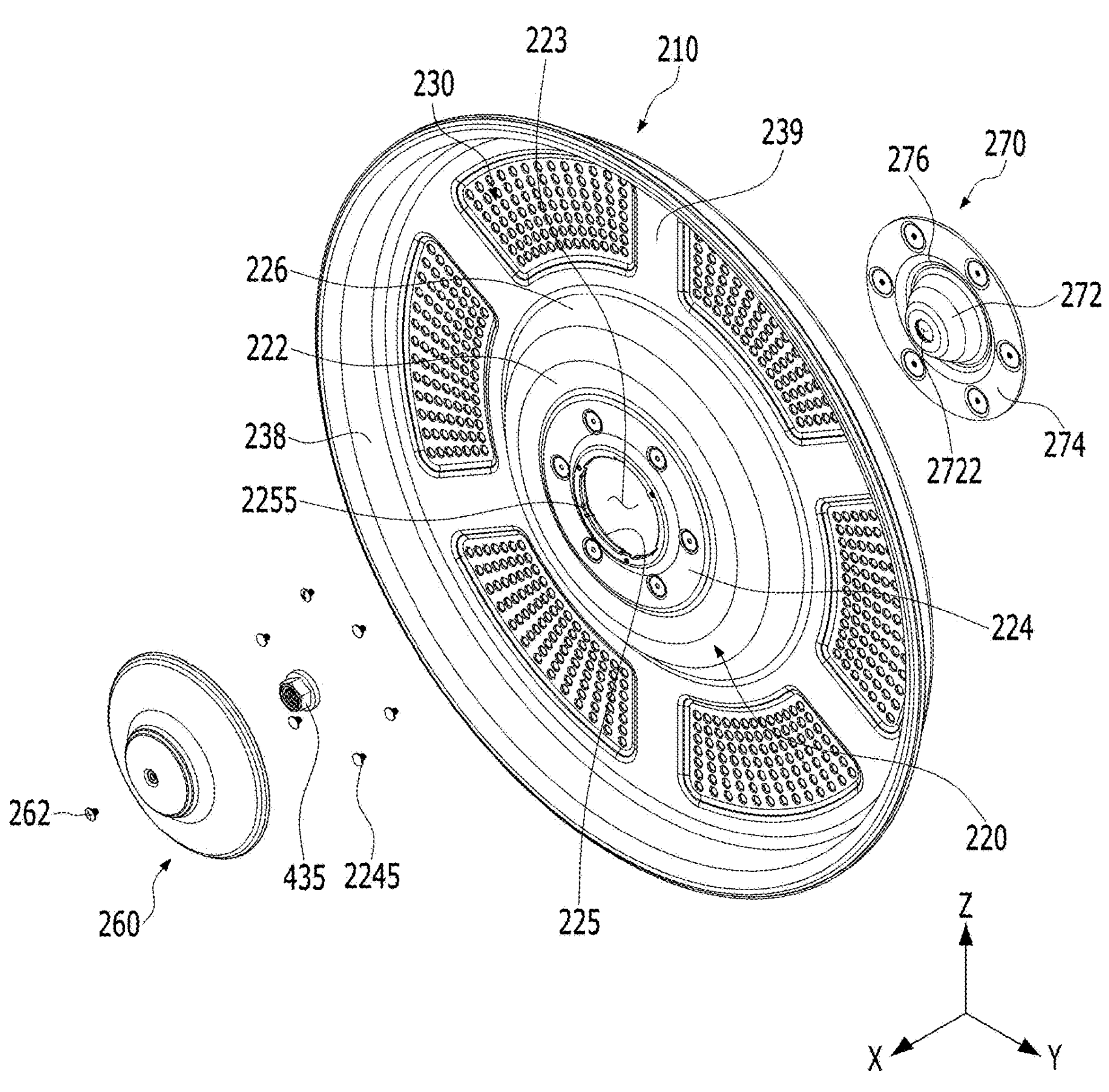
FIG. 16 is a schematic view illustrating an exemplary exploded state of a drum rear surface of a drum.
Figure 17:
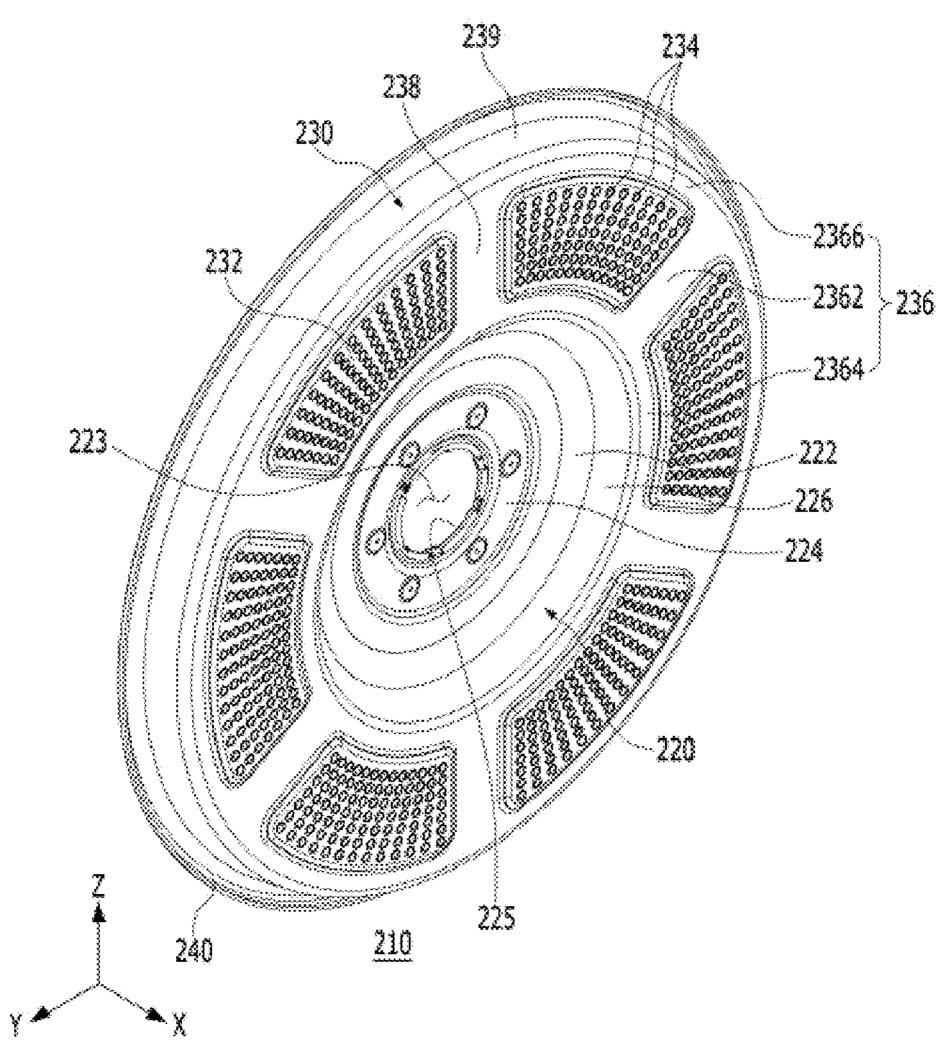
FIG. 17 is a perspective view illustrating an example of a drum rear surface viewed from the front.
Figure 18:
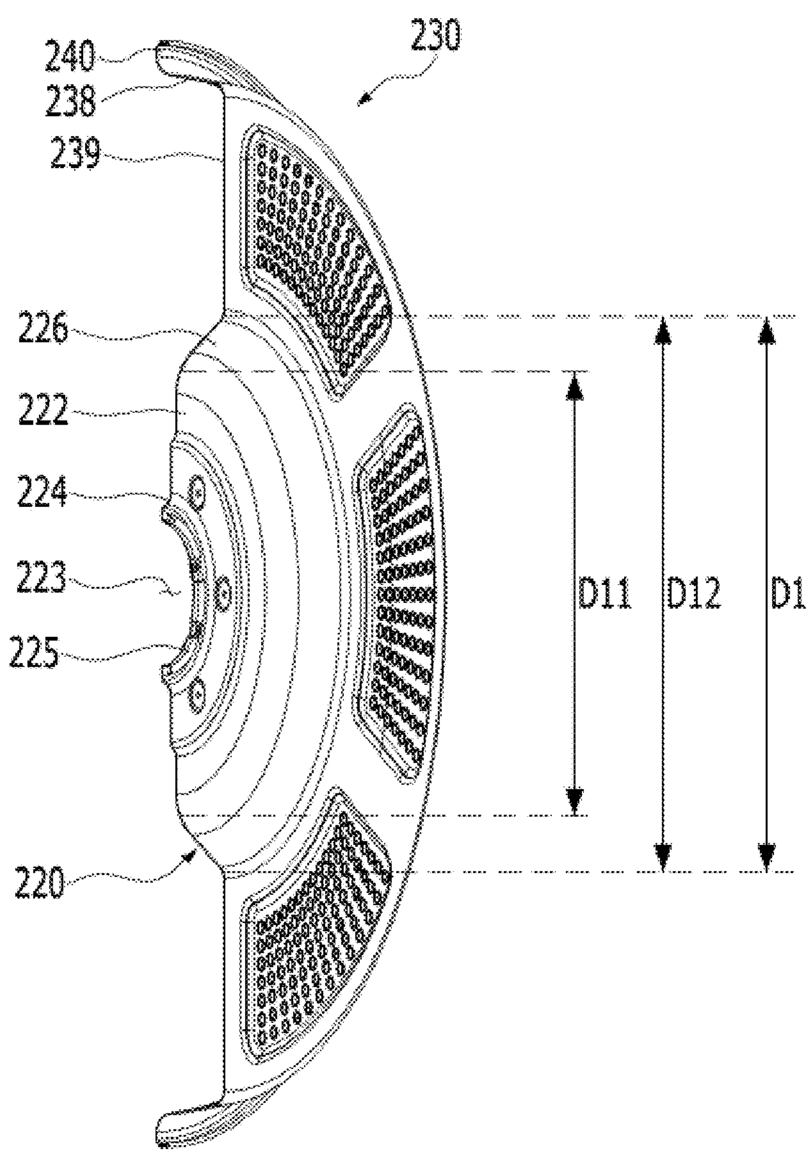
FIG. 18 is a schematic view illustrating a cross-section of a drum rear surface.

In one example, FIG. 16 illustrates an exploded view of the drum rear surface 210 separated from the drum 200, FIG. 17 illustrates the drum rear surface 210 viewed from the rear, and FIG. 18 illustrates a view showing a cross-section of the drum rear surface 210.

Referring to FIGS. 16 to 18, in some implementations, the drum rear surface 210 can include the rear surface central portion 220 facing the driving part mounting portion 120 and coupled to the driving part 400, and the air passage 230 surrounding the rear surface central portion 220 and through which the air provided from the air flow portion 130 passes to be supplied into the drum 200.

The rear surface central portion 220 can be positioned in front of the driving part mounting portion 120 to be coupled to the driving part 400. In the driving part 400, the driving shaft 430 can extend through the driving part mounting portion 120 to be coupled to the rear surface central portion 220.

The rear surface central portion 220 can have a circular cross-sectional shape and can be disposed at the central portion of the drum rear surface 210. The driving shaft 430 coupled to the rear surface central portion 220 can be coupled to the rear surface central portion 220 at the center of the drum rear surface 210 and disposed on the same line as the rotation shaft of the drum 200.

The air passage 230 can be disposed in front of the air flow portion 130, and the air provided from the air flow portion 130 can pass through at least a portion of the air passage 230 to be introduced into the drum 200. The air passage 230 can be formed in the annular shape surrounding the rear surface central portion 220.

In some implementations, the air passage 230 can shield the open front surface 131 of the air flow portion 130, and the air provided from the air flow portion 130 can be introduced into the air passage 230.

As described above, in some implementations, the air flow portion 130 can be configured such that the front surface 131 is opened, and the air flows out from the open front surface 131. In some implementations, as the front surface 131 of the air flow portion 130 is opened, an overall thickness of the air flow portion 130 can be reduced, so that it may be advantageous in expanding the space inside the drum 200 toward a rear portion of the drum 200, and the air flowing from the air flow portion 130 toward the air passage 230 can be supplied to the air passage 230 while the flow resistance thereof is minimized.

The air passage 230 can shield the open front surface 131 of the air flow portion 130 from the front. That is, as the open front surface 131 of the air flow portion 130 is directly shielded by the air passage 230, a structure advantageous in providing the air flowing out from the air flow portion 130 to the air passage 230 may be implemented.

That is, in some implementations, as the front surface 131 of the air flow portion 130 is opened and the air passage 230 of the drum rear surface 210 is directly disposed on the open front surface 131 of the air flow portion 130, the flow resistance of the air to be supplied into the drum 200 can be minimized, and a flow loss and a flow rate loss of the air flowing out from the air flow portion 130 can be minimized.

In some implementations, the air flow portion 130 can include the flow recessed surface 132 for shielding the flow space 135 from the rear as described above, and the air passage 230 can be configured to directly face the flow recessed surface 132 through the open front surface 131 of the air flow portion 130. The flow recessed surface 132 and the air passage 230 can be disposed in parallel with each other, and the front surface 131 of the air flow portion 130 is opened, so that the air passage 230 and the flow recessed surface 132 can directly face each other.

In some implementations, the air passage 230 can protrude rearward from the drum rear surface 210 to cover the front surface 131 of the air flow portion 130. That is, the air passage 230 can protrude rearward from the drum rear surface 210 to shield the open front surface 131 of the air flow portion 130.

The drum rear surface 210 can be configured such that an entirety thereof protrudes rearward, or at least a portion thereof including the air passage 230 protrudes in a rearward direction.

For example, as illustrated in FIG. 18, the air passage 230 can protrude rearward from the drum rear surface 210 to be disposed in a rearward direction of a circumference connecting portion 240 coupled to the drum circumferential surface 290 in the drum rear surface 210 or of the rear surface central portion 220 to which the driving part 400 is coupled, and can have a portion of the inner space of the drum 200 defined therein.

In some implementations, the drum 200 can be rotated by the driving part 400, and can be disposed at a predetermined separation distance from the rear plate 110 to prevent structural interference with the rotation of the drum 200.

Furthermore, when a grill surface including a plurality of holes is disposed on the front surface 131 of the air flow portion 130, a space is consumed between the drum 200 and the front surface 131 by a thickness of the grill surface. Furthermore, for the drum 200 to rotate, the air passage 230 needs to have a predetermined separation distance forwardly from the grill surface.

However, in some implementations, the entirety of the front surface 131 of the air flow portion 130 can be opened. Therefore, the air passage 230 can protrude rearward by the thickness of the grill surface from the drum rear surface 210, which is more advantageous as there is no need to secure the separation distance from the grill surface.

The drum 200 can have the inner space that can be expanded as much as the air passage 230 protrudes rearward. Therefore, in some implementations, as the open front surface 131 of the air flow portion 130 is shielded with the air passage 230 protruding rearward from the drum rear surface 210, the inner space of the drum 200 can be effectively expanded.

In addition, as the front surface 131 of the air flow portion 130 is opened, structural interference between the drum rear surface 210 and the rear plate 110 can be effectively prevented when the drum 200 is rotated. For example, FIGS. 16 to 18 illustrate the air passage 230 having at least a portion protruding rearward from the drum rear surface 210.

Figure 19:
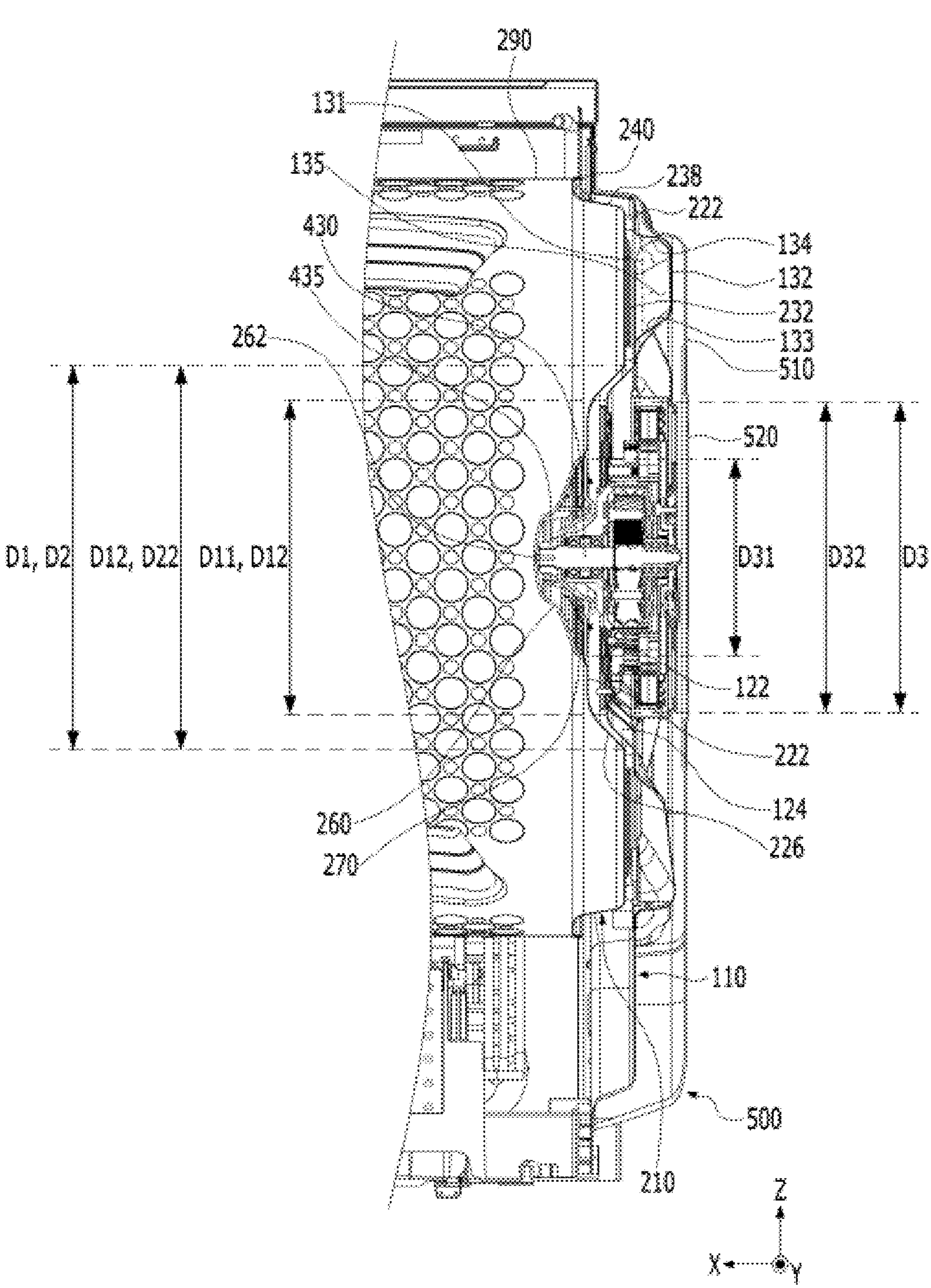
FIG. 19 is a cross-sectional view illustrating an example of a drum rear surface inserted into a rear plate.
Figure 20:
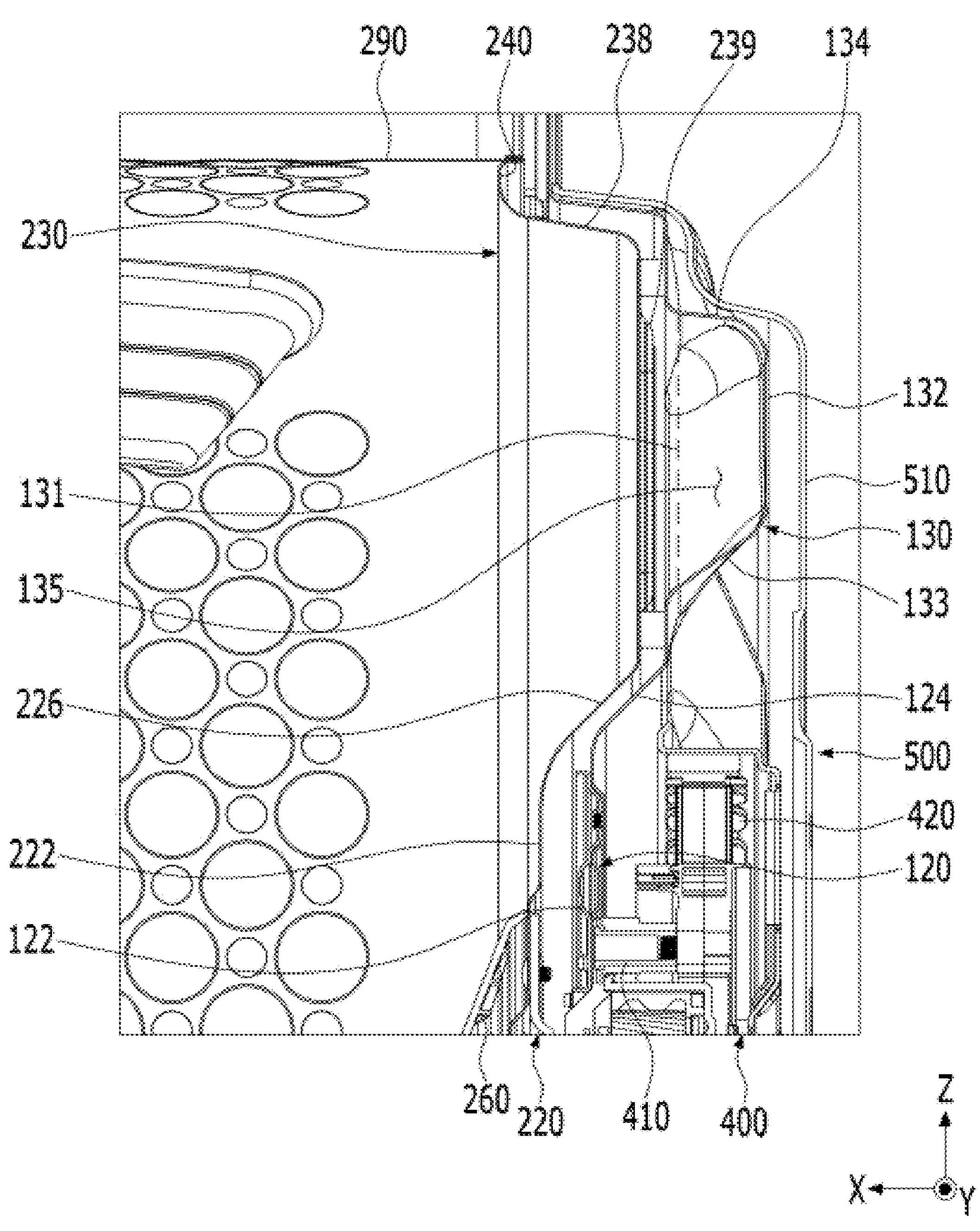
FIG. 20 is an enlarged view illustrating an air passage and an air flow portion in FIG. 19.

In one example, FIG. 19 illustrates cross-sections of the drum rear surface 210 and the rear plate 110 viewed from the side, and FIG. 20 illustrates an enlarged view of the air flow portion 130 and the air passage 230 in FIG. 19.

Referring to FIGS. 19 and 20, in some implementations, at least a portion of the air passage 230 can be inserted into the rear plate 110 to shield the open front surface 131 of the air flow portion 130.

At least a portion of the air passage 230 protruding rearward from the drum rear surface 210 can be inserted into the space defined inside the rear plate 110. For example, the rear plate 110 can have the space opened frontward defined therein by the rear protrusion 140 or the air flow portion 130 described above, and the air passage 230 can be inserted into the space from the front.

The air passage 230 can be formed in a shape corresponding to the air flow portion 130 and be inserted into the flow space 135 of the air flow portion 130, or can be inserted into the rear protrusion 140 described above to shield the front surface 131 of the air flow portion 130.

For example, FIGS. 19 and 20 illustrate a state in which the air passage 230 is inserted into the rear protrusion 140 and shields the open front surface 131 of the air flow portion 130 from the front.

The air passage 230 can be directly inserted into the air flow portion 130 or can have the predetermined separation distance from the open front surface 131 of the air flow portion 130 and shield the front surface 131 of the air flow portion 130 from the front.

In some implementations, the space inside the drum 200 can be expanded as the air passage 230 protrudes rearward from the drum rear surface 210, and the inner space of the cabinet 100 can be effectively utilized while minimizing an overall length of the cabinet 100 in the front and rear direction X as the air passage 230 is inserted into the rear plate 110, for example, into the rear protrusion 140 or the air flow portion 130.

Furthermore, as the air passage 230 along which the air to be provided into the drum 200 passes is inserted into the rear plate 110 and disposed at the open front surface 131 of the air flow portion 130, the distance between the air passage 230 and the open front surface 131 of the air flow portion 130 can be minimized, so that an air inflow performance of the air passage 230 can be effectively increased.

In one example, as described above, the driving part mounting portion 120 of the rear plate 110 can protrude frontward from the rear plate 110 so as to be disposed forwardly of the air flow portion 130, and the air passage 230 inserted into the rear plate 110 can have the annular shape and can surround at least a portion of the driving part mounting portion 120.

In the drum rear surface 210, the air passage 230 can protrude in a rearward direction of the rear surface central portion 220. That is, the rear surface central portion 220 can be disposed forwardly of the air passage 230, and can protrude frontward from the drum rear surface 210.

The driving part mounting portion 120 can be coupled to the driving part 400 from the rear, and the rear surface central portion 220 can be disposed in front of the driving part mounting portion 120. The driving part mounting portion 120 can protrude frontward, so that at least a portion thereof can be inserted into the rear surface central portion 220 from the rear of the rear surface central portion 220.

Accordingly, in some implementations, the air passage 230 protruding rearward from the drum rear surface 210 and inserted into the rear plate 110 can surround the circumference of the driving part mounting portion 120.

The rear surface central portion 220 can include a connecting front surface 222 positioned in front of the driving part 400 and a connecting side surface 226 surrounding the interior of the rear surface central portion 220. The connecting side surface 226 can correspond to the inner circumferential surface of the air passage 230. That is, the connecting side surface 226 of the rear surface central portion 220 can surround the circumference of the driving part mounting portion 120.

In some implementations, the air passage 230 can protrude in a rearward direction of the rear surface central portion 220 to shield the front surface 131 of the air flow portion 130.

As described above, the air passage 230 can protrude rearward from the drum rear surface 210, and can protrude in a rearward direction of the rear surface central portion 220. In addition, the rear surface central portion 220 can protrude frontward from the drum rear surface 210 as will be described later. Accordingly, the rear surface central portion 220 can be disposed forwardly of the air passage 230.

In some implementations, the drum 200 can include the drum circumferential surface 290 coupled to the drum rear surface 210 from the front of the drum rear surface 210. The circumference connecting portion 240 coupled to the drum circumferential surface 290 can be disposed at an edge of the drum rear surface 210. The air passage 230 can protrude in a rearward direction of the circumference connecting portion 240 to shield the front surface 131 of the air flow portion 130.

Referring to FIGS. 19 and 20, the circumference connecting portion 240 coupled to the drum circumferential surface 290 can be disposed at the edge of the drum rear surface 210. A scheme in which the drum circumferential surface 290 is coupled to the circumference connecting portion 240 may be varied.

For example, the circumference connecting portion 240 can be coupled to a rear end of the drum circumferential surface 290 using a coupling member. As illustrated in FIGS. 19 and 20, the circumference connecting portion 240 can be mechanically coupled to the drum circumferential surface 290 while being wound together with the drum circumferential surface 290.

The air passage 230 can protrude rearward from the drum rear surface 210 so as to be positioned in a rearward direction of the circumference connecting portion 240. The air passage 230 can include a passage outer circumferential surface 238 extending rearward from the circumference connecting portion 240 and surrounding the circumference of the air passage 230, and can include an air passage surface 239 facing the open front surface 131 of the air flow portion 130 at the rear of the air passage 230.

The passage outer circumferential surface 238 can correspond to an outer circumferential surface of the air passage 230. The air passage 230 can be formed in the annular shape surrounding the rear surface central portion 220, and the passage outer circumferential surface 238 can extend rearward from the drum circumferential surface 290 to surround the inner space of the air passage 230.

The air passage surface 239 can have an outer circumference coupled to a rear end of the passage outer circumferential surface 238, and can be formed in the annular shape such that the rear surface central portion 220 can be disposed at a central portion thereof. The air passage surface 239 can include a plurality of ventilation holes 234 through which the air passes.

The air passage surface 239 can be disposed in parallel with the flow recessed surface 132 and formed in a shape corresponding to the flow recessed surface 132. The air passage surface 239 can be formed in the annular shape, and disposed in front of the open front surface 131 of the air flow portion 130 and shield the open front surface 131 from the front.

An inner circumferential surface of the air passage 230 can correspond to the connecting side surface 226 of the rear surface central portion 220. That is, an inner circumference of the air passage surface 239 can be coupled to the connecting side surface 226 of the rear surface central portion 220, and the space surrounded by the passage outer circumferential surface 238, the air passage surface 239, and the connecting side surface 226 and opened toward the interior of the drum 200 can be defined inside the air passage 230.

In the drum rear surface 210, the air passage 230 can protrude in a rearward direction of the circumference connecting portion 240 to shield the front surface 131 of the air flow portion 130, and at least a portion of the air passage 230 can be inserted into the rear plate 110.

In some implementations, the air passage 230 can protrude in a rearward direction of the circumference connecting portion 240, so that the inner space of the drum 200 can be effectively expanded, and the open front surface 131 of the air flow portion 130 can be effectively shielded by the air passage 230.

In some implementations, the air passage 230 can protrude rearward while being bent or curved from the circumference connecting portion 240, and can have the space defined therein.

In some implementations, the rear plate 110 can include the rear protrusion 140 having the space defined therein and protruding rearward, and the air flow portion 130 can protrude rearward from the rear protrusion 140.

In addition, the driving part mounting portion 120 can protrude frontward from the rear protrusion 140 to be surrounded by the air passage 230.

In some implementations, the air passage 230 can protrude rearward from the drum rear surface 210 and be inserted into the rear protrusion 140 and shield the front surface 131 of the air flow portion 130.

In some implementations, the circumference connecting portion 240 can be disposed forwardly of the rear outer circumferential surface 148 of the rear protrusion 140. That is, in the drum rear surface 210, the circumference connecting portion 240 can be disposed in front of the rear protrusion 140, and the passage outer circumferential surface 238 of the air passage 230 extending rearward from the circumference connecting portion 240 can be located inside the rear protrusion 140.

In addition, the circumference connecting portion 240 can be disposed outwardly of the rear protrusion 140 with respect to the radial direction of the drum 200. That is, the circumference connecting portion 240 can have a larger diameter than the rear outer circumferential surface 148 of the rear protrusion 140.

In some implementations, the passage outer circumferential surface 238 of the air passage 230 can be inserted into the rear protrusion 140 to face the rear outer circumferential surface 148 from the inside.

In addition, rear protrusion 140 can include a rear circumferential region in which the rear outer circumferential surface 148 extends while maintaining a certain distance with the passage outer circumferential surface 238 of the drum rear surface 210, and an expanding circumferential region in which the separation distance from the passage outer circumferential surface 238 is increased than in the rear circumferential region.

In some implementations, the ventilation portion 232 can protrude from the air passage 230 toward the flow space 135. That is, the ventilation portion 232 can protrude in a rearward direction of the air passage surface 239, and can be inserted into the flow space 135 of the air flow portion 130 or disposed in front of the open front surface 131.

As described above, the air passage surface 239 can rotate as a portion of the drum rear surface 210. Therefore, it is necessary for the air passage surface 239 to be spaced apart from the rear protruding surface 149 by a predetermined distance to prevent contact with the rear protruding surface 149 of the rear protrusion 140.

In one example, as the ventilation portion 232 through which the air passes in the air passage 230 is adjacent to the flow space 135 of the air flow portion 130, it can be advantageous to minimize the flow loss and the flow rate loss of the air. Accordingly, in one example, the ventilation portion 232 can protrude rearward from the air passage surface 239 to minimize the distance to the air flow portion 130.

In some implementations, the ventilation portion 232 can include a plurality of ventilation portions spaced apart from each other in a circumferential direction of the air passage surface 239 of the air passage 230.

In some implementations, the air passage 230 can further include a reinforcing rib 236 that protrudes forwardly of the ventilation portion 232 and extends to surround the ventilation portion 232. The air passage 230 can be defined on the aforementioned air passage surface 239, and can surround at least a portion of a circumference of the ventilation portion 232.

Figure 24:
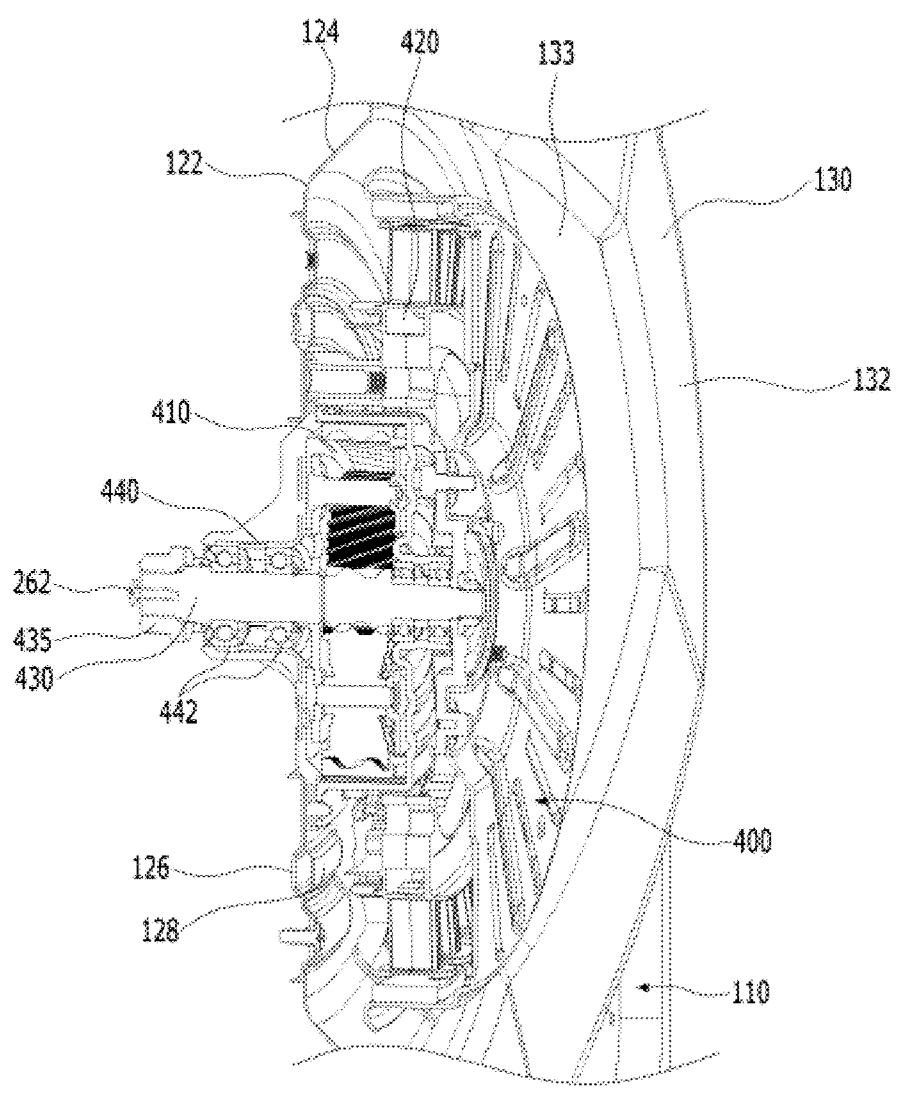
FIG. 24 is a schematic view illustrating a cross-section of a driving part coupled to a rear plate.

In some implementations, the reinforcing rib 236 can include at least one of a rear surface reinforcing rib 2362, an inner reinforcing rib 2364, and an outer reinforcing rib 2366. For example, FIG. 24 illustrates the rear surface reinforcing rib 2362, the inner reinforcing rib 2364, and the outer reinforcing rib 2366 disposed on the drum rear surface 210.

The inner reinforcing rib 2364 can extend along an inner circumference of the air passage surface 239, and can be formed in the annular shape to surround the rear surface central portion 220. As described above, the protruding inner circumferential surface of the air passage 230 can correspond to the connecting side surface 226 of the rear surface central portion 220. Therefore, the inner reinforcing rib 2364 can be coupled to the connecting side surface 226.

In one example, the outer reinforcing rib 2366 can be disposed between the ventilation portion 232 and the circumference connecting portion 240, can protrude forwardly of the ventilation portion 232, and can extend along the circumferential direction of the drum 200.

Figure 21:
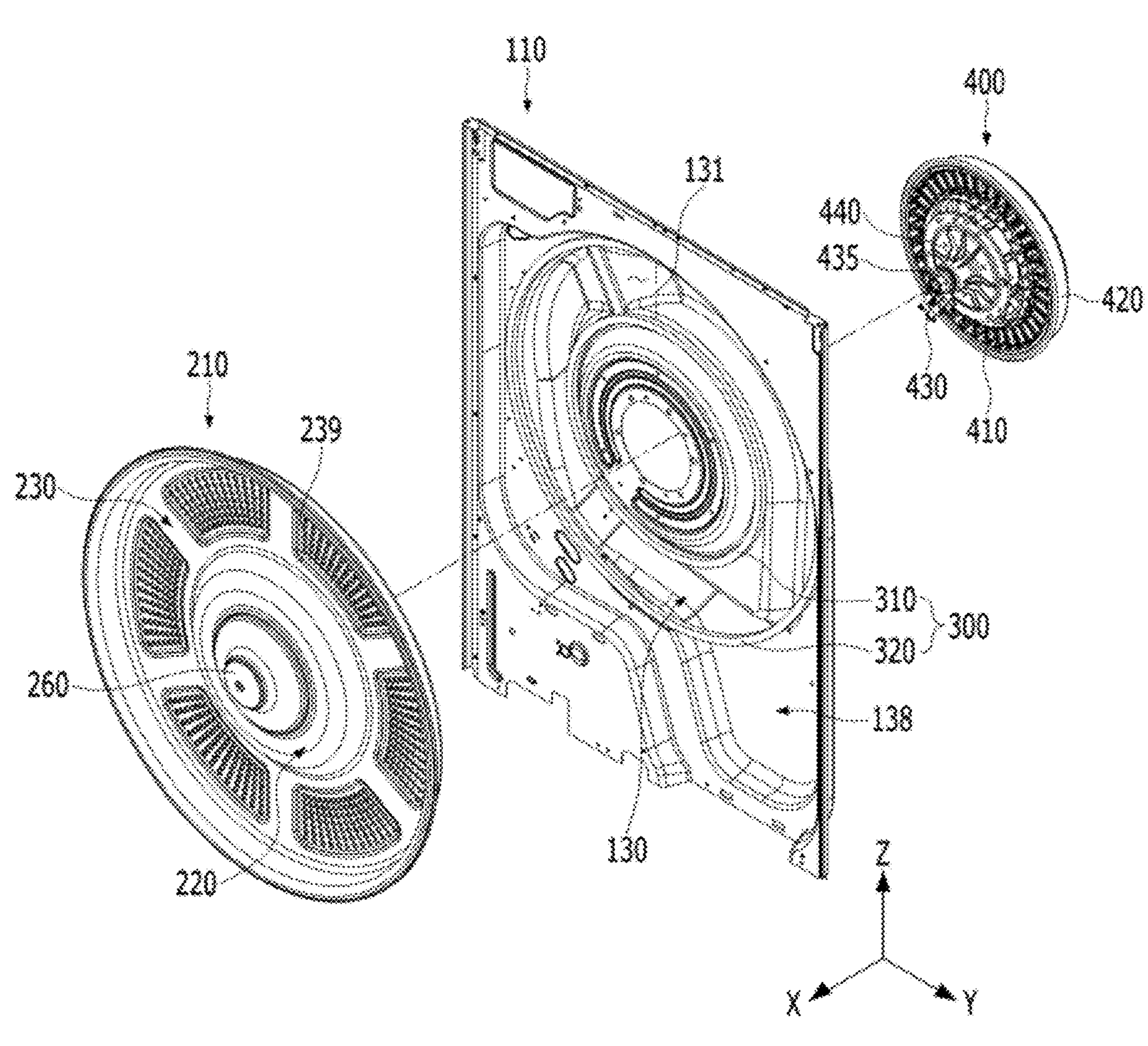
FIG. 21 is a schematic view illustrating an exemplary drum rear surface, a rear plate, and a driving part together.
Figure 22:
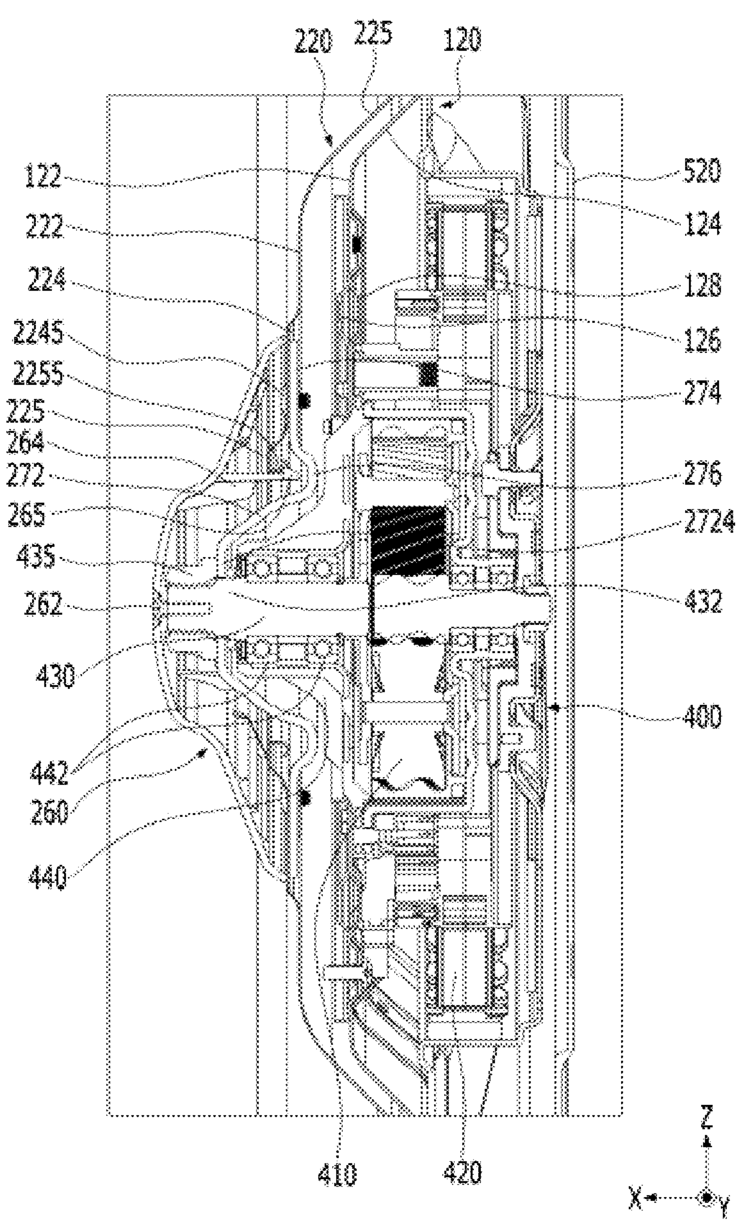
FIG. 22 is a cross-sectional view illustrating a rear surface central portion, a driving part mounting portion, and a driving part together.

In one example, FIG. 21 illustrates that the rear surface central portion 220 of the drum rear surface 210, the driving part mounting portion 120 of the rear plate 110, and the driving part 400 are separated from each other, and FIG. 22 illustrates a cross-section in which the rear surface central portion 220, the driving part mounting portion 120, and the driving part 400 are coupled to each other.

Referring to FIGS. 21 and 22, in some implementations, the drum rear surface 210 can include the rear surface central portion 220, and the rear surface central portion 220 can be disposed in front of the driving part 400 and configured to suppress heat transfer between the interior of the drum 200 and the driving part 400.

Specifically, the driving part 400 can be coupled to the rear plate 110 from the rear of the driving part mounting portion 120 described above, and the rear surface central portion 220 can be disposed in front of the driving part mounting portion 120 and coupled to the driving shaft 430 of the driving part 400.

In some implementations, the driving part 400 can generate heat during the operation. As the heat of the driving part 400 increases, thermal damage or the like can occur or an operation efficiency of the driving part 400 can be impaired, so that heat dissipation of the driving part 400 becomes important.

In one example, in the laundry treating apparatus 10, for the drying of the laundry accommodated in the drum 200, the air dehumidified and heated by the air supply 106 can be introduced into the drum 200 via the air flow portion 130.

That is, the temperature of the interior of the drum 200 to which the air of the air flow portion 130 is supplied becomes high for the drying of the laundry, and the transfer of the heat inside the drum 200 to the driving part 400 causes the thermal damage and reduces the operation efficiency of the driving part 400. Therefore, it becomes important to block the heat transfer between the driving part 400 and the interior of the drum 200.

In some implementations, the rear surface central portion 220 covers the front of the driving part mounting portion 120 and the driving part 400, so that the rear surface central portion 220 can suppress the heat transfer from the interior of the drum 200 to the driving part mounting portion 120 and the driving part 400.

Specifically, in one example, the rear surface central portion 220 can overlap the entirety of the driving part 400 from the front. In addition, the rear surface central portion 220 can have a circular cross-sectional shape, can have a diameter equal to or greater than that of the driving part 400, and can be disposed in front of the driving part 400.

The rear surface central portion 220 can correspond to a portion to which the driving shaft 430 of the driving part 400 is coupled from the rear. The heat inside the drum 200 can be transferred to the driving part mounting portion 120 and the driving part 400 to the rear of the rear surface central portion 220, and such heat transfer may be disadvantageous in the operation of the driving part 400.

Furthermore, in some implementations, the high-temperature air flows in the air flow portion 130 of the rear plate 110, and the air flow portion 130 surrounds the circumferences of the driving part mounting portion 120 and the driving part 400, so that it is important to reduce the heat of the driving part mounting portion 120 and the driving part 400.

In some implementations, the rear surface central portion 220 can overlap the entirety of the driving part 400 when viewed from the front. Accordingly, the transfer of the heat inside the drum 200 toward the driving part 400 from the interior of the drum 200 can be effectively suppressed by the rear surface central portion 220.

In some implementations, the driving part mounting portion 120 can shield the entirety of the driving part 400 from the front and suppress the heat transfer between the interior of the drum 200 and the driving part 400 together with the rear surface central portion 220.

The driving part mounting portion 120 can protrude frontward from the rear reference surface of the rear plate 110 or the rear protruding surface 149 of the rear protrusion 140 as described above, and can be coupled to the driving part 400 from the rear.

The driving part mounting portion 120 can overlap the entirety of the driving part 400 when viewed from the front to shield the driving part 400 from the front. The driving part mounting portion 120 can have a larger cross-sectional area than the driving part 400 and can shield the driving part 400 from the front. The driving part mounting portion 120 can have a diameter of a cross-section thereof viewed from the front equal to or greater than that of the driving part 400 and can be disposed in front of the driving part 400.

In some implementations, as the driving part mounting portion 120 is disposed in front of the driving part 400 and the rear surface central portion 220 is disposed in front of the driving part mounting portion 120, the driving part mounting portion 120 and the rear surface central portion 220 can block or suppress the heat transfer from the interior of the drum 200 to the driving part 400 from the front, and the heat at the driving part 400 can be effectively reduced.

In some implementations, the rear surface central portion 220 can protrude frontward from the drum rear surface 210 and can have the space defined therein. The rear surface central portion 220 can protrude frontward from the air passage surface 239 of the air passage 230, and can be disposed in parallel with the circumference connecting portion 240 of the drum rear surface 210 or can be disposed in a rearward direction of the circumference connecting portion 240.

In one example, the driving part 400 can be disposed on the rear plate 110, so that the driving shaft 430 of the driving part 400 and the rotation shaft of the drum 200 can be disposed on the same line, and the driving part 400 and the drum 200 may not be coupled to each other using the belt or the like, which may be advantageous in changing the rotation speed and the rotation direction of the driving shaft 430 and the drum 200 and in applying various rotation patterns of the drum 200.

However, in the laundry treating apparatus 10 such as the dryer capable of drying the laundry, it is important to increase the inner space of the drum 200 to secure sufficient laundry capacity. When the driving part 400 is disposed at the rear of the drum 200 to sufficiently secure the capacity of the drum 200, the length along the front and rear direction X of the entire laundry treating apparatus 10 can be increased, which can be disadvantageous in terms of space utilization.

However, in one example, at the same time that the driving part 400 is disposed at the rear of the driving part mounting portion 120 of the rear plate 110, the rear surface central portion 220 of the drum rear surface 210 protrudes frontward from the drum rear surface 210, so that at least a portion of each of the driving part mounting portion 120 and the driving part 400 can be inserted into the rear surface central portion 220 from the rear. That is, at least a portion of each of the driving part mounting portion 120 and the driving part 400 including a front end thereof can be inserted into and disposed in the rear surface central portion 220.

Accordingly, the length in which the driving part 400 protrudes rearward from the drum rear surface 210 can be effectively reduced, and the inner space of the drum 200 can be efficiently increased as the air passage 230 protrudes rearward from the drum rear surface 210.

In some implementations, the rear surface central portion 220 can be spaced apart from the driving part mounting portion 120 located therein. That is, the driving part mounting portion 120 positioned inside the rear surface central portion 220 may not be directly in contact with the rear surface central portion 220.

The rear surface central portion 220 can protrude frontward from the drum rear surface 210 to define therein the space that is open rearward, and can include an inner surface surrounding the space while facing the space. The inner surface can be spaced apart from the driving part mounting portion 120.

The rear surface central portion 220 can include the connecting side surface 226 extending frontward from the drum rear surface 210, for example, from the air passage surface 239, and forming a circumference of the rear surface central portion 220, and the connecting front surface 222 coupled to a front end of the connecting side surface 226 and shielding the driving part mounting portion 120 from the front.

The connecting side surface 226 can be disposed in front of the mounting side surface 124 of the driving part mounting portion 120, and the connecting front surface 222 can be disposed in front of the mounting front surface 122 of the driving part mounting portion 120. The rear surface central portion 220 can be formed in a shape corresponding to the driving part mounting portion 120 and disposed in front of the driving part mounting portion 120.

In the rear surface central portion 220, the connecting side surface 226 and the connecting front surface 222 can be spaced apart from the driving part mounting portion 120. In one example, because there is no direct contact between the rear surface central portion 220 and the driving part mounting portion 120, it is possible to prevent the heat transfer from the rear surface central portion 220 to the driving part mounting portion 120 and the driving part 400 through heat conduction.

In addition, as the separation space is defined between the rear surface central portion 220 and the driving part mounting portion 120, the separation space exhibits a heat insulating effect in the process of the heat transfer to the driving part mounting portion 120 through the rear surface central portion 220, so that it is possible to effectively suppress the heat transfer to the driving part mounting portion 120 and driving part 400.

Figure 23:
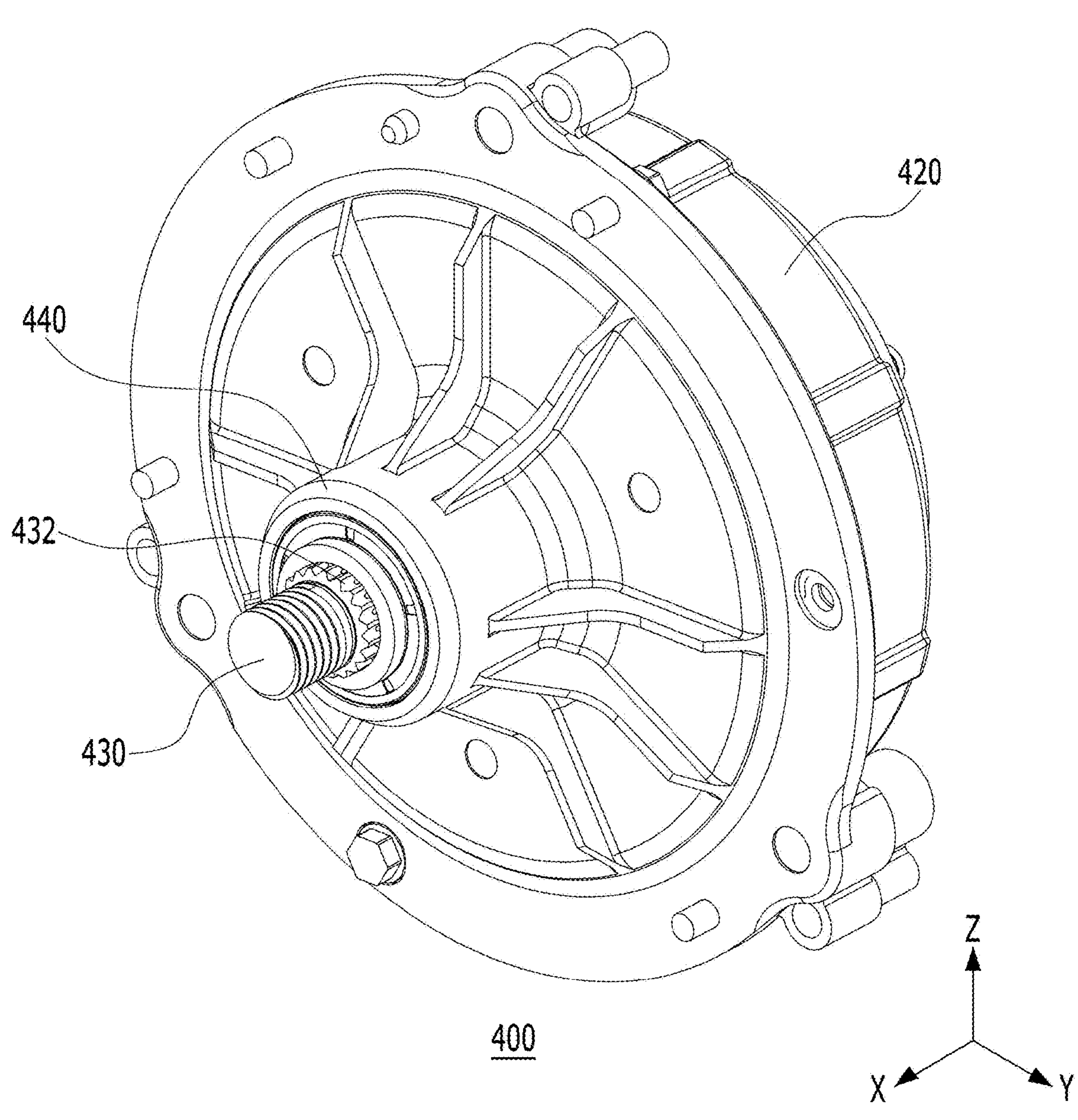
FIG. 23 is a schematic view illustrating an example of a driving part in a laundry treating apparatus.

In one example, FIG. 23 illustrates the driving part 400, and FIG. 24 illustrates a cross-section of the driving part 400 coupled to the driving part mounting portion 120.

Referring to FIGS. 23 and 24, the driving part 400 can have the first driving part 410 coupled to the driving part mounting portion 120 on the front portion thereof, and the second driving part 420 coupled to the first driving part 410 and having the larger cross-sectional area than the first driving part 410 on the rear portion thereof. At least a portion of the first driving part 410 can be disposed inside the rear surface central portion 220.

In some implementations, because the driving shaft 430 of the driving part 400 is directly coupled to the drum 200, in order to rotate the drum 200 having a relatively high load, a transmission can be disposed to adjust the rotation speed of the driving shaft 430 and secure sufficient torque.

In the driving part 400, the second driving part 420 can correspond to a power part that generates the rotation force of the drum 200, and the first driving part 410 can correspond to a shifting part that adjusts the rotation force transmitted from the second driving part 420 and provides the adjusted rotation force to the driving shaft 430 connected to the rear surface central portion 220.

That is, the first driving part 410 of the driving part 400 can correspond to the transmission, for example, a reducer that reduces the rotation speed and increases the torque of the driving shaft 430, and the second driving part 420 can correspond to the power part such as the motor or the like that consumes power to generate the rotation force.

That is, the rotation force can be generated in the second driving part 420 corresponding to the power part, a power shaft of the second driving part 420 can be coupled to the first driving part 410 and the rotation force can be transmitted to the first driving part 410 corresponding to the reducer, the first driving part 410 can rotate the driving shaft 430 by adjusting a rotation speed and a torque of the power shaft of the second driving part 420, and the driving shaft 430 can extend from the first driving part 410 and be coupled to the rear surface central portion 220 to rotate the drum 200. However, the present disclosure may not be necessarily limited thereto, and the first driving part 410 can correspond to the power part and the second driving part 420 can correspond to the reducer.

The driving part 400 can have the first driving part 410 at the front portion thereof and have the second driving part 420 at the rear portion thereof. The first driving part 410 of the driving part 400 can be coupled to the mounting front surface 122 while facing the mounting front surface 122 of the driving part mounting portion 120, and the second driving part 420 can be fixed in position by being coupled to the first driving part 410. For example, FIG. 23 illustrates the first driving part 410 coupled to the driving part mounting portion 120.

As described above, the second driving part 420 can correspond to the power part, and the second driving part 420 can include a stator fixed to the first driving part 410 and a rotor rotatable with respect to the stator.

The stator can be coupled to the first driving part 410, and the rotor can be rotatably coupled to the stator while surrounding the stator. The power shaft of the second driving part 420 can be coupled to the stator and rotate together with the stator, and a rotation force of the stator, which consumes power to cause relative rotation with respect to the rotor, can be transmitted to the first driving part 410 corresponding to the shifting part through the power shaft.

The shifting part can include a gear set for the shifting therein. For example, the shifting part can have a built-in satellite gear set including a sun gear, a planetary gear, and a ring gear, and the power shaft can be decelerated by being coupled to the satellite gear set.

The driving shaft 430 of the driving part 400 can be rotated in connection with the satellite gear set of the first driving part 410, and can decrease in rotation speed and increase in torque in the relationship with the power shaft. The driving shaft 430 can extend from the first driving part 410 and be coupled to the rear surface central portion 220 to rotate the drum 200.

In some implementations, the second driving part 420 can be coupled to the first driving part 410 from the rear. At least the portion of the first driving part 410 can be inserted into the driving part mounting portion 120 that is recessed frontward, so that the length of the driving part 400 protruding rearward from the rear plate 110 can be effectively reduced and the driving part 400 can be stably fixed.

In some implementations, the connecting front surface 222 of the rear surface central portion 220 may be coupled to the driving part 400, can have a diameter equal to or greater than that of the first driving part 410, and can cover the first driving part 410 from the front.

In addition, the connecting side surface 226 can extend frontward from the drum rear surface 210 and be coupled to the connecting front surface 222, can extend along the circumference of the connecting front surface 222, and can cover the circumference of the second driving part 420 from the front while increasing in the diameter rearward.

In one example, the rear surface central portion 220 can be configured such that at least a portion of the connecting side surface 226 has a larger diameter than the connecting front surface 222 to define a space with a cross-sectional area larger than that of the connecting front surface 222 and increasing rearward. Accordingly, the space with the cross-sectional area larger than that of the connecting front surface 222 and increasing rearward can be secured in the rear surface central portion 220.

In one example, a diameter D11 of the connecting front surface 222 can be equal to or greater than a diameter of the first driving part 410 to shield an entirety of the front surface of the first driving part 410. For example, a diameter D1 of the rear surface central portion 220 is indicated in FIG. 18, and a diameter D3 of the driving part mounting portion 120 and the driving part 400 is shown in FIG. 19.

In some implementations, the second driving part 420 coupled to the first driving part 410 from the rear can have a diameter equal to or greater than the diameter of the first driving part 410. In one example, the connecting side surface 226 of the rear surface central portion 220 can have a diameter that is the same as the diameter D11 of the connecting front surface 222 at a front end thereof and increases rearward.

In one example, a diameter D12 of the connecting side surface 226 can refer to a diameter at the rear end of the connecting side surface 226, that is, the largest diameter of the connecting side surface 226. The diameter D12 of the connecting side surface 226 can be defined as the diameter D1 of the rear surface central portion 220.

The diameter D12 of the connecting side surface 226 can be equal to or larger than a diameter D32 of the second driving part 420. That is, the connecting side surface 226 can shield the second driving part 420 in addition to the first driving part 410 from the front. That is, the diameter D1 of the rear surface central portion 220 can be equal to or greater than the diameter D3 of the driving part 400 to cover the entirety of the driving part 400 from the front.

In some implementations, the rear surface central portion 220 can be disposed in front of the driving part 400 to overlap the driving part 400 and configured to suppress the heat inside the drum 200 from being transferred toward the driving part 400. In addition, the connecting side surface 226 can be configured such that the diameter thereof increases in a rearward direction. Therefore, the first driving part 410 and the second driving part 420 of the driving part 400 can be effectively shielded from the front even when the space is not occupied by the rear surface central portion 220 whose overall diameter is increased.

In one example, although the rear surface central portion 220 is configured such that the diameter D11 of the connecting front surface 222 is smaller than the diameter D3 of the driving part 400, as the diameter D12 of the connecting side surface 226 is larger than the diameter D3 of the driving part 400, the rear surface central portion 220 can effectively shield the entirety of the driving part 400 from the front, and the space in which the driving part 400 can be accommodated can be effectively defined in the rear surface central portion 220.

In some implementations, the driving part mounting portion 120 can include the mounting front surface 122 and the mounting side surface 124 as described above. The mounting front surface 122 can be disposed between the connecting front surface 222 and the first driving part 410 to be coupled to the first driving part 410 and shield the first driving part 410 from the front.

The mounting side surface 124 may extend frontward from the rear plate 110 and be coupled to the mounting front surface 122, extend along the circumference of the mounting front surface 122, and can shield the circumference of the second driving part 420 from the front as a diameter thereof increases in a rearward direction.

A diameter D2 of the driving part mounting portion 120 can be equal to or greater than the diameter D3 of the driving part 400. For example, FIG. 19 illustrates the diameter D3 of the mounting side surface 124 and the driving part 400.

The driving part mounting portion 120 can be configured such that a diameter D22 of the mounting side surface 124 increases in a rearward direction from the mounting front surface 122 so as to correspond to the rear surface central portion 220. The mounting front surface 122 can be disposed between the connecting front surface 222 of the rear surface central portion 220 and the driving part 400, that is, the first driving part 410, and a diameter D21 of the mounting front surface 122 can be equal to or greater than a diameter D31 of the first driving part 410.

The mounting front surface 122 can be disposed in front of the first driving part 410 together with the connecting front surface 222 to block or suppress the heat transfer between the interior of the drum 200 and the driving part 400. The diameter D21 of the mounting front surface 122 can be equal to or smaller than the diameter D11 of the connecting front surface 222. However, when necessary, the diameter D21 of the mounting front surface 122 can be larger than the diameter D11 of the connecting front surface 222.

The mounting side surface 124 can extend frontward from the rear plate 110. For example, the mounting side surface 124 can extend frontward from the rear protruding surface 149 of the rear protrusion 140. The mounting side surface 124 can correspond to the flow inner circumferential surface 133 of the air flow portion 130, and can be disposed to be spaced inwardly apart from the flow inner circumferential surface 133.

The mounting side surface 124 can be configured such that the diameter thereof increases from the mounting front surface 122 toward the rear protruding surface 149. A diameter of a rear end of the mounting side surface 124 can be equal to or greater than the diameter D32 of the second driving part 420.

In some implementations, the diameter D22 of the mounting side surface 124 can be defined as the diameter of the rear end of the mounting side surface 124, that is, the maximum diameter of the mounting side surface 124, and the diameter D2 of the driving part mounting portion 120 can be defined to be the same as the diameter D22 of the mounting side surface 124. In one example, the diameter D22 of the mounting side surface 124 can be equal to or greater than the diameter D32 of the second driving part 420.

In one example, the diameter D3 of the driving part 400 can be defined as the maximum diameter of the driving part 400. In some implementations, in the driving part 400, the diameter D32 of the second driving part 420 can be equal to or greater than the diameter D31 of the first driving part 410, and thus, the diameter D3 of the driving part 400 can correspond to the diameter D32 of the second driving part 420.

In some implementations, as the diameter D22 of the mounting side surface 124 is equal to or greater than the diameter D3 of the driving part 400, that is, the diameter D32 of the second driving part 420, even when the diameter of the mounting front surface 122 is smaller than the diameter D3 of the driving part 400, the entirety of the driving part 400 including the second driving part 420 can be effectively shielded from the front by the driving part mounting portion 120 by the mounting side surface 124.

The diameter D22 of the mounting side surface 124 can correspond to the diameter of the connecting side surface 226 of the rear surface central portion 220. For example, the diameter D22 of the mounting side surface 124 can be equal to the diameter D12 of the connecting side surface 226 or greater than the diameter D12 of the connecting side surface 226.

The rear surface central portion 220 and the mounting side surface 124 can be configured such that the connecting front surface 222 and the mounting front surface 122 have shapes corresponding to each other, and the connecting side surface 226 and the mounting side surface 124 have shapes corresponding to each other, so that the mounting side surface 124 can be effectively inserted into the rear surface central portion 220, and the rear surface central portion 220 and the mounting side surface 124 can shield the driving part 400 from the front together to suppress the heat transfer.

In some implementations, the driving part mounting portion 120 can be disposed to be spaced apart from the second driving part 420 disposed therein. For example, FIGS. 22 and 24 illustrate the second driving part 420 spaced apart from the driving part mounting portion 120.

In some implementations, the driving part 400 can include the first driving part 410 and the second driving part 420, the first driving part 410 can be coupled to the mounting front surface 122 of the driving part mounting portion 120, and the second driving part 420 can be coupled to the first driving part 410 from the rear.

That is, the second driving part 420 may not be directly coupled to the driving part mounting portion 120, and may be spaced apart from the mounting front surface 122 and the mounting side surface 124 of the driving part mounting portion 120. Accordingly, contact between the second driving part 420 and the driving part mounting portion 120 is excluded, so that the heat transfer by the heat conduction can be blocked.

In addition, because the second driving part 420 is disposed to be spaced in a rearward direction, the driving part mounting portion 120 as well as the rear surface central portion 220 don't need to expand the inner space thereof unnecessarily, which can be advantageous in terms of space utilization. In addition, a contact area between the driving part 400 and the driving part mounting portion 120 can be minimized, which is effective in suppressing the heat transfer.

Figure 25:
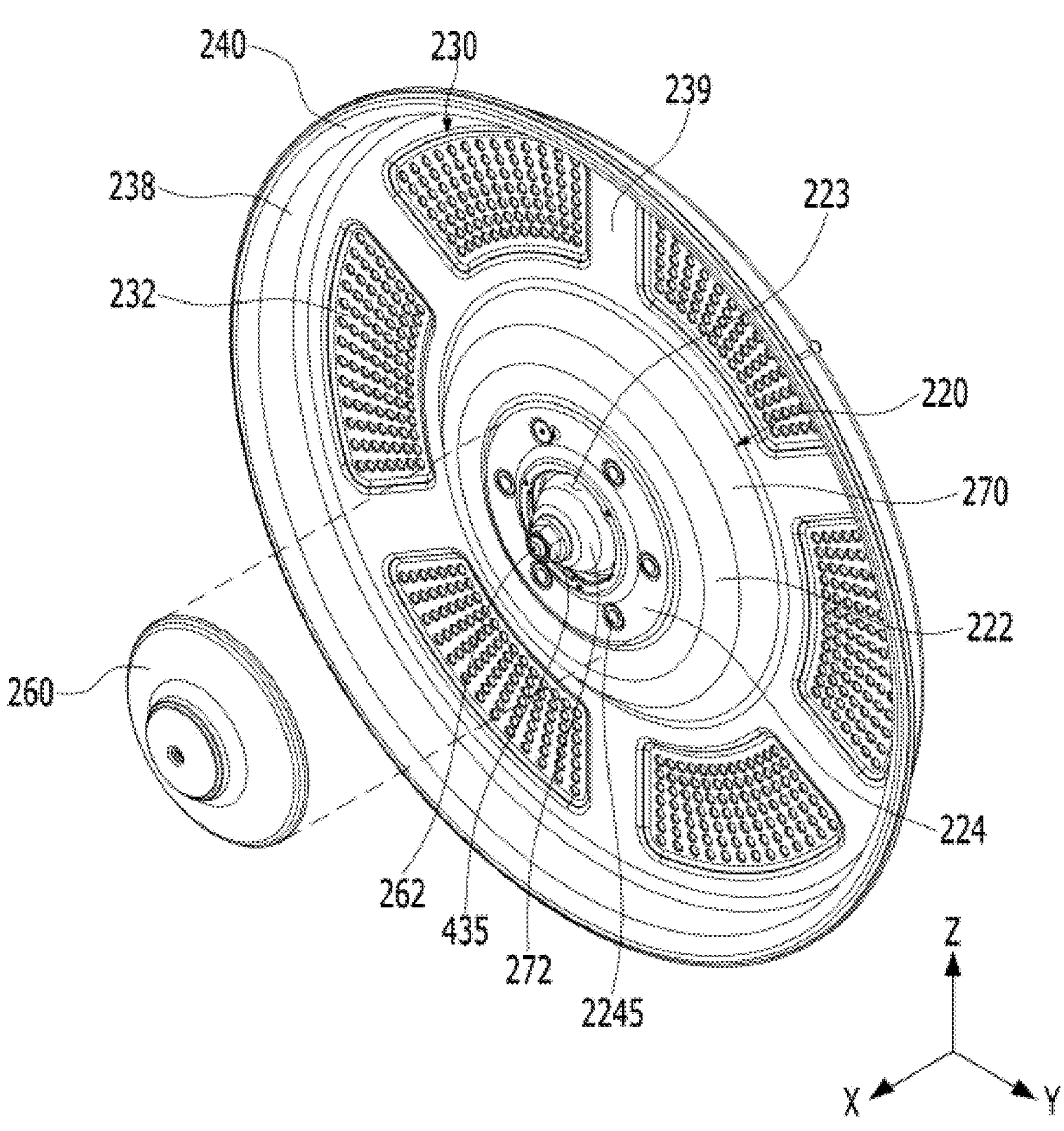
FIG. 25 is a schematic view illustrating an example of a shaft cap separated from a drum rear surface.

In one example, FIG. 25 illustrates a bushing 270 coupled to the rear surface central portion 220 of the drum 200 viewed from the front. In one example, FIG. 26 illustrates the bushing 270 in FIG. 25 viewed from the rear, and FIG. 27 illustrates a perspective view of the bushing 270.

Figure 26:
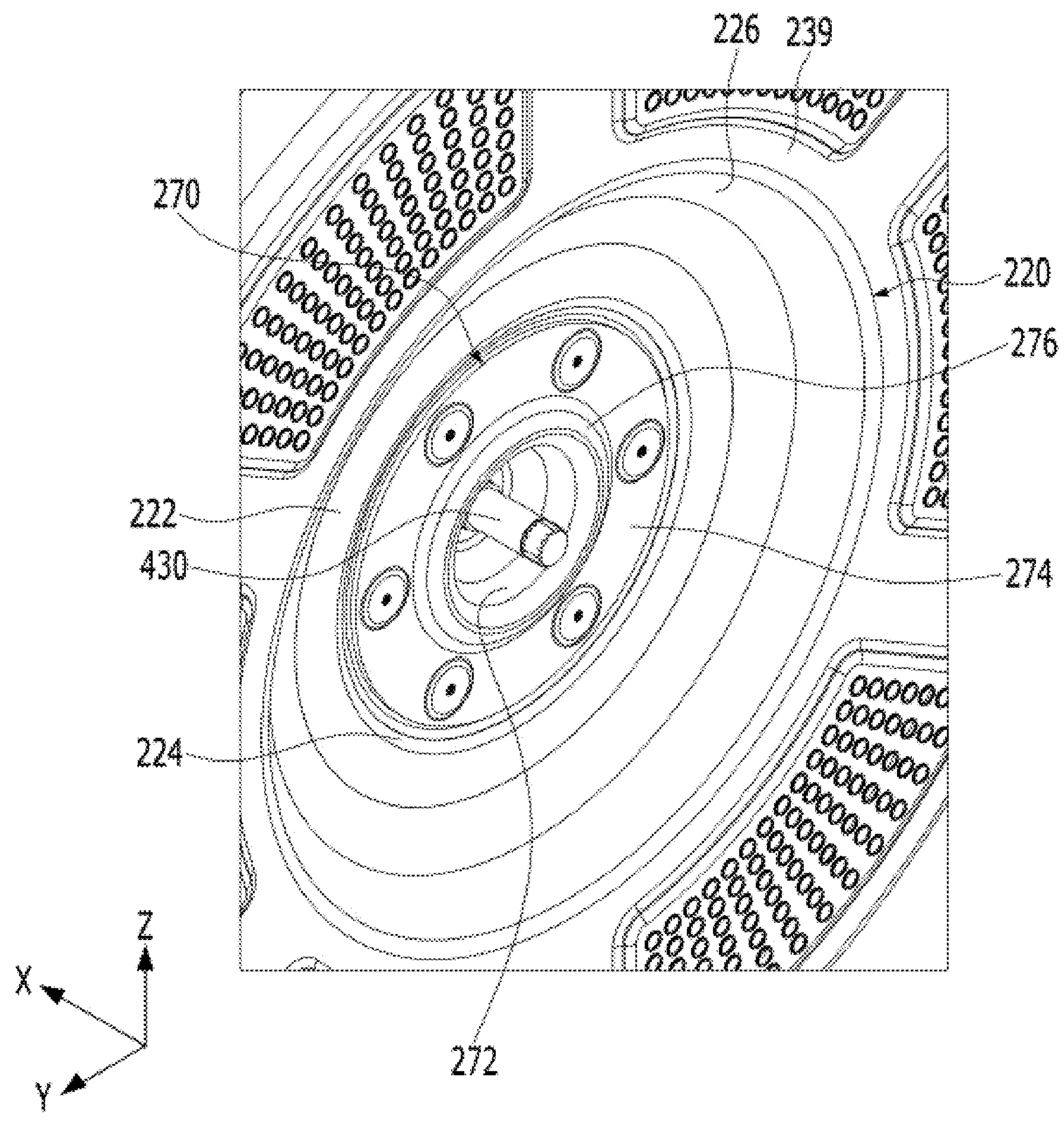
FIG. 26 is a perspective view illustrating an example of a bushing coupled to a drum rear surface viewed from the rear.
Figure 27:
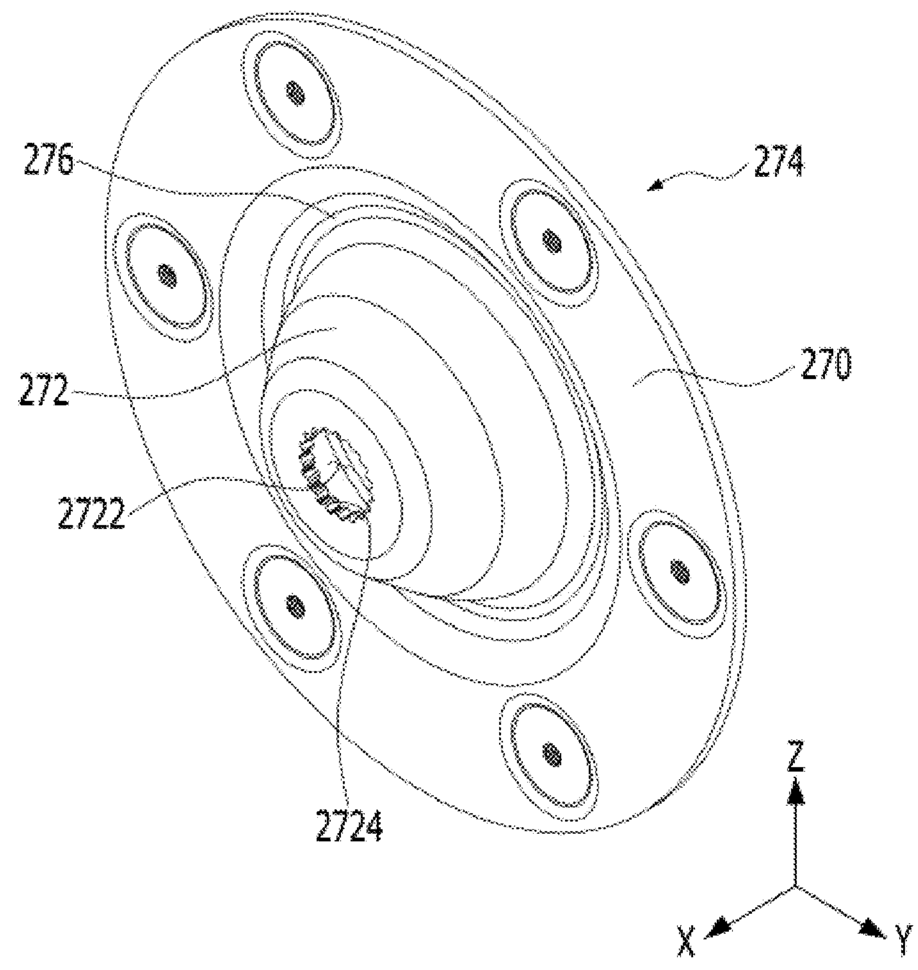
FIG. 27 is a perspective view illustrating an example of a bushing in a laundry treating apparatus.

Referring to FIGS. 25 to 27, in one example, the driving part 400 can include the driving shaft 430 that passes through the rear plate 110 and is coupled to the rear surface central portion 220. One implementation of the present disclosure can further include the bushing 270.

The bushing 270 can be coupled to the rear surface central portion 220, and the driving shaft 430 can be inserted into and coupled to the bushing 270 to transmit the rotation force from the driving shaft 430 to the drum 200.

As described above, in the driving part 400, the driving shaft 430 can be connected to the drum 200 and configured to transmit the rotation force directly to the drum 200. In some implementations, the rear surface central portion 220 of the drum rear surface 210 can be coupled to the driving shaft 430 to receive the rotation force.

When the driving shaft 430 is directly coupled to the connecting front surface 222 of the rear surface central portion 220, the rigidity of the rear surface central portion 220 itself may not be sufficiently secured or a sufficient coupling force with the rotating driving shaft 430 may not be secured, which can be disadvantageous in terms of structure.

Accordingly, in some implementations, the bushing 270 can be coupled to the rear surface central portion 220, and the bushing 270 and the driving shaft 430 can be coupled to each other, so that the rotation force of the driving shaft 430 can be transmitted to the rear surface central portion 220 or the drum rear surface 210 through the bushing 270.

At least a portion of the driving shaft 430 can be inserted into or penetrate the bushing 270, so that the bushing 270 can form a coupling relationship with the driving shaft 430. In addition, the bushing 270 can be coupled to the circumference of the rear surface central portion 220 to rotate together with the rear surface central portion 220.

The bushing 270 can effectively increase an area of coupling with the rear surface central portion 220 and provide a stronger coupling force compared to the case in which the driving shaft 430 is directly coupled to the rear surface central portion 220, so that it is possible to implement a stable coupling structure.

In some implementations, the rear surface central portion 220 can include a shaft through-hole 223 through which the bushing 270 passes. The bushing 270 can include a shaft coupling portion 272 protruding forwardly of the rear surface central portion 220 through the shaft through-hole 223 and into which the driving shaft 430 is inserted.

Specifically, the rear surface central portion 220 can include the shaft through-hole 223 penetrated by the bushing 270. The shaft through-hole 223 can be defined in the connecting front surface 222 of the rear surface central portion 220, and the shaft coupling portion 272 of the bushing 270 can penetrate the shaft through-hole 223.

The shaft coupling portion 272 of the bushing 270 can extend to protrude forwardly of the rear surface central portion 220, that is, the connecting front surface 222 through the shaft through-hole 223. The driving shaft 430 can be inserted into and coupled to the shaft coupling portion 272 from the rear.

In some implementations, the driving part 400 can be coupled to the driving part mounting portion 120 and the driving shaft 430 can extend frontward, and at least a portion of each of the driving part mounting portion 120 and the driving part 400 can be inserted into the rear surface central portion 220 from the rear.

However, the driving part 400 can include the bearing extension 440 or the like protruding frontward to support the driving shaft 430 extending frontward, so that a minimum length for the driving shaft 430 to be mechanically stably disposed can be required in the driving part 400.

In one example, in the driving part 400, the driving shaft 430 must secure a minimum length of protrusion forwardly from the driving part 400. Accordingly, the bushing 270 can have the shaft coupling portion 272 protruding frontward, and the driving shaft 430 extending frontward can be inserted into and accommodated in the shaft coupling portion 272.

In addition, in the rear surface central portion 220, the shaft through-hole 223 can be defined in the connecting front surface 222 such that the shaft coupling portion 272 can protrude frontward even when the coupling relationship is formed with the driving shaft 430 through the bushing 270. Accordingly, the shaft coupling portion 272 of the bushing 270 can be formed in the shape extending frontward through the shaft through-hole 223, so that the driving shaft 430 can be stably accommodated in the shaft coupling portion 272.

In some implementations, the driving part 400 can include the aforementioned bearing extension 440. The bearing extension 440 can include a bearing 442 extending toward the drum rear surface 210 through the driving part mounting portion 120 and supporting the driving shaft 430. At least a portion of the bearing extension 440 can be inserted into the shaft coupling portion 272.

A length in which the bearing extension 440 extends frontward from the driving part 400 can be smaller than a protruding length of the driving shaft 430. The bearing extension 440 can surround a rear end of the driving shaft 430 and can be formed in a shape surrounding a circumference of the rear end.

The bearing extension 440 can surround a portion of the driving shaft 430 and stably support the driving shaft 430 to secure mechanical rigidity of the driving shaft 430, and the bearing 442 on which the driving shaft 430 is rotatably supported can be disposed inside the bearing extension 440.

For example, FIG. 24 illustrates a state in which a plurality of bearings 442 of a ball type are arranged along a longitudinal direction of the driving shaft 430 inside the bearing extension 440.

In some implementations, in order to secure the mechanical rigidity of the driving shaft 430 and support the driving shaft 430, the bearing extension 440 can protrude forwardly of the driving part 400. Accordingly, the bushing 270 can accommodate the bearing extension 440 inside the shaft coupling portion 272.

Accordingly, an increase in an overall length of the coupling structure of the driving part 400 including the bushing 270 with respect to a shaft direction of the driving part 400 can be effectively prevented, and a mechanically stable structure can be implemented in a compact size.

In some implementations, at least a portion of the shaft coupling portion 272 can increase in diameter as it approaches the rear plate 110, and can have a space into which the bearing extension 440 is inserted defined therein.

As described above, the shaft coupling portion 272 of the bushing 270 has a space therein so that the driving shaft 430 and the bearing extension 440 can be inserted from the rear. However, the bearing extension 440 can be formed in a shape surrounding the circumference of the driving shaft 430, and thus, the bearing extension 440 can have a larger diameter than the driving shaft 430.

In addition, the bearing extension 440 can have the smaller length than the driving shaft 430, and can surround the rear end of the driving shaft 430. Accordingly, in the shaft coupling portion 272, there is a need to secure a space with a large diameter at the rear end thereof facing the driving part 400, but it is sufficient when a space of a relatively smaller diameter is secured at the front end thereof facing the interior of the drum 200.

Therefore, in some implementations, in the shaft coupling portion 272, a space whose diameter increases in a direction toward the driving part 400 can be defined, and the driving part 400 and the bearing extension 440 can be effectively inserted into and disposed in the space.

The shaft coupling portion 272 can be configured such that the diameter thereof changes in an entirety or a portion thereof in a longitudinal direction. For example, FIG. 27 illustrates the bushing 270 in a shape in which an outer circumferential diameter of the shaft coupling portion 272 increases toward the driving part 400.

In some implementations, the shaft coupling portion 272 can include teeth 2724, and the driving shaft 430 can include a meshing portion 432. The teeth 2724 can include gear teeth protruding toward the driving shaft 430, and the meshing portion 432 can be inserted into the teeth 2724, and can have gear teeth on an outer circumferential surface thereof to be meshed with the teeth 2724.

For example, FIG. 23 illustrates the meshing portion 432 disposed on the driving shaft 430, and FIG. 27 illustrates the teeth 2724 disposed on the shaft coupling portion 272.

The teeth 2724 can be configured to be meshed with the driving shaft 430. To this end, the gear teeth protruding toward the driving shaft 430 can be disposed on one surface of the teeth 2724 facing the driving shaft 430. For example, as shown in FIG. 27, a plurality of gear teeth can be formed on an inner circumferential surface of the shaft coupling portion 272 facing the driving shaft 430 to form the teeth 2724.

In one example, the meshing portion 432 of the driving shaft 430 can be inserted into the teeth 2724 to form a meshing relationship with the teeth 2724. The meshing portion 432 of the driving shaft 430 can include the plurality of gear teeth formed along the outer circumferential surface of the driving shaft 430.

In some implementations, as the driving shaft 430 and the shaft coupling portion 272 of the bushing 270, which correspond to a rotating body, are meshed with each other to be coupled to each other, a coupling relationship thereof in which rotations thereof are mutually restricted can be effectively formed only by inserting the driving shaft 430 into the shaft coupling portion 272 along the longitudinal direction.

In some implementations, the shaft coupling portion 272 can include a shaft coupling hole 2722 through which the driving shaft 430 passes, the teeth 2724 can be disposed on an inner circumferential surface of the shaft coupling hole 2722, a shaft fixing member 435 can be coupled to the front end of the driving shaft 430 positioned in front of the shaft coupling hole 2722, and the shaft fixing member 435 can be supported forward by the shaft coupling portion 272.

Specifically, the shaft coupling hole 2722 through which the driving shaft 430 passes can be defined at the front end of the shaft coupling portion 272. That is, the driving shaft 430 can be inserted into the shaft coupling portion 272, so that the front end thereof can pass through the shaft coupling hole 2722 and be positioned in front of the shaft coupling portion 272.

The teeth 2724 can be disposed on the inner circumferential surface of the shaft coupling hole 2722. That is, the plurality of gear teeth protruding toward the center of the shaft coupling hole 2722 can be disposed on the inner circumferential surface of the shaft coupling hole 2722 to form the teeth 2724.

In one example, in the state of being inserted into the shaft coupling portion 272, the plurality of gear teeth can be formed on the outer circumferential surface of the driving shaft 430 facing the inner circumferential surface of the shaft coupling hole 2722 to form the meshing portion 432. The driving shaft 430 can have the shaft fixing member 435 coupled to the front end thereof positioned in front of the meshing portion 432.

The shaft fixing member 435 can be supported forward by the shaft coupling portion 272. That is, the shaft fixing member 435 can have a diameter equal to or greater than that of the shaft coupling hole 2722. Accordingly, the shaft fixing member 435 can be disposed on a front end of the shaft coupling portion 272 and supported forward by the shaft coupling portion 272.

For example, FIGS. 24 and 25 illustrate an exemplary state in which the shaft fixing member 435 is coupled to the front end of the driving shaft 430 passing through the shaft coupling hole 2722.

In one example, the shaft fixing member 435 can be coupled to the front end of the driving shaft 430 passing through the shaft coupling portion 272, and the shaft fixing member 435 can be supported forward by the shaft coupling portion 272, so that the coupling and the fixing between the driving shaft 430 and the bushing 270 become possible along the longitudinal direction of the driving shaft 430.

In addition, the driving shaft 430 of the driving part 400 can generate thrust in the longitudinal direction of the driving shaft 430 due to operational characteristics thereof. As the shaft fixing member 435 is coupled to the front end of the driving shaft 430 and supported forward by the shaft coupling portion 272, an influence of the thrust generated on the driving shaft 430 can be effectively offset.

In some implementations, the bushing 270 can include a drum coupling portion 274, and the drum coupling portion 274 can extend along the circumference of the shaft coupling portion 272 and be coupled to the rear surface central portion 220 at the rear of the rear surface central portion 220.

The drum coupling portion 274 can extend along the circumference of the shaft coupling portion 272 to surround the shaft coupling portion 272. That is, the drum coupling portion 274 can be formed in the annular shape to surround the shaft coupling portion 272, and the shaft coupling portion 272 can be formed in a shape protruding frontward from the drum coupling portion 274.

In some implementations, as the driving shaft 430 and the drum rear surface 210 are coupled to each other through the drum coupling portion 274 of the bushing 270, the bushing 270 can provide a larger coupling area than the driving shaft 430 or the shaft coupling portion 272 through the drum coupling portion 274, so that it is possible to effectively increase the coupling force and improve the structural stability.

In some implementations, the rear surface central portion 220 can include a bushing coupling portion 224 surrounding the shaft through-hole 223 and to which the drum coupling portion 274 is coupled. The bushing coupling portion 224 can protrude frontward from the rear surface central portion 220, and the drum coupling portion 274 can be inserted into the bushing coupling portion 224 from the rear.

The bushing coupling portion 224 can be configured such that the drum coupling portion 274 is disposed at a rear surface thereof. The bushing coupling portion 224 can be disposed at the connecting front surface 222 of the rear surface central portion 220. The bushing coupling portion 224 can surround the shaft through-hole 223 defined in the connecting front surface 222.

A shape of the bushing coupling portion 224 can correspond to that of the drum coupling portion 274. For example, the bushing coupling portion 224 can be formed in the annular shape corresponding to the drum coupling portion 274, so that the drum coupling portion 274 can be seated thereon from the rear.

The bushing coupling portion 224 can protrude frontward from the connecting front surface 222. That is, the bushing coupling portion 224 can be formed in a shape recessed frontward from the connecting front surface 222 when viewed from the rear. For example, FIG. 26 illustrates the bushing coupling portion 224 recessed frontward from the connecting front surface 222 viewed from the rear.

In some implementations, as the bushing coupling portion 224 is formed to protrude frontward from the connecting front surface 222, the drum coupling portion 274 of the bushing 270 can be stably disposed at the connecting front surface 222, and the coupling force can be improved, which can be advantageous.

In one example, a coupling scheme of the drum coupling portion 274 and the bushing coupling portion 224 can be varied. For example, the drum coupling portion 274 can include a hook and can be coupled to the bushing coupling portion 224 in a hook scheme, or can be coupled to the bushing coupling portion 224 through a bushing fastening member 2245 as will be described later.

In one example, the laundry treating apparatus 10 can further include a shaft cap 260. The shaft cap 260 can be coupled to the rear surface central portion 220 from the front and shield at least a portion of the rear surface central portion 220, thereby suppressing the heat transfer between the interior of the drum 200 and the driving part 400 together with the rear surface central portion 220.

The shaft cap 260 can be disposed inside the drum 200, and can be positioned in front of the rear surface central portion 220. The shaft cap 260 can be disposed at the connecting front surface 222 of the rear surface central portion 220.

The shaft cap 260 can shield at least a portion of the rear surface central portion 220 from the front at the location in front of the rear surface central portion 220. For example, the shaft cap 260 can be configured to shield an entirety of the rear surface central portion 220 from the interior of the drum 200, to shield an entirety of the connecting front surface 222, or to shield a portion of the connecting front surface 222.

For example, the shaft cap 260 can cover the shaft coupling portion 272 to shield the shaft coupling portion 272 of the bushing 270 protruding through the shaft through-hole 223 and the bushing coupling portion 224 disposed at the connecting front surface 222 from the interior of the drum 200.

In some implementations, the high-temperature air can be supplied from the interior of the drum 200, and the rear surface central portion 220 and the driving part mounting portion 120 can be disposed in front of the driving part 400 to prevent the heat inside the drum 200 from being transferred to the driving part 400.

Furthermore, in one example, as the shaft cap 260 is disposed in front of the rear surface central portion 220, the transfer of the heat inside the drum 200 to the driving part 400 can be suppressed through the shaft cap 260.

Further, in one example, the front end of the driving shaft 430 or the shaft coupling portion 272 of the bushing 270 can be disposed inside the drum 200, and thus, there may be room for direct exposure to the high-temperature air inside the drum 200. The shaft cap 260 can shield the rear surface central portion 220 from the front of the rear surface central portion 220 to effectively suppress the heating of the driving shaft 430 or the shaft coupling portion 272 by the high-temperature air.

In some implementations, the shaft cap 260 can be disposed in front of the rear surface central portion 220 to shield the shaft coupling portion 272 from the interior of the drum 200. That is, the shaft cap 260 can cover the shaft coupling portion 272 inside the drum 200 to block the high-temperature air inside the drum 200 from directly being in contact with the shaft coupling portion 272.

In one example, the shaft coupling portion 272 extends frontward through the shaft through-hole 223 of the connecting front surface 222, so that the shaft cap 260 can have a space defined therein in which the shaft coupling portion 272 can be accommodated.

That is, the shaft cap 260 can be coupled onto the connecting front surface 222 such that the shaft coupling portion 272 is accommodated therein, thereby isolating the shaft coupling portion 272 from the interior of the drum 200. Accordingly, it is possible to effectively suppress the transfer of the heat inside the drum 200 to the driving part 400 through the shaft coupling portion 272 and the driving shaft 430.

Furthermore, in one example, the shaft fixing member 435 can be disposed in front of the shaft coupling portion 272, and the shaft coupling portion 272 and the shaft fixing member 435 can be disposed inside the drum 200, so that there is a possibility to cause damage to the laundry when in contact with the laundry accommodated inside the drum 200.

Therefore, in one example, the shaft coupling portion 272 can be separated from the interior of the drum 200 using the shaft cap 260, so that it is possible to effectively prevent the damage to laundry and the like resulted from the contact between the laundry and the shaft coupling portion 272.

In one example, the laundry treating apparatus 10 can include the bushing fastening member 2245 for fastening the bushing coupling portion 224 and the drum coupling portion 274 to each other by penetrating both the bushing coupling portion 224 and the drum coupling portion 274. The shaft cap 260 can shield the bushing fastening member 2245 from the interior of the drum 200.

The bushing coupling portion 224 and the drum coupling portion 274 described above can be fastened to each other through the bushing fastening member 2245. The bushing fastening member 2245 can penetrate both the bushing coupling portion 224 and the drum coupling portion 274 together to couple both to each other. For example, the bushing fastening member 2245 can be formed in a shape of a bolt or the like and penetrate at least one of the bushing coupling portion 224 and the drum coupling portion 274.

A portion of the bushing fastening member 2245 can be exposed forwardly of the drum coupling portion 274 and can be supported on the front surface of the drum coupling portion 274.

A portion of the bushing fastening member 2245 disposed inside the drum 200 can cause damage to the laundry when being in contact with the laundry accommodated inside the drum 200.

Accordingly, in one example, the shaft cap 260 covers not only the shaft coupling portion 272, but also the bushing fastening member 2245, thereby preventing the contact between the laundry and the bushing fastening member 2245 inside the drum 200 and preventing damage to the laundry.

In one example, the laundry treating apparatus 10 can include a cap fastening member 262. The cap fastening member 262 can pass through the shaft cap 260 and be inserted into the driving shaft 430 to fasten the shaft cap 260 to the driving shaft 430.

The cap fastening member 262 can be formed integrally with the shaft cap 260 or can be manufactured separately and coupled to the shaft cap 260. The cap fastening member 262 can be inserted into the driving shaft 430 through the shaft cap 260.

For example, inside the shaft cap 260, the shaft coupling portion 272 and the front end of the driving shaft 430 penetrating the shaft coupling portion 272 can be positioned, and the shaft fixing member 435 coupled to the front end of the driving shaft 430 can be positioned.

The cap fastening member 262 can penetrate the shaft cap 260 inside the drum 200 to be inserted into and coupled to one of the shaft coupling portion 272, the driving shaft 430, and the shaft fixing member 435. For example, FIG. 25 illustrates the cap fastening member 262 inserted into the driving shaft 430 in an exemplary state in which the shaft cap 260 is separated therefrom.

When the cap fastening member 262 is coupled to the driving shaft 430, the front end of the driving shaft 430 can be disposed at a center of the shaft cap 260, and the cap fastening member 262 can be inserted into and coupled to the front end of the driving shaft 430 through the center of the shaft cap 260. The cap fastening member 262 can be formed in the shape of the bolt or the like and can be screwed to the front end of the driving shaft 430 through the shaft cap 260.

In some implementations, the shaft cap 260 is coupled to the driving shaft 430 through the cap fastening member 262, so that the driving shaft 430 that provides the rotation force based on the drum 200 and the shaft cap 260 can be directly coupled to each other, and the rotations of the shaft cap 260, the drum 200, and the driving shaft 430 can be mutually restricted when the drum 200 rotates to prevent the relative rotation of the shaft cap 260.

In some implementations, the rear surface central portion 220 can have a hook fastening portion 2255 on a shaft circumference 225 surrounding the shaft through-hole 223, and the shaft cap 260 can include a cap hook 264 inserted into the shaft through-hole 223 and coupled to the hook fastening portion 2255.

Figure 28:
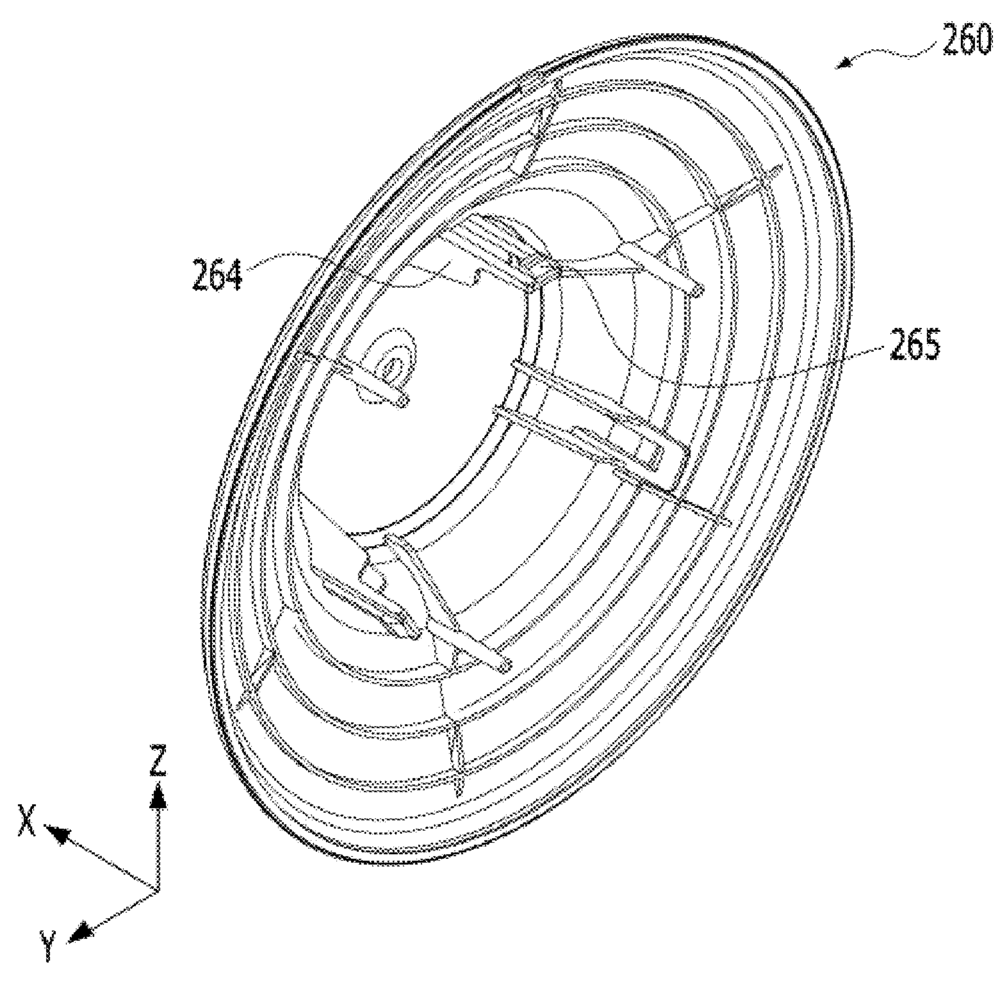
FIG. 28 is a perspective view illustrating an example of a shaft cap in a laundry treating apparatus viewed from the rear.

For example, FIG. 22 illustrates cross-sections of the hook fastening portion 2255 and the cap hook 264, and FIG. 28 illustrates the cap hook 264 viewed from the rear.

The hook fastening portion 2255 can be disposed at the shaft circumference 225 of the shaft through-hole 223. That is, the hook fastening portion 2255 can be disposed at the inner circumferential surface of the shaft through-hole 223, and the hook fastening portion 2255 can be disposed at the shaft circumference 225 surrounding the shaft through-hole 223 defined in the connecting front surface 222.

In some implementations, the bushing coupling portion 224 surrounding the shaft through-hole 223 and on which the drum coupling portion 274 is disposed from the rear can be disposed on the connecting front surface 222. The shaft circumference 225 can correspond to a portion surrounding the shaft through-hole 223 in the bushing coupling portion 224. Accordingly, the hook fastening portion 2255 can be disposed at the inner circumferential surface of the bushing coupling portion 224 surrounding the shaft through-hole 223.

The hook fastening portion 2255 can be penetrated by the cap hook 264 of the shaft cap 260 to form a coupling relationship with the cap hook 264, or can be configured such that a hook protrusion 265 of the cap hook 264 is fastened thereto to form the coupling relationship.

The cap hook 264 can extend from the shaft cap 260 toward the hook fastening portion 2255 to be coupled to the hook fastening portion 2255. The cap hook 264 can be disposed at the circumference of the shaft cap 260 or can be disposed on the inner surface of the shaft cap 260 facing the driving shaft 430 to extend toward the hook fastening portion 2255.

In some implementations, the shaft cap 260 can be fixed inside the drum 200 using at least one of the cap fastening member 262 and the cap hook 264 described above. For example, FIG. 22 illustrates the shaft cap 260 coupled to a fixed shaft and the drum rear surface 210 by the cap fastening member 262 and the cap hook 264. For example, FIG. 28 illustrates the cap hook 264 that extends rearward from the inner surface of the shaft cap 260 and is fastened to the hook fastening portion 2255.

In some implementations, the shaft circumference 225 can protrude frontward from the bushing coupling portion 224, the bushing 270 can have a bushing recessed portion 276 recessed rearward in a portion facing the cap hook 264, and in the cap hook 264, the hook protrusion 265 fastened to the hook fastening portion 2255 can be disposed in a space between the shaft circumference 225 and the bushing recessed portion 276.

Specifically, the hook fastening portion 2255 can be disposed at the inner circumferential surface of the shaft through-hole 223, the cap hook 264 can extend from the interior of the shaft cap 260 toward the hook fastening portion 2255, and the hook protrusion 265 protruding radially outward of the shaft cap 260 or the shaft circumference 225 can be disposed at an end of the cap hook 264 facing the hook fastening portion 2255.

For example, the cap hook 264 can extend from the shaft cap 260 and be inserted into a space between the shaft coupling portion 272 of the bushing 270 and the inner circumferential surface of the shaft through-hole 223. The hook protrusion 265 protruding outwards from an end of the cap hook 264 can be caught and coupled to the hook fastening portion 2255 defined at the inner circumferential surface of the shaft through-hole 223.

In one example, referring to FIG. 22, the shaft circumference 225 of the connecting front surface 222 can correspond to an inner circumference of the drum coupling portion 274, and the shaft circumference 225 can protrude frontward from the connecting front surface 222. That is, the shaft circumference 225 can protrude frontward from the bushing coupling portion 224 protruding frontward from the connecting front surface 222.

For example, the connecting front surface 222 can be formed in a shape in which the shaft circumference 225 surrounding the shaft through-hole 223 protrudes frontward. As the shaft circumference 225 including the hook fastening portion 2255 protrudes frontward from the connecting front surface 222 or the bushing coupling portion 224, an extending length of the cap hook 264 to be inserted into the hook fastening portion 2255 can be reduced.

In addition, in one example, the bushing 270 can include the bushing recessed portion 276 that is recessed rearward between the shaft coupling portion 272 and the drum coupling portion 274. The bushing recessed portion 276 can be formed in the annular shape to surround the shaft coupling portion 272. That is, the bushing recessed portion 276 can surround the inner circumference of the drum coupling portion 274.

The bushing recessed portion 276 can protrude rearward from the drum coupling portion 274. The bushing recessed portion 276 can be formed around an inner circumference of the drum coupling portion 274, can be formed in the annular shape, and can be recessed rearward.

The shaft circumference 225 or the hook fastening portion 2255 can be disposed in front of the bushing recessed portion 276. That is, the bushing recessed portion 276 can be disposed at the rear of the hook fastening portion 2255 and recessed rearward. Accordingly, a space can be defined between the hook fastening portion 2255 and the bushing recessed portion 276 and/or within the bushing recessed portion 276.

In some implementations, the cap hook 264 can have the hook protrusion 265 at the rear end thereof. The hook protrusion 265 can be caught on the hook fastening portion 2255 and can be coupled to the hook fastening portion 2255 by penetrating the hook fastening portion 2255 or being inserted into the shaft through-hole 223. That is, the cap hook 264 can be coupled to the hook fastening portion 2255 as the hook protrusion 265 is caught onto the rear end of the hook fastening portion 2255.

The bushing 270 can be disposed at and coupled to the rear surface of the connecting front surface 222 of the rear surface central portion 220. In one example, the shaft circumference 225 of the connecting front surface 222 can protrude frontward to define a space in a rearward direction, and the bushing recessed portion 276 disposed at the rear of the shaft circumference 225 can also define a space between the bushing recessed portion 276 and the shaft circumference 225.

In some implementations, as the space is defined between the hook fastening portion 2255 of the connecting front surface 222 and the bushing 270, the space in which the hook protrusion 265 of the cap hook 264 that is caught on the hook fastening portion 2255 can be disposed can be secured.

Although the present disclosure has shown and described with respect to the particular embodiment, to the extent not departing from the technical spirit of the present disclosure provided by the following claims, it will be apparent to those of ordinary skill in the art that the present disclosure can be variously improved and changed.

What is claimed is:

1. A laundry treating apparatus comprising:

a cabinet including a rear plate disposed at a rear surface thereof;

a drum rotatably disposed inside the cabinet and configured to receive laundry, the drum including a drum rear surface facing the rear plate; and a driving part disposed at the rear plate and configured to provide a rotation force to the drum, wherein the rear plate includes:

a driving part mounting portion configured to be coupled with the driving part, and an air flow portion surrounding the driving part mounting portion and configured to provide air into the drum, wherein the air flow portion includes a flow space having an open front surface facing the drum and configured to allow air to flow therein, wherein the drum rear surface includes:

a rear surface central portion facing the driving part mounting portion, and an air passage surrounding the rear surface central portion and configured to pass air flowing out through the open front surface of the air flow portion therethrough, wherein the rear surface central portion is disposed in front of the driving part and configured to suppress heat transfer between an interior of the drum and the driving part, wherein the air passage is disposed to be spaced radially outward apart from the driving part, wherein the rear plate defines the rear surface of the cabinet and is exposed to an outside of the cabinet, wherein the air flow portion is defined by bending the rear plate rearward, wherein the driving part is disposed at a rear of the driving part mounting portion and disposed at a rear of the rear plate, wherein the driving part mounting portion defines a spacing from the rear surface central portion, wherein the rear surface central portion has a diameter equal to or greater than a diameter of the driving part and is disposed in front of the driving part, and wherein the driving part mounting portion covers a front of an entirety of the driving part from the front and is configured to suppress the heat transfer between the interior of the drum and the driving part together with the rear surface central portion.

2. The laundry treating apparatus of claim 1, wherein the entirety of the driving part overlaps the rear surface central portion in a forward direction.

3. The laundry treating apparatus of claim 1, wherein the rear surface central portion protrudes frontward from the drum rear surface and includes a space defined therein, and wherein the driving part mounting portion and the driving part are at least partially inserted into the rear surface central portion.

4. The laundry treating apparatus of claim 3, wherein the driving part comprises:

a first driving part coupled to the driving part mounting portion at a front portion thereof; and a second driving part coupled to the first driving part and having a larger cross-sectional area than that of the first driving part at a rear portion thereof, and wherein at least a portion of the first driving part is disposed within the space of the rear surface central portion.

5. The laundry treating apparatus of claim 4, wherein the rear surface central portion includes:

a connecting front surface coupled to the driving part and having a diameter equal to or greater than a diameter of the first driving part, the connecting front surface covering a region corresponding to the first driving part; and a connecting side surface extending frontward from the drum rear surface, coupled to the connecting front surface, extending along a circumference of the connecting front surface, and covering a region corresponding to the second driving part, the connecting side surface having a diameter that increases in a rearward direction.

6. The laundry treating apparatus of claim 5, wherein the driving part mounting portion includes:

a mounting front surface disposed between the connecting front surface and the first driving part, coupled with the first driving part, the mounting front surface disposed in front of the first driving part; and a mounting side surface extending frontward from the rear plate and coupled to the mounting front surface, extending along a circumference of the mounting front surface, the mounting side surface disposed in front of a circumference of the second driving part, the mounting side surface having a diameter that increases in the rearward direction.

7. The laundry treating apparatus of claim 4, wherein the driving part mounting portion is not in contact with the second driving part.

8. The laundry treating apparatus of claim 1, wherein the driving part includes a driving shaft protruding in a forward direction from the rear plate and coupled to the rear surface central portion, and wherein the laundry treating apparatus further comprises a bushing coupled to the rear surface central portion and the driving shaft, the bushing configured to transmit the rotation force from the driving shaft to the drum.

9. The laundry treating apparatus of claim 8, wherein the rear surface central portion includes a shaft through-hole penetrated by the bushing, and wherein the bushing includes a shaft coupling portion protruding in the forward direction from the rear surface central portion through the shaft through-hole and accommodating the driving shaft inserted thereinto.

10. The laundry treating apparatus of claim 9, wherein the driving part comprises a bearing extension extending toward the drum rear surface through the driving part mounting portion, wherein the bearing extension includes a bearing configured to support the driving shaft, and is at least partially inserted into the shaft coupling portion, wherein a space configured to accommodate the bearing extension inserted thereinto is defined at the driving part, and wherein at least a portion of the shaft coupling portion increases in diameter in a direction toward the rear plate.

11. The laundry treating apparatus of claim 9, wherein the shaft coupling portion comprises teeth and gear teeth protruding toward the driving shaft, and wherein the driving shaft includes a meshing portion inserted into the teeth, and wherein the gear teeth are disposed on an outer circumferential surface thereof to mesh with the teeth.

12. The laundry treating apparatus of claim 11, wherein the shaft coupling portion comprises a shaft coupling hole penetrated by the driving shaft, wherein the teeth are disposed on an inner circumferential surface of the shaft coupling hole, wherein a shaft fixing member is coupled to a front end of the driving shaft disposed in front of the shaft coupling hole, and wherein the shaft fixing member is supported in a forward direction by the shaft coupling portion.

13. The laundry treating apparatus of claim 9, wherein the bushing further includes a drum coupling portion extending along a circumference of the shaft coupling portion and coupled to the rear surface central portion, wherein the rear surface central portion includes a bushing coupling portion surrounding the shaft through-hole and coupled with the drum coupling portion, and wherein the bushing coupling portion protrudes frontward from the rear surface central portion and accommodates the drum coupling portion disposed thereon.

14. The laundry treating apparatus of claim 13, further comprising a shaft cap that is disposed in front of the rear surface central portion and covers the shaft coupling portion from the interior of the drum.

15. The laundry treating apparatus of claim 14, further comprising a bushing fastening member that fastens the bushing coupling portion and the drum coupling portion to each other by penetrating the bushing coupling portion and the drum coupling portion, and wherein the shaft cap covers the bushing fastening member from the interior of the drum.

16. The laundry treating apparatus of claim 14, further comprising a cap fastening member that penetrates the shaft cap and is inserted into the driving shaft to fasten the shaft cap to the driving shaft.

17. The laundry treating apparatus of claim 14, wherein the rear surface central portion comprises a hook fastening portion on a shaft circumference surrounding the shaft through-hole, wherein the shaft cap includes a cap hook inserted into the shaft through-hole and coupled to the hook fastening portion, wherein the shaft circumference protrudes frontward from the bushing coupling portion, wherein the bushing defines a bushing recessed portion recessed rearward in a portion thereof facing the cap hook, and wherein the cap hook includes a hook protrusion coupled to the hook fastening portion and disposed in a space between the shaft circumference and the bushing recessed portion.

18. A laundry treating apparatus comprising:

a cabinet including a rear plate disposed at a rear surface thereof;

a drum rotatably disposed inside the cabinet and configured to receive laundry, the drum including a drum rear surface facing the rear plate; and a driving part disposed at the rear plate and configured to provide a rotation force to the drum, wherein the rear plate includes:

a driving part mounting portion configured to be coupled with the driving part, and an air flow portion surrounding the driving part mounting portion and configured to provide air into the drum, wherein the air flow portion includes a flow space having an open front surface facing the drum and configured to allow air to flow therein, wherein the drum rear surface includes:

a rear surface central portion facing the driving part mounting portion, and an air passage surrounding the rear surface central portion and configured to pass air flowing out through the open front surface of the air flow portion therethrough, wherein the rear surface central portion is disposed in front of the driving part and configured to suppress heat transfer between an interior of the drum and the driving part, wherein the air passage is disposed to be spaced radially outward apart from the driving part, wherein the rear plate defines the rear surface of the cabinet and is exposed to an outside of the cabinet, wherein the air flow portion is defined by bending the rear plate rearward, wherein the driving part is disposed at a rear of the driving part mounting portion and disposed at a rear of the rear plate, wherein the driving part mounting portion defines a spacing from the rear surface central portion, wherein the driving part includes a driving shaft protruding in a forward direction from the rear plate and coupled to the rear surface central portion, wherein the laundry treating apparatus further comprises a bushing coupled to the rear surface central portion and the driving shaft, the bushing configured to transmit the rotation force from the driving shaft to the drum, wherein the rear surface central portion includes a shaft through-hole penetrated by the bushing, and wherein the bushing includes a shaft coupling portion protruding in the forward direction from the rear surface central portion through the shaft through-hole and accommodating the driving shaft inserted thereinto.

* * * * *